United States Patent
Nakamura

(10) Patent No.: US 9,338,344 B2
(45) Date of Patent: May 10, 2016

(54) FOCUSING APPARATUS AND METHOD FOR CONTROLLING THE SAME, AND IMAGE PICKUP APPARATUS

(71) Applicant: CANON KABUSHIKI KAISHA, Tokyo (JP)

(72) Inventor: Shun Nakamura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/248,494

(22) Filed: Apr. 9, 2014

(65) Prior Publication Data

US 2014/0300792 A1     Oct. 9, 2014

(30) Foreign Application Priority Data

Apr. 9, 2013 (JP) ................................. 2013-081659
Apr. 9, 2013 (JP) ................................. 2013-081660

(51) Int. Cl.
*G02B 13/16* (2006.01)
*H04N 5/225* (2006.01)
*H04N 5/232* (2006.01)
*G03B 13/26* (2006.01)

(52) U.S. Cl.
CPC ............ *H04N 5/23212* (2013.01); *G03B 13/26* (2013.01)

(58) Field of Classification Search
CPC . H04N 5/23287; H04N 5/2254; H04N 5/232; H04N 5/23209; H04N 5/23245; H04N 2201/02431
USPC .................. 348/335, 340, 345, 348, 350, 352
See application file for complete search history.

(56) References Cited

U.S. PATENT DOCUMENTS

| 6,271,883 B1* | 8/2001 | Iijima | ................ H04N 5/23212 348/345 |
| 2010/0150538 A1* | 6/2010 | Ono et al. | ....................... 396/104 |
| 2011/0267706 A1* | 11/2011 | Karasawa | .......... H04N 5/23212 359/698 |
| 2012/0169917 A1* | 7/2012 | Isobe | ............................ 348/345 |

FOREIGN PATENT DOCUMENTS

| JP | 09-054242 A | 2/1997 |
| JP | 2001-004914 A | 1/2001 |
| JP | 2001-083407 A | 3/2001 |
| JP | 2010-139942 A | 6/2010 |
| JP | 2012-088617 A | 5/2012 |

* cited by examiner

*Primary Examiner* — Yogesh Aggarwal
(74) *Attorney, Agent, or Firm* — Cowan, Liebowitz & Latman, P.C.

(57) ABSTRACT

The defocus amount of an imaging optical system is detected based on a pair of image signals that are obtained from an image sensor and are used for phase-difference detection automatic focusing. In a first mode, the drive of a focusing lens is controlled so that the focusing lens is driven at a first speed if the reliability of the pair of image signal is at a first level, and at a second speed lower than the first speed if the reliability of the pair of image signals is at a second level higher than the first level.

45 Claims, 33 Drawing Sheets

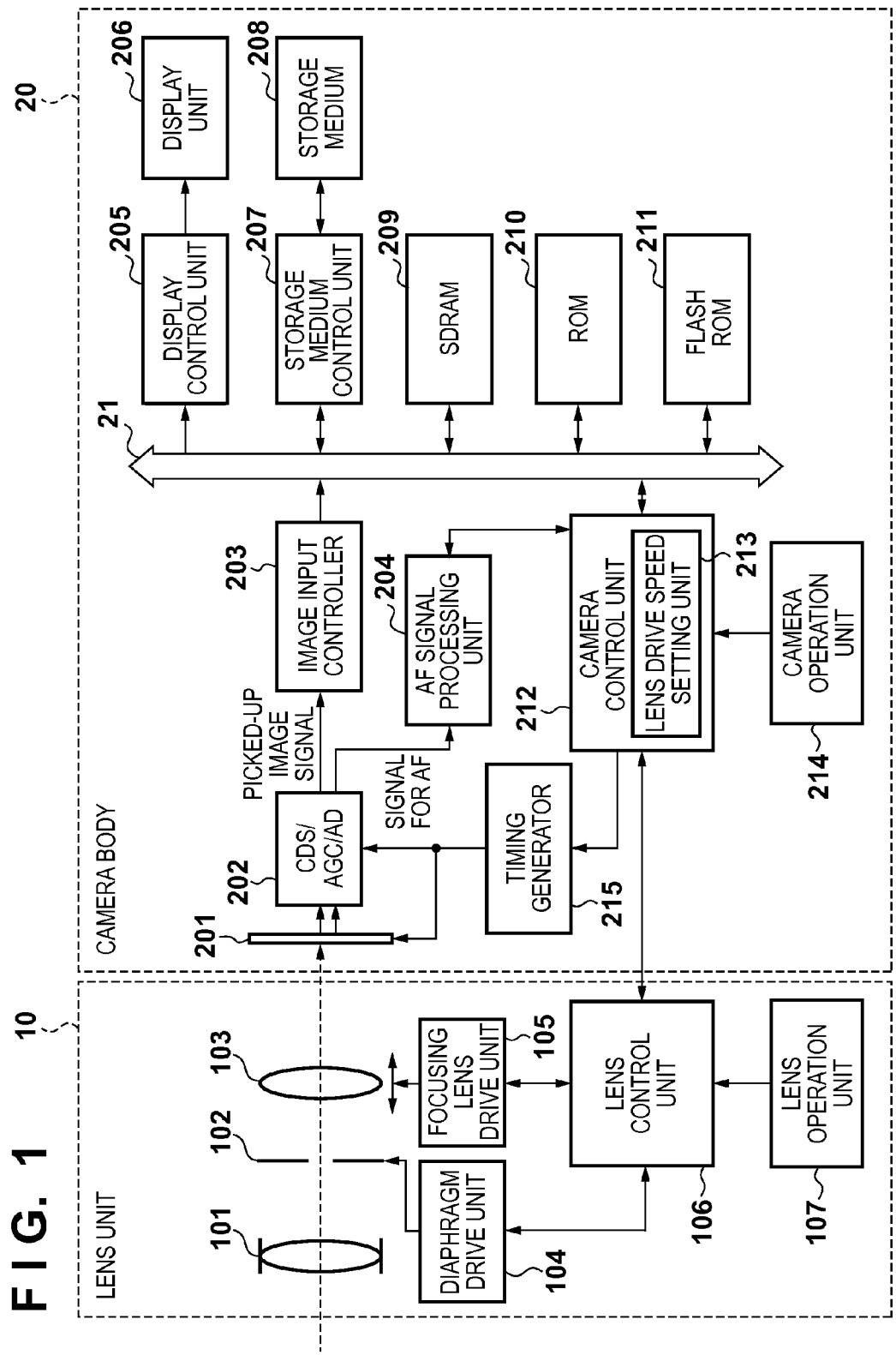

FIG. 2A

PIXEL CONFIGURATION NOT FOR PHASE-DETECTION ON IMAGE SURFACE

| R | Gr | R | Gr | R | Gr | R | Gr | R | Gr |
|---|----|---|----|---|----|---|----|---|----|
| Gb | B | Gb | B | Gb | B | Gb | B | Gb | B |

FIG. 2B

PIXEL CONFIGURATION FOR PHASE-DETECTION ON IMAGE SURFACE

| R A | R B | Gr A | Gr B | R A | R B | Gr A | Gr B | R A | R B | Gr A | Gr B | R A | R B | Gr A | Gr B | R A | R B | Gr A | Gr B |
|-----|-----|------|------|-----|-----|------|------|-----|-----|------|------|-----|-----|------|------|-----|-----|------|------|
| Gb A | Gb B | B A | B B | Gb A | Gb B | B A | B B | Gb A | Gb B | B A | B B | Gb A | Gb B | B A | B B | Gb A | Gb B | B A | B B |

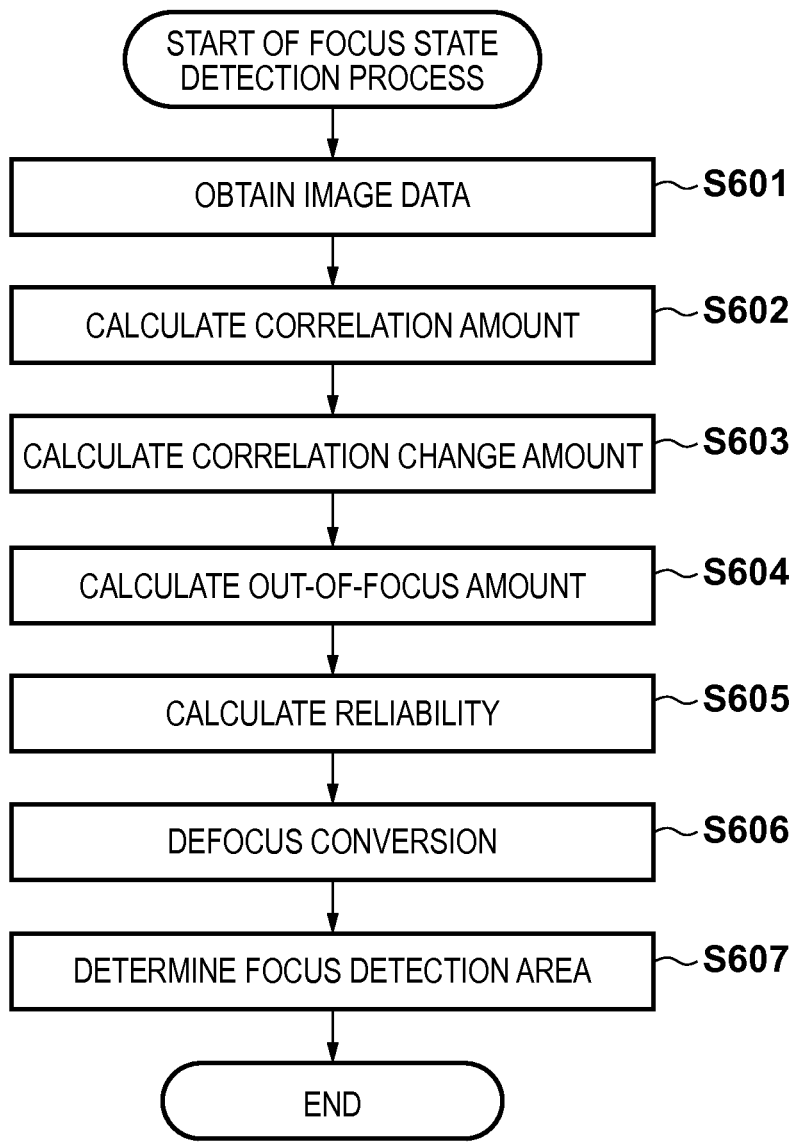

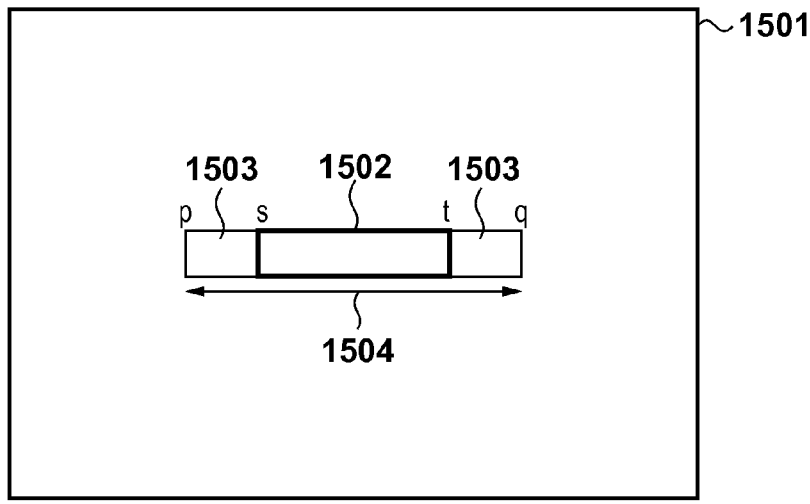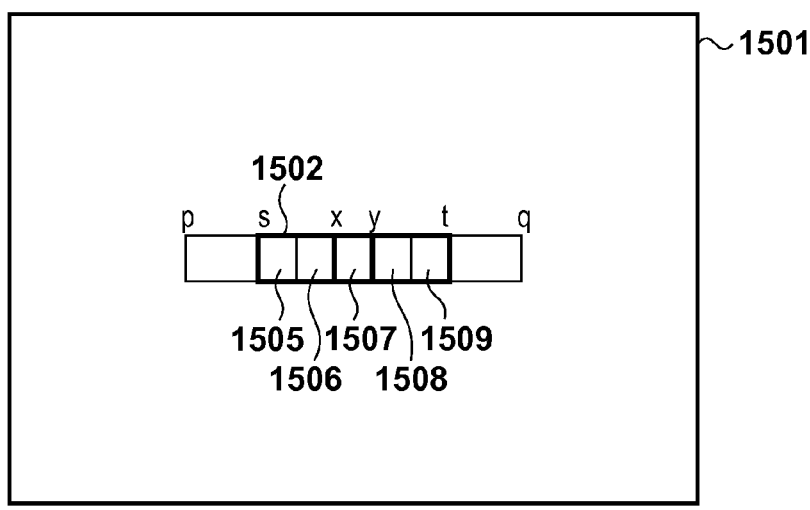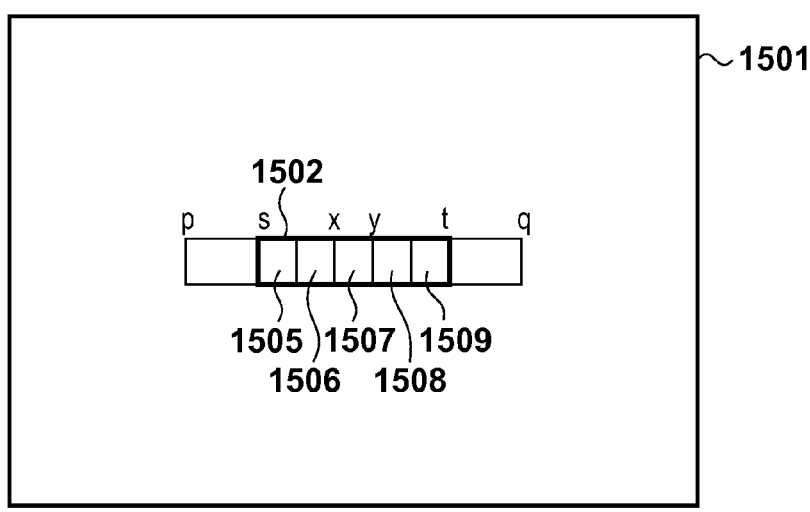

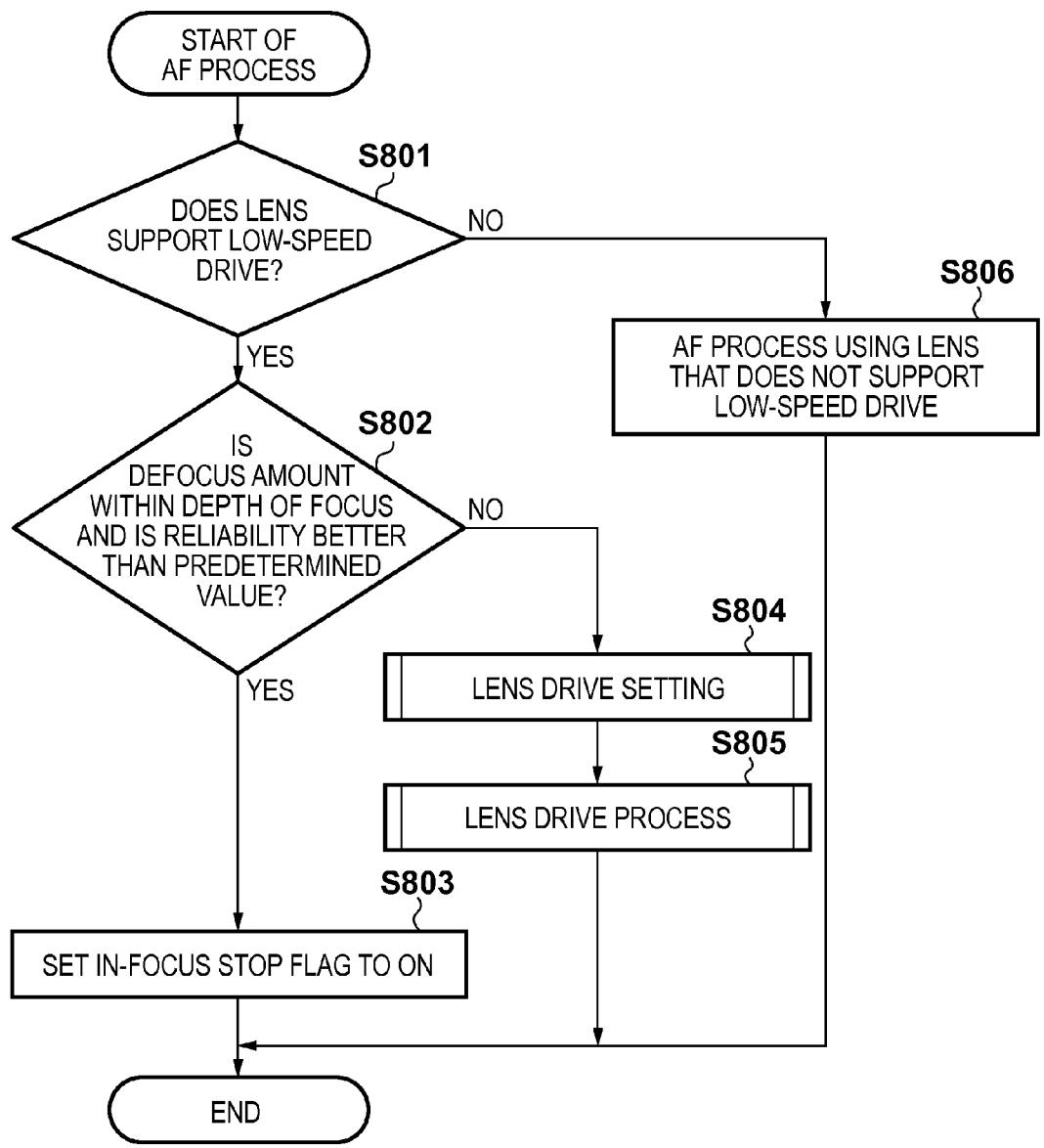
F I G. 12

F I G. 14A
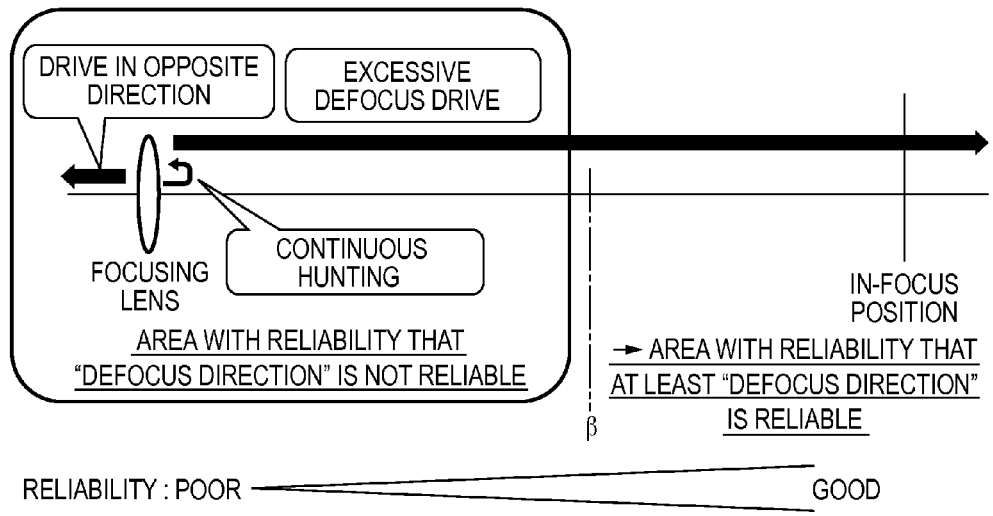
F I G. 14B
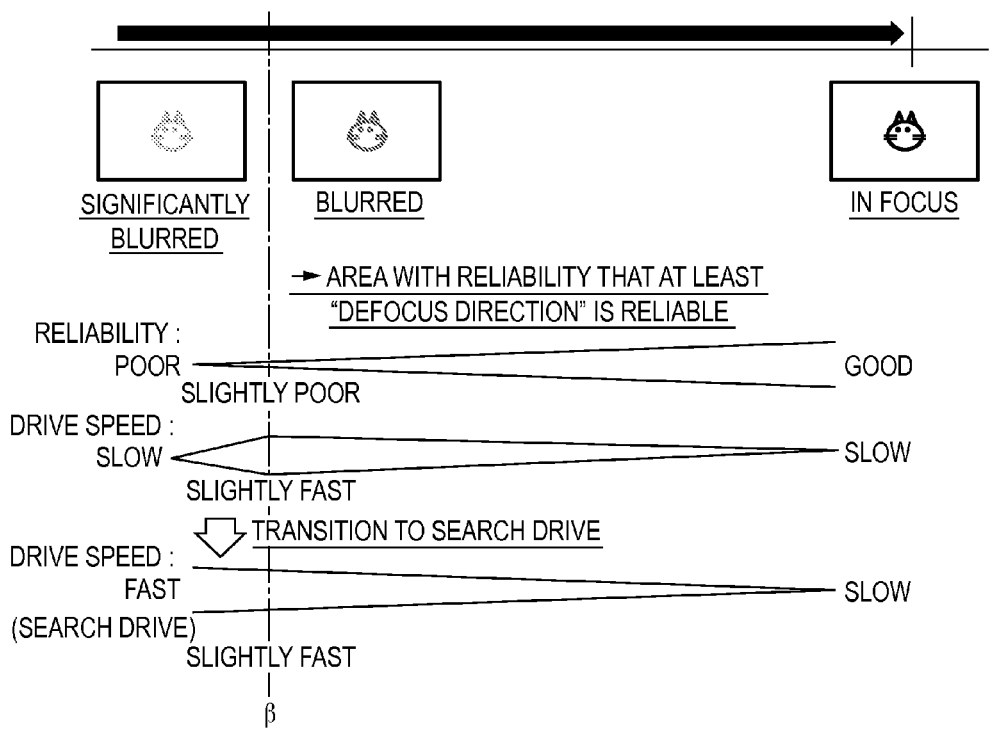

F I G. 20A
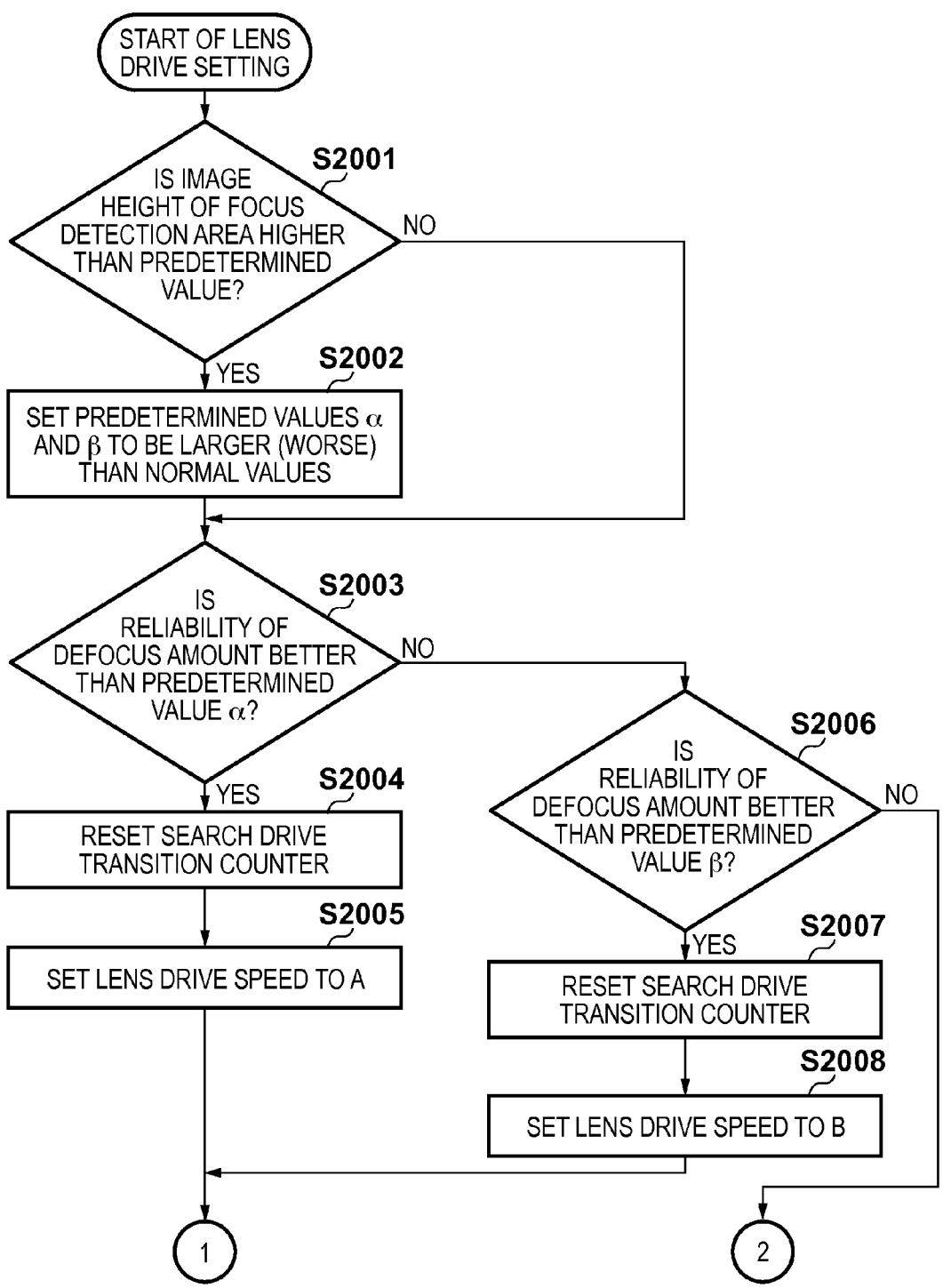

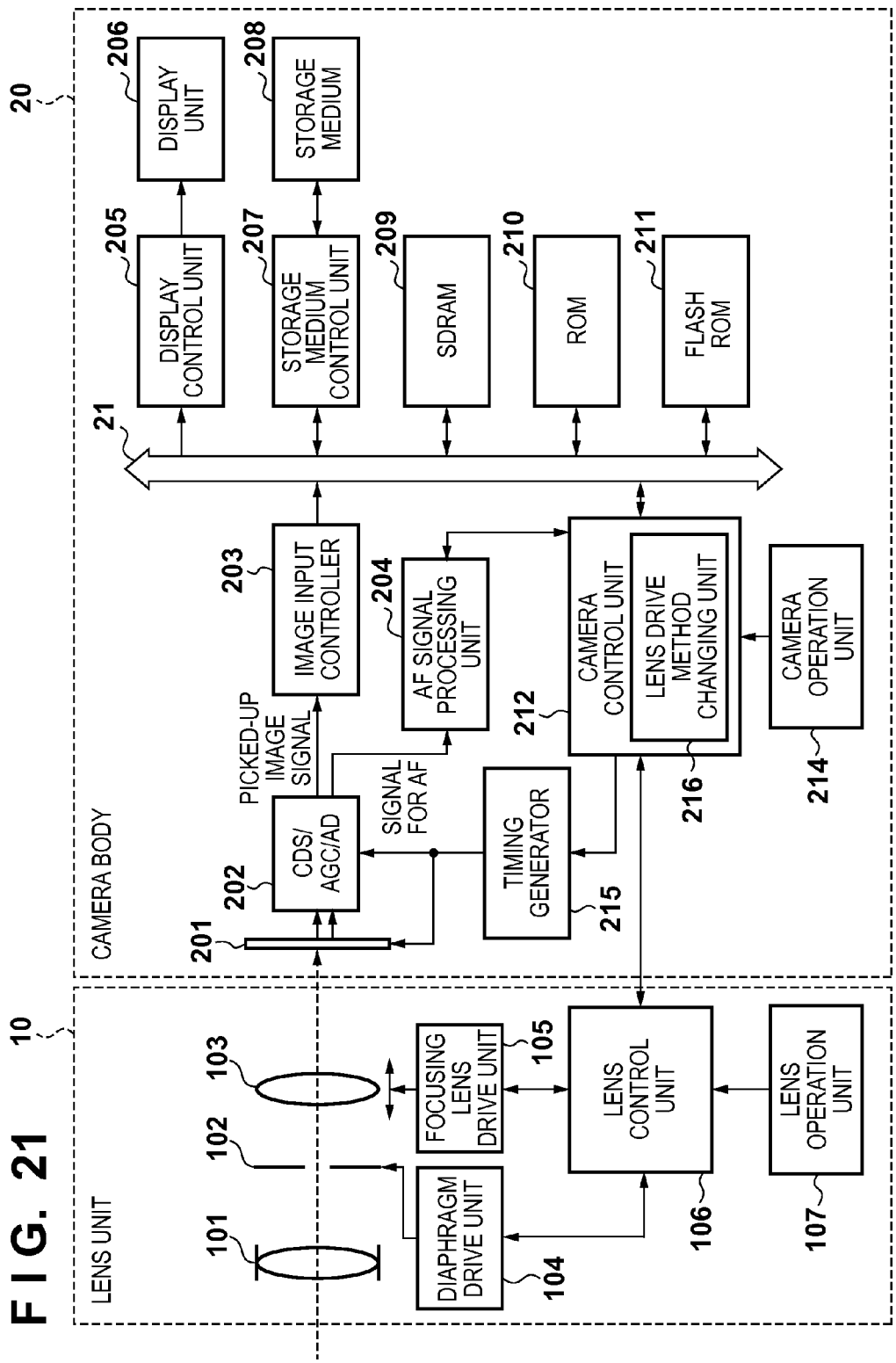

F I G. 25A
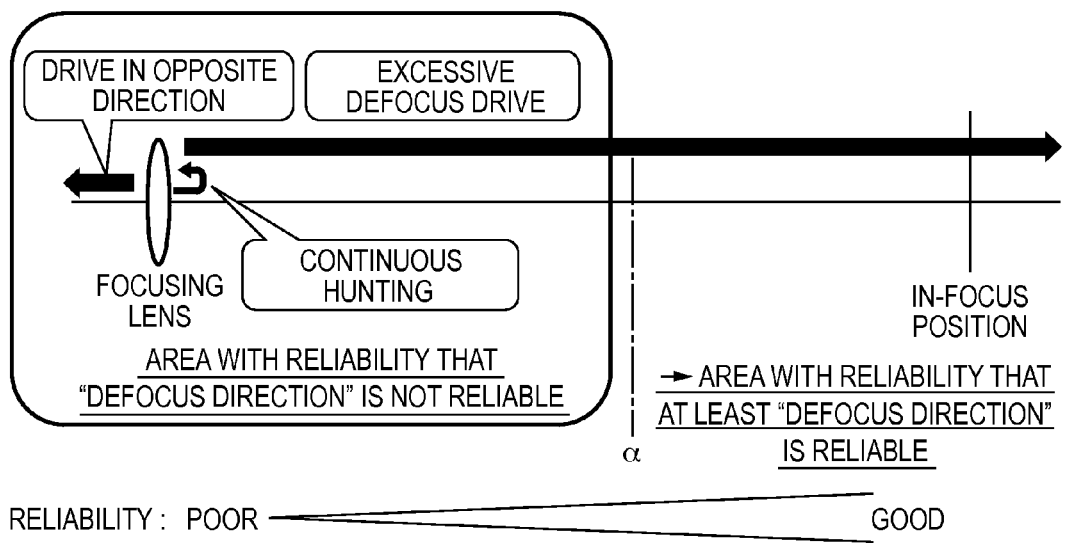
F I G. 25B
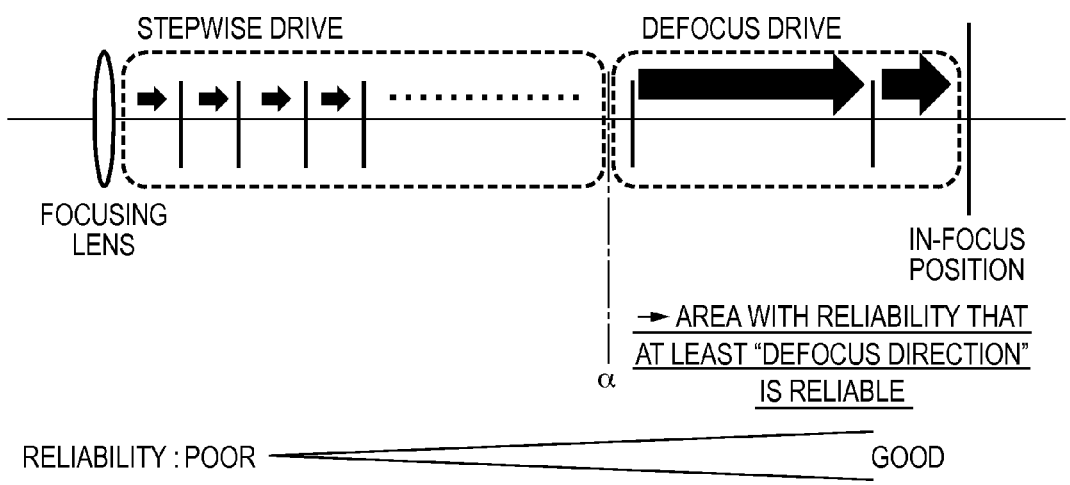

F I G. 26
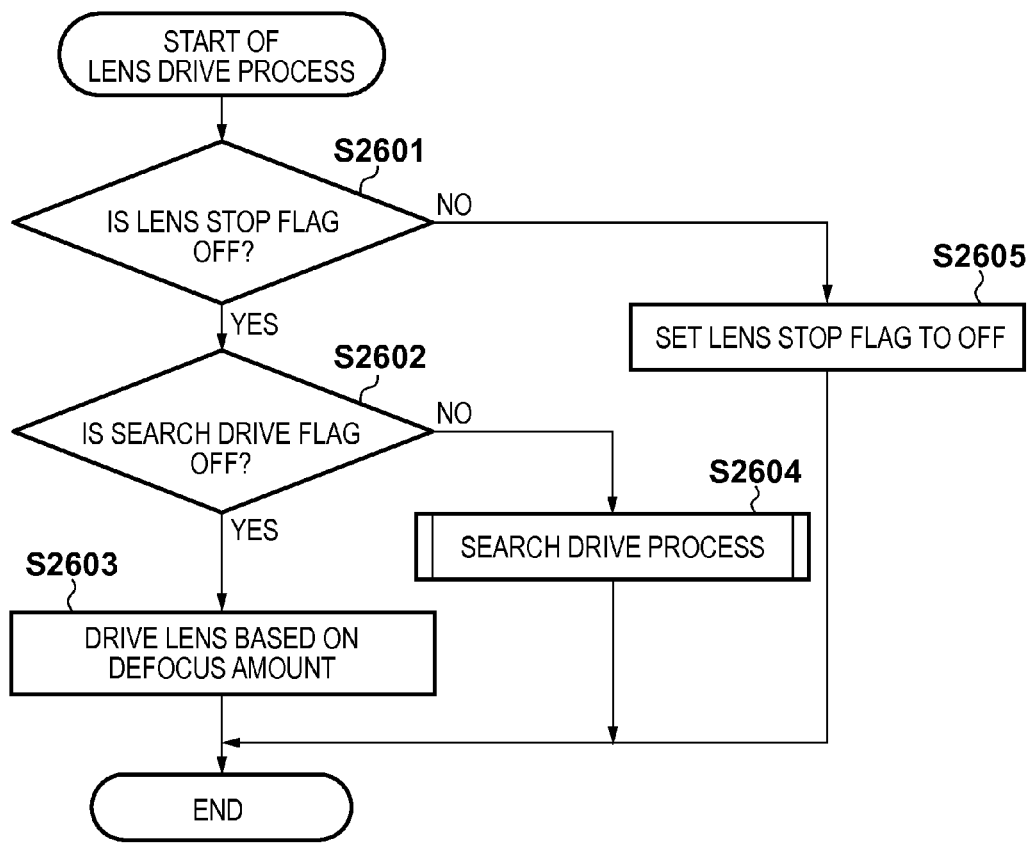

F I G. 30A
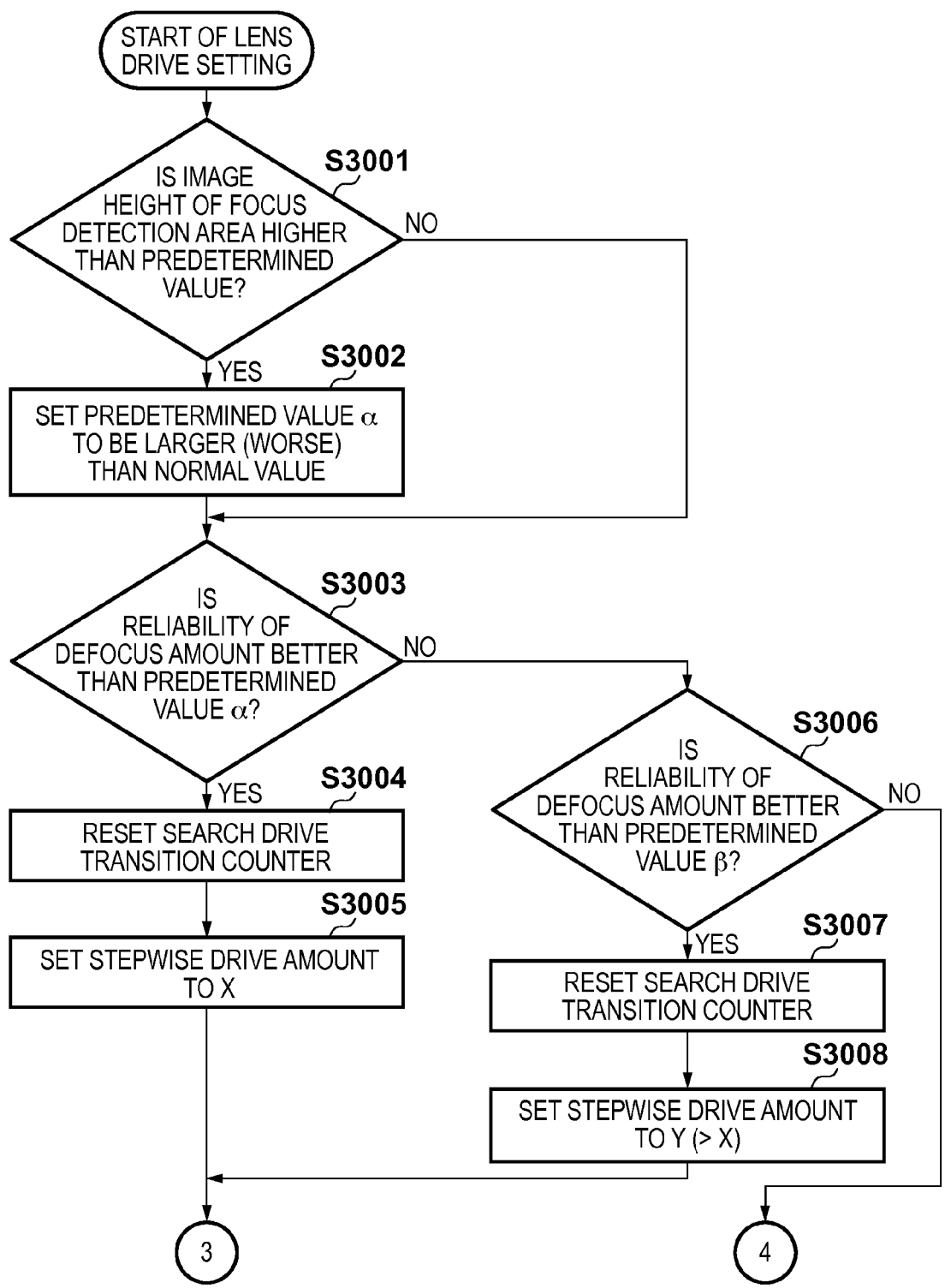

F I G. 31
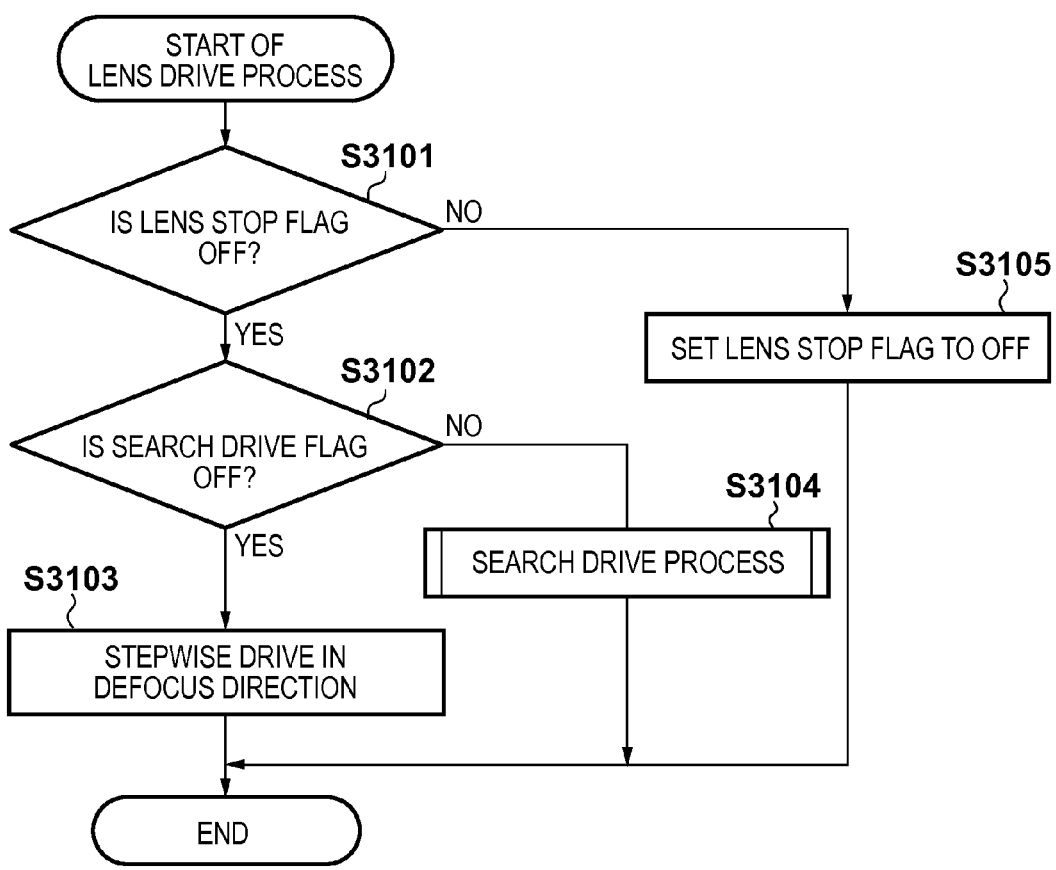

FOCUSING APPARATUS AND METHOD FOR CONTROLLING THE SAME, AND IMAGE PICKUP APPARATUS

BACKGROUND OF THE INVENTION

1. Field of the Invention

The present invention relates to focusing apparatuses and methods for controlling the same, and more particularly, to a focusing technique using phase-detection AF on an imaging surface.

2. Description of the Related Art

To take an image while viewing a live view (LV) screen (hereinafter referred to as "live view shooting") has in recent years become more common on image pickup apparatuses, such as representatively a single-lens reflex camera. In particular, there has been a demand for comfortable shooting of a moving image while viewing the LV screen.

Most common automatic focusing (autofocus: AF) methods for image pickup apparatuses are the phase-difference detection method and the contrast detection method.

In the phase-difference detection method, light fluxes from a subject that have been passed through different exit pupil areas in an imaging optical system are caused to form images on a pair of line sensors to obtain a pair of image signals, and the defocus amount of the imaging optical system is obtained based on a phase difference between the pair of image signals. Thereafter, if a focusing lens is moved by an amount corresponding to the defocus amount, the imaging optical system is correctly focused on the subject (Japanese Patent Laid-Open No. 09-054242). However, in the typical structure in which the optical path to the image sensor is interrupted when light fluxes are caused to form an image on the phase-difference detection line sensors, the focusing process of the phase-difference detection method cannot be performed while performing LV shooting.

On the other hand, in the contrast detection method, an in-focus state is achieved by searching for a focusing lens position that produces a highest contrast evaluation value generated based on a picked-up image signal obtained using an image sensor (see Japanese Patent Laid-Open No. 2001-004914). The contrast detection method performs focusing based on a picked-up image signal and therefore is suitable for AF during LV shooting, and has in recent years been the mainstream AF method for LV shooting. However, the contrast detection method cannot easily judge a position or a direction to or in which the focusing lens is to be moved so that a subject is in focus. Therefore, in the contrast detection method, it may take time to focus, or the focusing lens may be moved in the wrong direction or past the in-focus position. In particular, when a moving image is shot, an image that is shot during movement of the focusing lens is also recorded, and therefore, the time and behavior of movement of the focusing lens until the focusing lens reaches the in-focus position affect the image quality of the moving image.

Therefore, for the AF control during shooting of a moving image, a sophisticated focusing operation that does not much affect the recorded image has been demanded, rather than the focusing speed (responsiveness) that is the time it takes to comes into the in-focus state. Therefore, a phase-detection-on-imaging-surface method has been proposed as a method that allows for a sophisticated focusing operation even during LV shooting. The phase-detection-on-imaging-surface method is a method for obtaining a defocus amount based on a phase difference between a pair of signals obtained by image sensors.

As a technique of implementing the phase-detection-on-imaging-surface method, a technique has been proposed that detects a defocus amount at the same time of picking up an image, by performing pupil division on the imaging pixels of an image sensor using microlenses and then receiving light using a plurality of focus detection pixels. Japanese Patent Laid-Open No. 2001-083407 describes a structure in which a photodiode included in each pixel, to which light is condensed by a single microlens, is divided so the photodiodes receive light of different pupil planes of the imaging lens. As a result, focusing can be performed by the phase-detection-on-imaging-surface method based on the outputs of two photodiodes. If the phase-detection-on-imaging-surface method is used, a defocus amount can be calculated to find the direction and amount of movement of the focusing lens even during LV shooting, and therefore, the focusing lens can be moved at a high speed and in a sophisticated manner.

Japanese Patent Laid-Open No. 2012-088617 has proposed a technique of driving the focusing lens in a sophisticated manner using the phase-detection-on-imaging-surface method during shooting of a moving image, in which the focusing lens is driven using a defocus amount that is corrected to have a smaller absolute value based on the degree of variations in the calculated defocus amount.

As in the image pickup apparatus described in Japanese Patent Laid-Open No. 2012-088617 cited supra, by performing an AF control while correcting and reducing the amount of drive of the focusing lens during shooting of a moving image, the focusing lens can be prevented from being moved past the in-focus position, and a sophisticated focusing lens drive can be achieved. However, the calculation of the defocus amount needs to be performed a number of times in order to calculate the degree of variations in the defocus amount, and therefore, a time lag may occur before a defocus correction amount is obtained.

Japanese Patent Laid-Open No. 2010-139942 has proposed a technique of driving the focusing lens based on the defocus amount calculated by the phase-detection-on-imaging-surface method when the reliability of the defocus amount is good, and based on the contrast evaluation value when the reliability is poor.

The pair of signals obtained by the phase-detection-on-imaging-surface method are not much separated from each other compared to the signals output by the dedicated line sensors used in the phase-difference detection method. In particular, there are characteristics that the accuracy of defocus detection is low when the defocus amount is large, i.e., there is a significant blur. Therefore, if the defocus amount is corrected based on the detected defocus amount as in the image pickup apparatus of Japanese Patent Laid-Open No. 2012-088617 cited supra, variations in the defocus amount may not be correctly detected, particularly when there is a significant blur. In such a case, the accuracy of the correction amount of the defocus amount decreases, and the drive performance of the focusing lens decreases due to overcorrection or insufficient correction.

If the autofocus method is switched between the phase-detection-on-imaging-surface method and the contrast method, depending on the reliability of the defocus amount calculated by the phase-detection-on-imaging-surface method as in Japanese Patent Laid-Open No. 2010-139942 cited supra, the opportunity to perform accurate focusing can be increased even when the reliability of the defocus amount calculated by the phase-detection-on-imaging-surface method is low.

However, in order to switch the autofocus method between the phase-detection-on-imaging-surface method and the contrast method, it is necessary to produce evaluation values that are used in the respective methods, and therefore, the number of necessary circuits or the processing load in the camera increases. Moreover, because a plurality of methods are changed, the process is more complicated, and the time and effort required for management or development are likely to increase. Also, as described above, when focusing is performed using the contrast method during shooting of a moving image, then if the controllability is poor (e.g., particularly the flexibility of setting of the drive speed of the focusing lens is low, etc.), the focusing operation is likely to affect image quality.

SUMMARY OF THE INVENTION

In view of the above problems with conventional techniques, the present invention provides a focusing apparatus that achieves a more sophisticated focusing operation using a phase-detection-on-imaging-surface method, and a method for controlling the focusing apparatus.

According to an aspect of the present invention, there is provided a focusing apparatus comprising: an image sensor configured to generate a pair of image signals used for phase-difference detection focusing; a determination unit that determines a reliability of the pair of image signals; and a control unit that controls drive of a focusing lens based on a phase difference between the pair of image signals, wherein in a first mode, the control unit controls the focusing lens so as to be driven at a first speed if the reliability of the pair of image signals is at a first level, and at a second speed lower than the first speed if the reliability is at a second level higher than the first level.

Further features of the present invention will become apparent from the following description of exemplary embodiments with reference to the attached drawings.

BRIEF DESCRIPTION OF THE DRAWINGS

FIG. 1 is a block diagram showing an example functional configuration of an interchangeable-lens camera that is an example image pickup apparatus according to an embodiment.

FIGS. 2A and 2B are diagrams respectively showing an example pixel configuration for phase-detection not on an imaging surface and on an imaging surface.

FIG. 6 is a flowchart showing a focus state detection process in the first embodiment.

FIGS. 7A to 7C are diagrams schematically showing an example focus detection range and focus detection areas that are handled in the focus state detection process of the first embodiment.

FIG. 12 is a flowchart showing an AF process of step S507 of FIG. 5.

FIG. 14A is a diagram schematically showing a problem with focusing lens drive based on a defocus amount having a low reliability.

FIG. 14B is a diagram schematically showing a relationship between settings of a focusing lens drive speed and the reliability of a defocus amount in the first embodiment.

FIGS. 20A and 20B are flowcharts showing a lens drive setting process in a third embodiment.

FIG. 21 is a block diagram showing an example functional configuration of an interchangeable-lens camera that is an example image pickup apparatus according to an embodiment.

FIG. 25A is a diagram schematically showing a problem with focusing lens drive based on a defocus amount having a low reliability.

FIG. 25B is a diagram schematically showing a relationship between changing of focusing lens drive methods and the reliability of a defocus amount in the fourth embodiment.

FIG. 26 is a flowchart showing a lens drive process of step S2305 of FIG. 23.

FIGS. 30A and 30B are flowcharts showing a lens drive setting process in a sixth embodiment.

FIG. 31 is a flowchart showing a lens drive process in the sixth embodiment.

DESCRIPTION OF THE EMBODIMENTS

Figure 3:
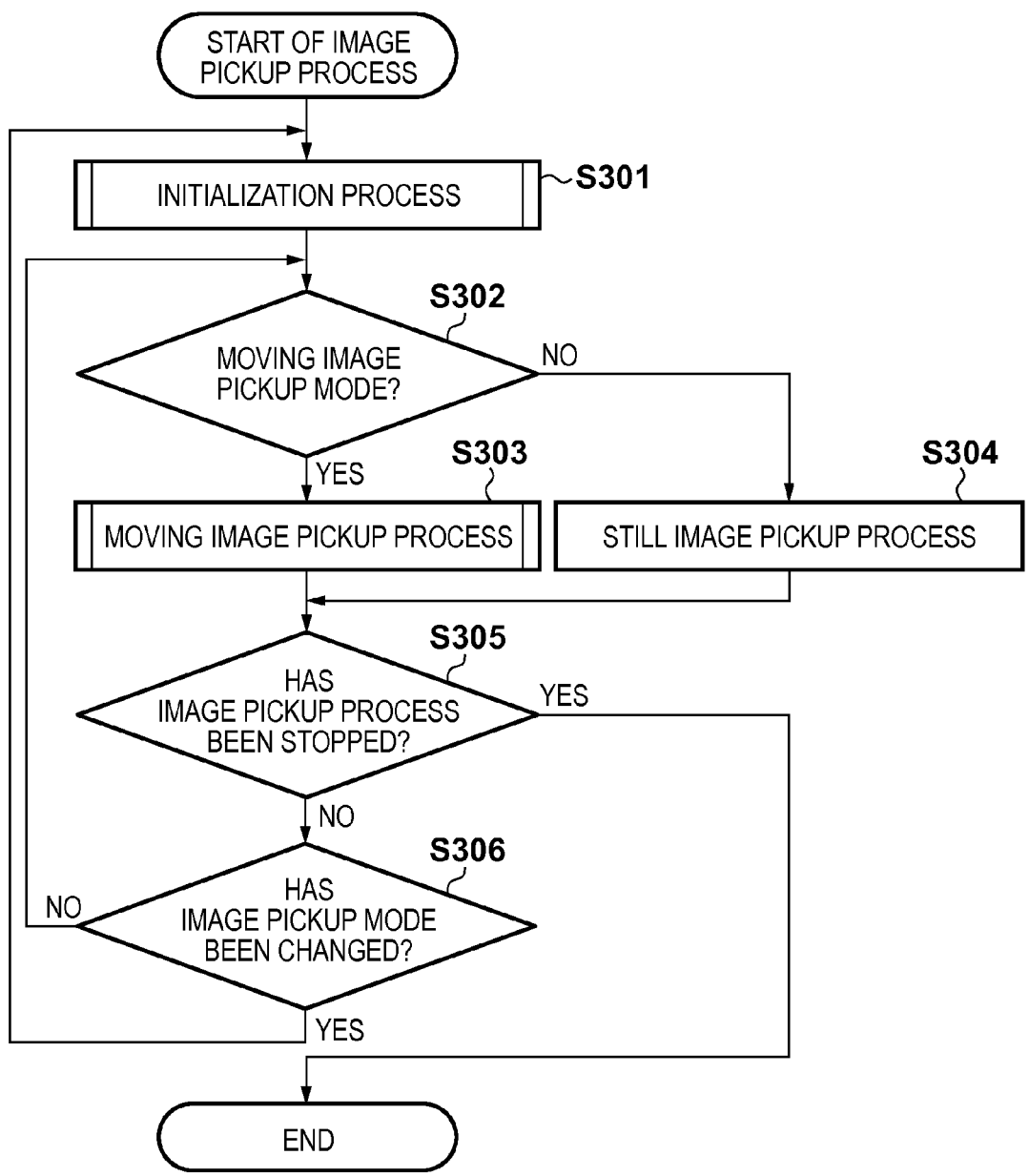
FIG. 3 is a flowchart showing an image pickup process in the first embodiment.

Exemplary embodiments of the present invention will now be described in detail in accordance with the accompanying drawings. Note that the embodiments below are only for illustrative purposes and are in no way intended to limit the present invention.

(First Embodiment)

FIG. 1 is a block diagram showing an example functional configuration of an interchangeable-lens camera that is an example image pickup apparatus according to a first embodiment of the present invention.

The image pickup apparatus of this embodiment includes an interchangeable lens unit 10 and a camera body 20. A lens control unit 106 that controls and coordinates the operations of all lenses, and a camera control unit 212 that coordinates the operation of the overall camera system including the lens unit 10, can communicate with each other through a terminal provided on a lens mount.

Firstly, a configuration of the lens unit 10 will be described. A fixed lens 101, a diaphragm 102, and a focusing lens 103 constitute an imaging optical system. The diaphragm 102 is driven by a diaphragm drive unit 104 to control the amount of light entering an image sensor 201 described below. The focusing lens 103 is driven by a focusing lens drive unit 105 so that the focal length of the imaging optical system varies depending on the position of the focusing lens 103. The diaphragm drive unit 104 and the focusing lens drive unit 105 are controlled by the lens control unit 106 to determine the size of the aperture of the diaphragm 102 or the position of the focusing lens 103.

A lens operation unit 107 is a group of input devices that are used by the user to specify settings related to the operation of the lens unit 10, such as the switchable AF and MF modes, the shooting distance range, the image stabilization mode, etc. When the lens operation unit 107 is operated, the lens control unit 106 performs a control according to the operation.

The lens control unit 106 controls the diaphragm drive unit 104 or the focusing lens drive unit 105 according to a control command or control information received from the camera control unit 212 described below, and transmits lens control information to the camera control unit 212.

Next, a configuration of the camera body 20 will be described. The camera body 20 is configured to obtain a picked-up image signal from light flux that has passed through the imaging optical system of the lens unit 10.

The image sensor 201 includes a CCD or CMOS sensor. The light flux entering from the imaging optical system of the lens unit 10 is caused to form an image on a light receiving surface of the image sensor 201, and is then converted into signal charge corresponding to the amount of entering light by photodiodes provided in an array of pixels of the image sensor 201. The signal charge accumulated in each photodiode is successively read out as a voltage signal corresponding to the signal charge from the image sensor 201 by drive pulses that are output by a timing generator 215 according to an instruction from the camera control unit 212.

In the image sensor 201 of this embodiment, each individual pixel, which includes two photodiodes, can generate an image signal that is used in automatic focusing performed by a phase-detection-on-imaging-surface method (hereinafter referred to as phase-detection AF on an imaging surface). FIG. 2A schematically shows an example configuration of pixels that does not support the phase-detection AF on an imaging surface. FIG. 2B schematically shows an example configuration of pixels that supports the phase-detection AF on an imaging surface. Note that, here, in either case, a Bayer array of primary color filters is assumed to be provided. In the pixel configuration of FIG. 2B supporting the phase-detection AF on an imaging surface, each pixel of FIG. 2A is divided into two portions in the horizontal direction in the drawing. Two photodiodes (light receiving areas) A and B are provided in the two portions, respectively. Note that the division method of FIG. 2B is only for illustrative purposes, and other methods may be used, or different pixels may be divided by different methods.

The light flux entering each pixel can be separated by microlenses and then received by the two photodiodes provided in the pixel to obtain two signals per pixel, one for image pickup and the other for AF. Specifically, signals (A, B) obtained by the two photodiodes A and B (pixels A and B) in each pixel are two image signals for AF (also referred to as AF image signals or AF signals), and a sum signal (A+B) is a picked-up image signal. Note that, similar to the typical phase-detection AF, in which a pair of image signals are generated by a pair of line sensors each including a plurality of pixels, a pair of image signals used in phase-detection AF on an imaging surface are obtained by a plurality of the pixels A and a plurality of the pixels B, respectively. An AF signal processing unit 204 described below performs correlation calculation on the two image signals based on the AF signals to calculate an image disparity amount or various items of reliability information.

A CDS/AGC/AD converter 202 performs correlated double sampling for removing reset noise, gain adjustment, and signal digitization on the picked-up image signal and the AF signals read from the image sensor 201. The CDS/AGC/AD converter 202 outputs the picked-up image signal to an image input controller 203, and the signals for phase-detection AF on an imaging surface to the AF signal processing unit 204.

The image input controller 203 stores the picked-up image signal output from the CDS/AGC/AD converter 202 into an SDRAM 209 through a bus 21. The image signal stored in the SDRAM 209 is read out by a display control unit 205 through the bus 21, and is then displayed on a display unit 206. In an operation mode in which the picked-up image signal is recorded, the image signal stored in the SDRAM 209 is recorded into a recording medium 208 by a recording medium control unit 207.

A ROM 210 stores a control program that is executed by the camera control unit 212, various items of data required for control, etc. A flash ROM 211 stores various items of setting information etc. related to the operation of the camera body 20, such as user setting information etc.

The AF signal processing unit 204 performs correlation calculation on the two AF image signals output from the CDS/AGC/AD converter 202 to calculate an image disparity amount, reliability information (the degree of two-image coincidence, the degree of two-image steepness, contrast information, saturation information, damage information, etc.). The AF signal processing unit 204 outputs the calculated image disparity amount and reliability information to the camera control unit 212.

The camera control unit 212 changes settings of the AF signal processing unit 204, when necessary, based on the image disparity amount or reliability information calculated by the AF signal processing unit 204. For example, when the image disparity amount is larger than or equal to a predetermined amount, an area in which the correlation calculation is performed is set to be large, or the type of a band-pass filter is changed, depending on the contrast information. The correlation calculation will be described in detail below with reference to FIG. 7A to 9B.

Note that, in this embodiment, a total of three signals that are the picked-up image signal and the two AF image signals are obtained from the image sensor 201. The present invention is not limited to this. In order to reduce the load of the image sensor 201, for example, a total of two signals that are the picked-up image signal and one of the two AF image signals may be extracted, and a difference between the picked-up image signal and the AF signal may be used as another AF image signal.

The camera control unit 212 controls functional blocks in the camera body 20 by exchanging information. In addition to the process in the camera body 20, the camera control unit 212 performs camera functions operated by the user, such as ON/OFF of power supply, changing of settings, start of recording, start of AF control, checking of recorded video, etc., depending on an input from a camera operation unit 214. The camera control unit 212 also sends a control command and control information for the lens unit 10 to the lens control unit 106, and receives information about the lens unit 10 from the lens control unit 106.

The camera control unit 212 includes, for example, one or more programmable processors. For example, by executing the control program stored in the ROM 210, the camera control unit 212 implements an operation of the entire camera system including the lens unit 10.

A lens drive speed setting unit 213 serves as a portion of the functionality of the camera control unit 212, and determines the drive speed of the focusing lens 103 by means of the lens control unit 106 and the focusing lens drive unit 105 included in the lens unit 10. This will be described in detail below with reference to a flowchart for describing a control of the camera body 20.

Conventionally, it is usual to use digital cameras mainly for shooting still images, and camcorders for shooting moving images. There has in recent years been an increasing demand for a digital camera with the function of shooting moving images. Therefore, there have been an increasing number of lenses suitable for shooting moving images, whose drive speed can be set with a high flexibility ranging from a low speed to a high speed. The present invention is particularly effective in using such lenses.

The lens drive speed setting unit 213 obtains, from the lens control unit 106 included in the lens unit 10, information about whether or not the lens unit 10 can be set to low-speed drive, through the camera control unit 212. The lens drive speed setting unit 213, when determining that the lens unit 10 can be set to low-speed drive, performs the drive method of this embodiment. On the other hand, the lens drive speed setting unit 213, when determining that the lens unit 10 cannot be set to low-speed drive, performs a conventional drive method.

Next, an operation of the camera body 20 will be described with reference to FIGS. 3 to 17.

FIG. 3 is a flowchart showing steps of an image pickup process of the camera body 20. In step S301, the camera control unit 212 performs an initialization process, and then control proceeds to step S302. The initialization process will be described in detail with reference to FIG. 4. In step S302, the camera control unit 212 determines whether the image pickup mode of the camera body 20 is the moving image pickup mode or the still image pickup mode. If the image pickup mode is the moving image pickup mode, control proceeds to step S303, and if the image pickup mode is the still image pickup mode, control proceeds to step S304. In step S303, the camera control unit 212 performs a moving image pickup process, and then control proceeds to step S305. The moving image pickup process of step S303 will be described in detail below with reference to FIG. 5. If the image pickup mode is the still image pickup mode in step S302, in step S304 the camera control unit 212 performs a still image pickup process, and then control proceeds to step S305. The still image pickup process of step S304 will not be described in detail.

In step S305 following the moving image pickup process of step S303 or the still image pickup process of step S304, the camera control unit 212 judges whether or not the image pickup process has been stopped. If the judgment result is negative, control proceeds to step S306, and otherwise, the image pickup process is ended. The image pickup process is stopped, for example, when the camera body 20 is turned off, or when an operation other than shooting, such as a user setting process, a playback process for checking a shot still image or moving image, etc., is performed on the camera. In step S306 following step S305 if the judgment result is negative, the camera control unit 212 judges whether or not the image pickup mode has been changed. If the judgment result is positive, control proceeds to step S301, and otherwise, control proceeds back to step S302. If the image pickup mode has not been changed, the camera control unit 212 continues to perform the process of the current image pickup mode. If the image pickup mode has been changed, in step S301 the camera control unit 212 performs the initialization process and then the process of the newly selected image pickup mode.

Figure 4:
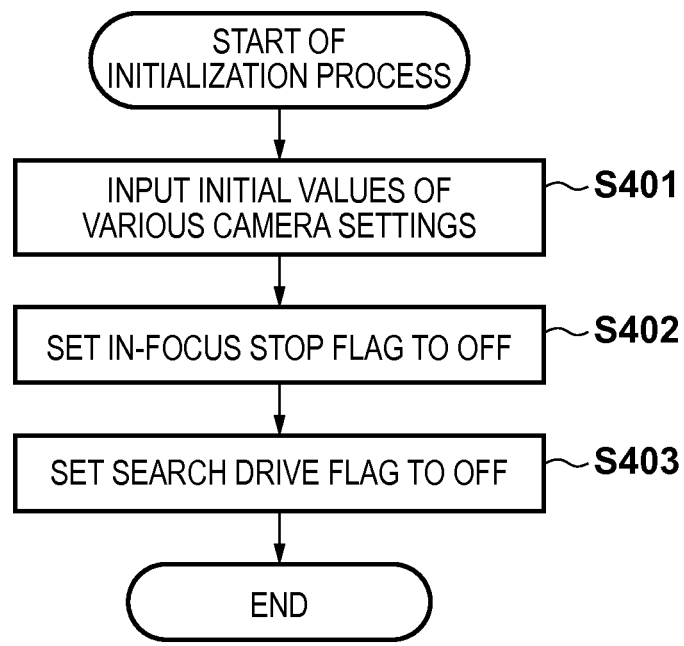
FIG. 4 is a flowchart showing an initialization process in the first embodiment.

Next, the initialization process of step S301 of FIG. 3 will be described with reference to a flowchart shown in FIG. 4. In step S401, the camera control unit 212 sets various initial values of the camera, and then control proceeds to step S402. The camera control unit 212 sets the initial values based on information about the user settings, the image pickup mode, etc. that is obtained when the image pickup process is started or the image pickup mode is changed. In steps S402 and S403, the camera control unit 212 initializes flags that are used in this embodiment. In step S402, the camera control unit 212 sets an in-focus stop flag to "off," and then control proceeds to step S403. In step S403, the camera control unit 212 sets a search drive flag to "off," and ends the process.

The in-focus stop flag, that is initialized in step S402, has a value "on" when it has been determined that the lens is at the in-focus position and the lens is stopped during shooting of a moving image, and a value "off" when it has been determined that the lens is not at the in-focus position and the lens is being driven. The search drive flag, which is initialized in step S403, has a value "off" when the defocus amount detected by the phase-detection-on-imaging-surface method during driving of the lens is reliable, and a value "on" when the defocus amount is not reliable.

The defocus amount is reliable not only when it can be judged that the accuracy of the defocus amount is reliable, but also when it can be judged that the defocus direction is reliable, i.e., when the reliability is higher than a predetermined level. For example, this is when it can be judged that a main subject is nearly in focus or when a main subject is already in focus. In such a state, assuming that the defocus amount is reliable, the focusing lens is driven based on the defocus amount.

On the other hand, the defocus amount is not reliable, when neither the defocus amount nor the defocus direction (e.g., represented by the sign of the defocus amount) can be judged to be reliable, i.e., the reliability is lower than a predetermined level. For example, this is when the defocus amount cannot be correctly calculated, e.g., a main subject is significantly blurred. In this case, if the focusing lens is driven, assuming that the defocus amount is reliable, the image quality of a picked-up moving image is affected. Therefore, search drive (the focusing lens is driven a predetermined amount at a time in a predetermined direction irrespective of the defocus amount to search for a subject) is performed.

Figure 5:
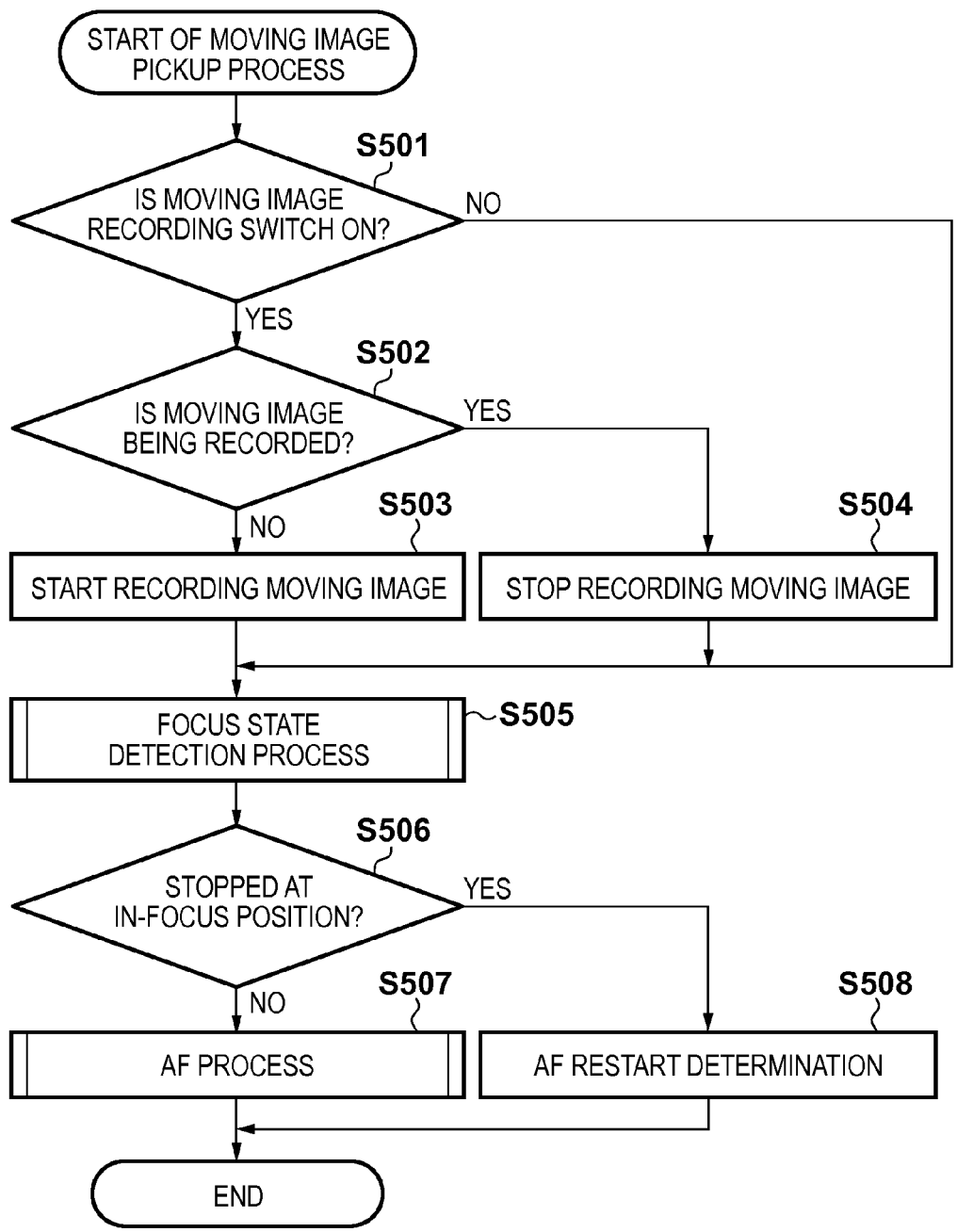
FIG. 5 is a flowchart showing a moving image pickup process in the first embodiment.

Next, the moving image pickup process of step S303 of FIG. 3 will be described with reference to FIG. 5. In steps S501 to S504, the camera control unit 212 performs a control involved in recording of a moving image. In step S501, the camera control unit 212 judges whether or not a moving image recording switch is on. If the judgment result is positive, control proceeds to step S502, and otherwise, control proceeds to step S505. In step S502, the camera control unit 212 judges whether or not a moving image is being currently recorded. If the judgment result is negative, recording of a moving image is started in step S503, and then control proceeds to step S505, and otherwise, recording of a moving image is stopped in step S504, and then control proceeds to step S505. In this embodiment, the moving image recording is alternately started and stopped every time the moving image recording switch is pressed down. Alternatively, different buttons may be used to start and stop recording, or recording may be started and stopped by other methods, e.g., use of a toggle switch etc.

In step S505, the camera control unit 212 performs a focus state detection process, and then control proceeds to step S506. The focus state detection process is a process of obtaining defocus information and reliability information for performing phase-detection AF on an imaging surface, which is performed by the camera control unit 212 and the AF signal processing unit 204. The focus state detection process will be described in detail below with reference to FIG. 6. In step S506 following the focus state detection process of step S505, the camera control unit 212 judges whether or not the focusing lens is currently stopped at the in-focus position. If the judgment result is negative, control proceeds to step S507, and otherwise, control proceeds to step S508. It can be judged whether or not the focusing lens is currently stopped at the in-focus position, by judging whether the above in-focus stop flag is on or off. In step S507 following step S506 if it is judged that the focusing lens is not currently stopped at the in-focus position, the camera control unit 212 performs an AF process and ends the moving image pickup process. In step S507, an AF control is performed based on the information detected in step S505, and will be described in detail below with reference to FIG. 12. In step S508 following step S506 if it is judged that the focusing lens is currently stopped at the in-focus position, the camera control unit 212 determines whether to restart AF, and ends the moving image pickup process. In step S508, a determination is made as to whether to restart an AF control, assuming that a main subject is moved or changed from the in-focus state, and this will be described in detail below with reference to FIG. 11.

Next, the focus state detection process of step S505 of FIG. 5 will be described with reference to FIG. 6. Initially, in step S601, the AF signal processing unit 204 obtains a pair of AF image signals from pixels located within any predetermined focus detection range. Next, in step S602, the AF signal processing unit 204 calculates the degree of correlation between the obtained image signals. Next, in step S603, the AF signal processing unit 204 calculates a correlation change amount from the degree of correlation calculated in step S602. Thereafter, in step S604, the AF signal processing unit 204 calculates an out-of-focus amount from the correlation change amount. In step S605, the AF signal processing unit 204 calculates a reliability that indicates how reliable the out-of-focus amount is. These processes are performed the same number of times as there are focus detection areas in the focus detection range. Thereafter, in step S606, the AF signal processing unit 204 converts the out-of-focus amount into a defocus amount for each focus detection area. Finally, in step S607, the AF signal processing unit 204 determines a focus detection area that is to be used in AF, and ends the focus state detection process.

The focus state detection process described with reference to FIG. 6 will be described in greater detail with reference to FIGS. 7A to 9B.

FIGS. 7A to 7C are diagrams schematically showing an example focus detection range and focus detection areas that are handled in the focus state detection process.

FIG. 7A shows an example focus detection range 1502 of a pixel array 1501 of the image sensor 201. A shift area 1503 is an area required for the correlation calculation. Therefore, an area 1504 that is the combination of the focus detection range 1502 and the shift area 1503 is a pixel area required for the correlation calculation. In FIG. 7A, p, q, s, and t represent coordinates in the x-axis direction, p and q represent the x coordinates of the start and end points, respectively, of the pixel area 1504, and s and t represent the x coordinates of the start and end points, respectively, of the focus detection range 1502.

FIG. 7B is a diagram showing an example of the focus detection range 1502 that is divided into five focus detection areas 1505 to 1509. In this embodiment, an out-of-focus amount is calculated for each of the focus detection areas that are obtained by dividing a focus detection range, and the most reliable out-of-focus amount is used.

FIG. 7C is a diagram showing a temporary focus detection area that is obtained by linking the focus detection areas 1505 to 1509 of FIG. 7B together. An out-of-focus amount that is calculated from the area thus obtained by linking the focus detection areas together may be used. The arrangement of the focus detection areas, the size of the area obtained by linking the focus detection areas, etc. are not limited to those of the example described herein, and other arrangement, size, etc. may be used.

Figure 8A:
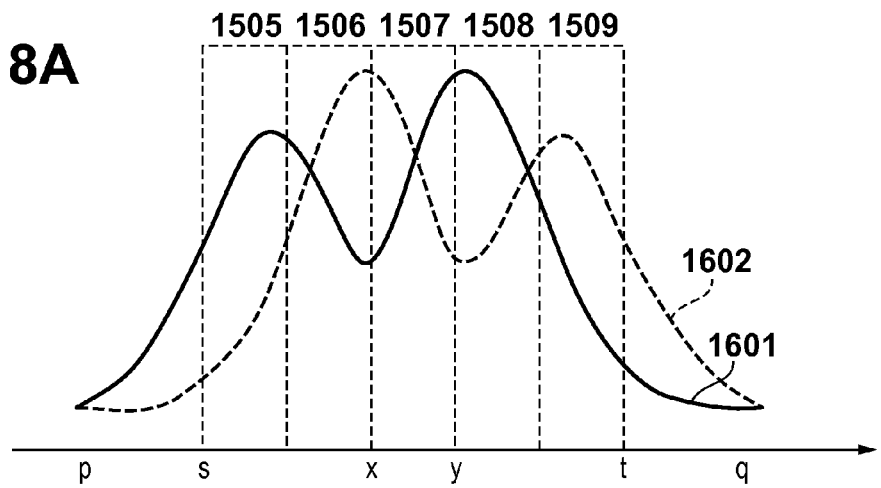
FIGS. 8A to 8C are diagrams showing example image signals obtained from the focus detection areas of FIGS. 7A to 7C.
Figure 8B:
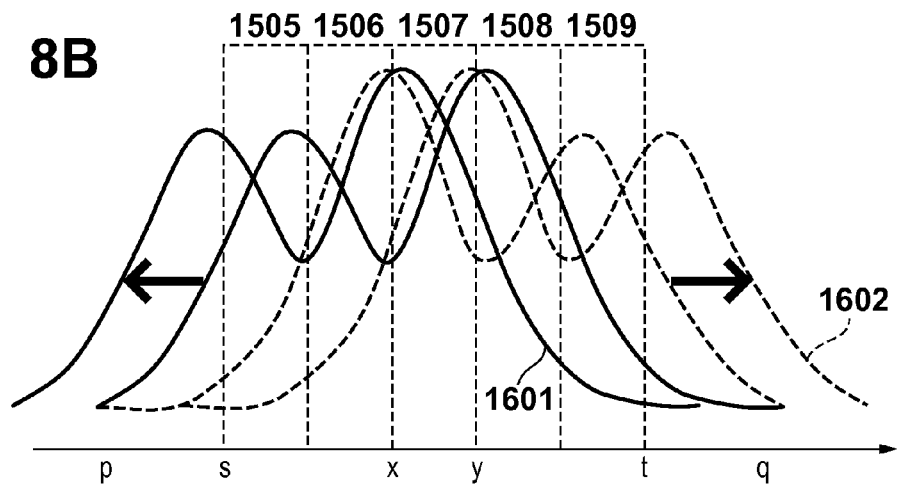
Figure 8C:
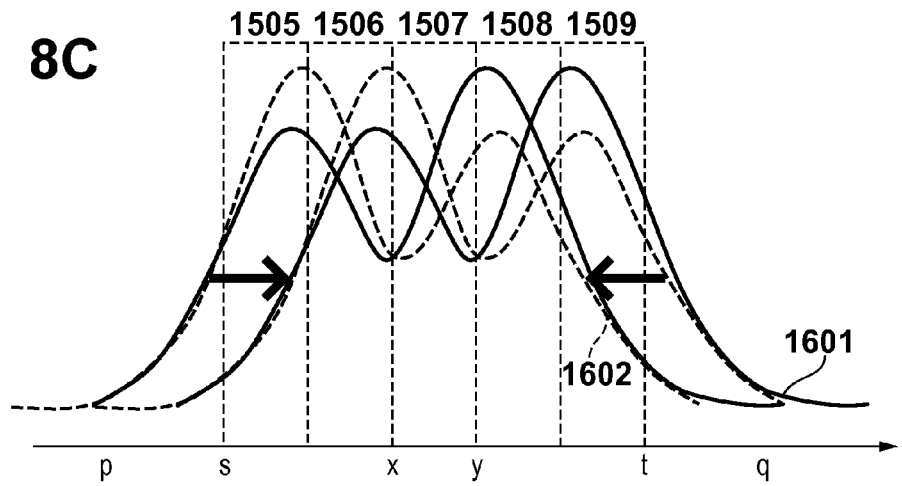

FIGS. 8A to 8C show example AF image signals that are obtained from pixels contained in the focus detection areas 1505 to 1509 of FIGS. 7A to 7C. A solid line 1601 indicates an image signal A, and a dashed line 1602 indicates an image signal B.

FIG. 8A shows example image signals before being shifted.

FIGS. 8B and 8C show waveforms of the image signals of FIG. 8A that have been shifted in the positive and negative directions. When the degree of correlation is calculated, both the image signal A (1601) and the image signal B (1602) are shifted by one bit in respective directions indicated by arrows. Next, a method for calculating the degree of correlation COR will be described above.

Initially, as shown in FIGS. 8B and 8C, the image signal A (1601) and the image signal B (1602) are each shifted by one bit, and the sum of the absolute values of differences between the image signals A and B at that time is calculated. In this case, the amount of the shift is represented by "i," and the minimum shift amount is "p−s" in FIGS. 8A to 8C, and the maximum shift amount is "q−t" in FIGS. 8A to 8C. The start coordinate of the focus detection area 1508 is represented by "x," and the end coordinate of the focus detection area 1508 is represented by "y." By using these values, the degree of correlation COR in the focus detection area 1508 can be calculated by:

$$COR[i] = \sum_{k=x}^{y} |A[k+i] - B[k-i]| \quad (1)$$

$$\{(p-s) < i < (q-t)\}$$

Figure 9A:
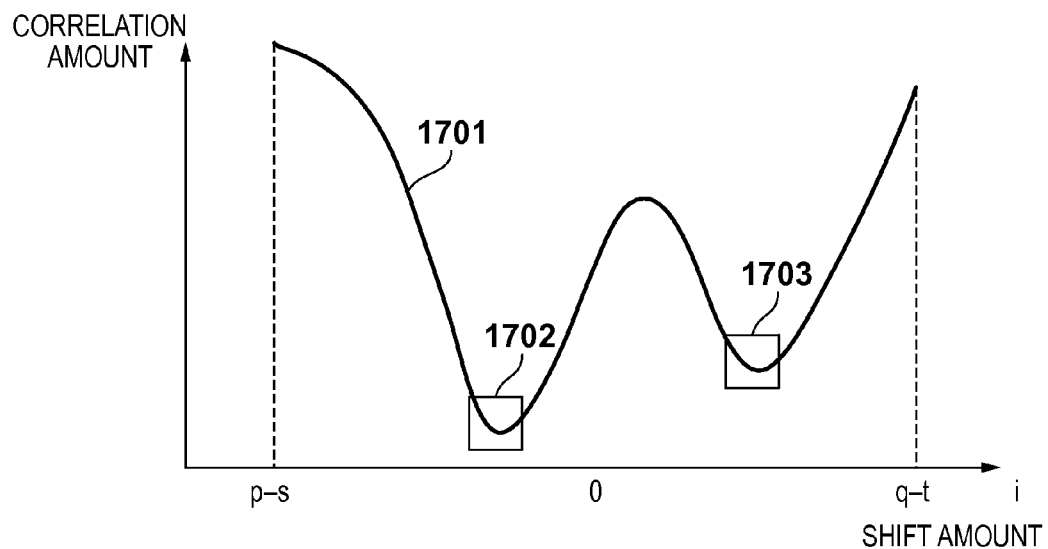
FIGS. 9A and 9B are diagrams showing an example relationship between the shift amounts of the image signals of FIGS. 8A to 8C and the degree of correlation.

FIG. 9A is a diagram showing an example relationship between the shift amount and the degree of correlation. The horizontal axis represents the shift amount, and the vertical axis represents the degree of correlation. Of portions 1702 and 1703 in the vicinity of the extreme of a correlation degree waveform 1701, one having the smaller degree of correlation having the higher degree of coincidence between the image signals A and B. Next, a method for calculating the correlation change amount ΔCOR will be described.

Initially, from the correlation degree waveform of FIG. 9A, a correlation change amount is calculated based on a difference between the degrees of correlation of every second shift. The amount of the shift is represented by "i," and the minimum shift amount is "p−s" in FIGS. 8A to 8C, and the maximum shift amount is "q−t" in FIGS. 8A to 8C. By using these values, the correlation change amount ΔCOR can be calculated by:

$$\Delta COR[i] = COR[i-1] - COR[i+1]$$

$$\{(p-s+1) \le i \le (q-t-1)\} \quad (2)$$

Figure 10A:
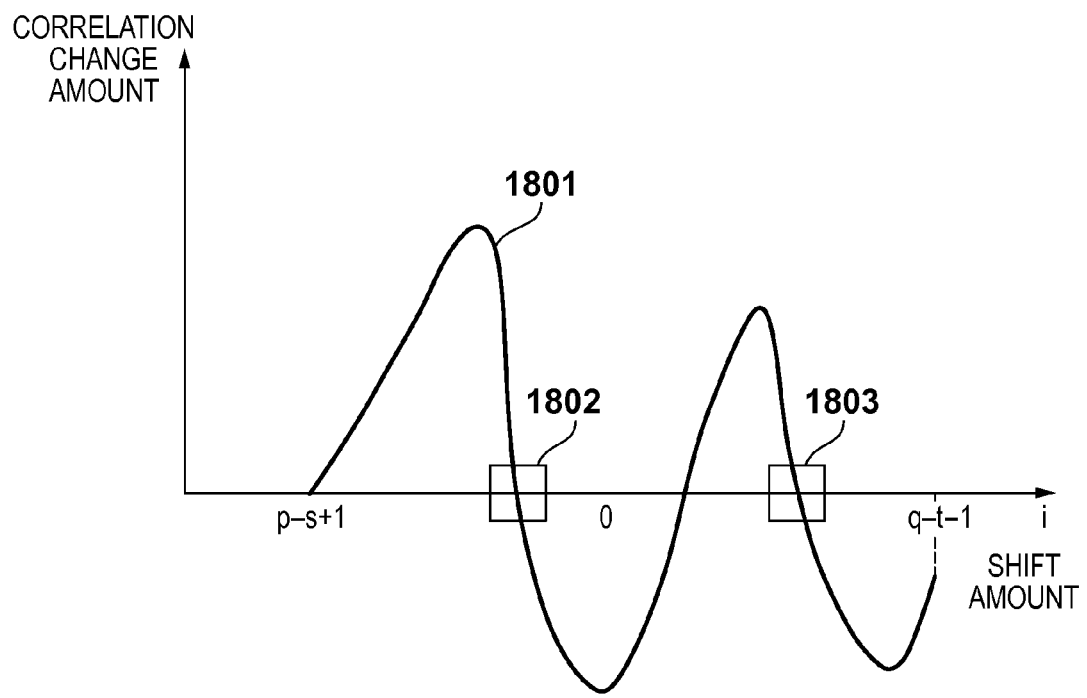
FIGS. 10A and 10B are diagrams showing a relationship between the shift amounts of the image signals of FIGS. 8A to 8C and a correlation change amount ΔCOR.

FIG. 10A is a diagram showing an example relationship between the shift amount and the correlation change amount ΔCOR. The horizontal axis represents the shift amount, and the vertical axis represents the correlation change amount ΔCOR. The correlation change amount waveform is indicated by a reference character 1801, and portions thereof in the vicinity of points where the correlation change amount changes from positive to negative values are indicated by reference characters 1802 and 1803. A state in which the correlation change amount is zero is called a "zero cross," where the degree of coincidence between image signals is highest. The shift amount having a zero cross is an out-of-focus amount.

Figure 10B:
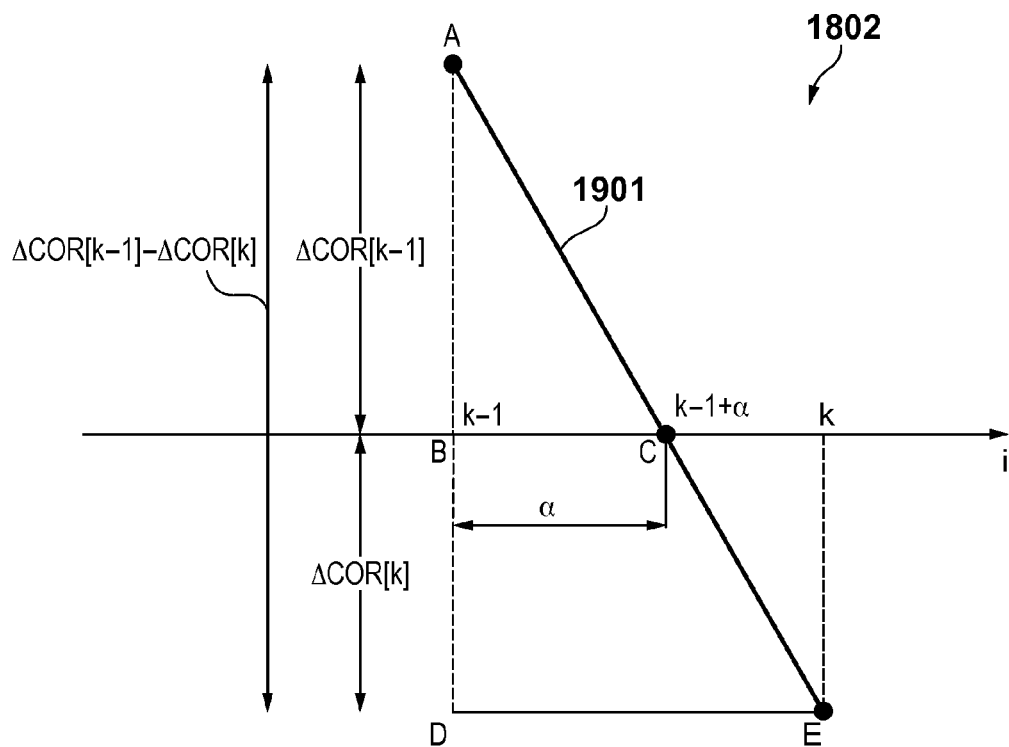

FIG. 10B is a partially enlarged view of the portion 1802 of FIG. 10A. A reference character 1901 indicates a portion of the correlation change amount waveform 1801. A method for calculating an out-of-focus amount PRD will be described with reference to FIG. 10B.

Here, a shift amount (k−1+α) having a zero cross is divided into the whole number part β (=k−1) and the fractional part α. The fractional part α is calculated, based on that triangles ABC and ADE in FIG. 10B are similar to each other, by:

$$AB:AD = BC:DE \quad (3)$$

$$\Delta COR[k-1] : \Delta COR[k-1] - \Delta COR[k] = \alpha : k - (k-1)$$

$$\alpha = \frac{\Delta COR[k-1]}{\Delta COR[k-1] - \Delta COR[k]}$$

Next, the whole number part β can be calculated based on FIG. 10B by:

$$\beta = k - 1 \quad (4)$$

The out-of-focus amount PRD can be calculated from the sum of α and β.

When there are a plurality of shift amounts having a zero cross as shown in FIG. 10A, a zero cross having a high degree of steepness of a change in the degree of correlation is defined as a first zero cross. The steepness degree is an index that represents the degree of ease of AF. The ease of AF increases with an increase in the steepness degree. The steepness degree "max der" can be calculated by:

$$\text{max der} = |\Delta COR[k-1]| + |\Delta COR[k]| \quad (5)$$

As described above, when there are a plurality of zero crosses, the first zero cross is determined based on the steepness degree. Next, a method for calculating the reliability of the out-of-focus amount will be described.

The reliability can be defined using the above steepness degree or the degree of coincidence fnclvl between the image signals A and B (hereinafter referred to as a "two-image coincidence degree"). The two-image coincidence degree is an index indicating the accuracy of the out-of-focus amount. The accuracy increases with an increase in the two-image coincidence degree.

Figure 9B:
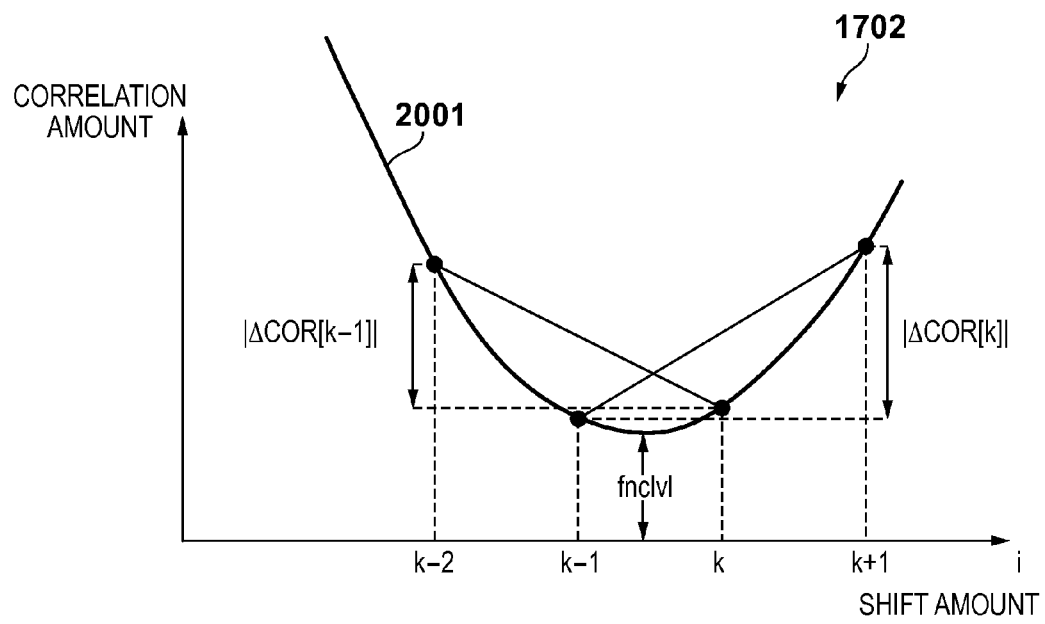

FIG. 9B is a partially enlarged view of the portion 1702 of FIG. 9A. A reference character 2001 indicates a portion of the correlation degree waveform 1701. A method for calculating the steepness degree and the two-image coincidence degree will be described with reference to FIG. 9B.

The two-image coincidence degree fnclvl can be calculated by:

(i) $\text{fnclvl} = COR[k-1] + \Delta COR[k-1]/4$ when $|\Delta COR[k-1]| \times 2 \le \text{max der}$ (ii) $\text{fnclvl} = COR[k] - \Delta COR[k]/4|$ when $|\Delta COR[k-1]| \times 2 > \text{max der} \quad (6)$ As described above, in this embodiment, the drive speed of the focusing lens is set, depending on the reliability of the defocus amount. The phase-detection AF on an imaging surface has a characteristic feature that the reliability, such as the two-image coincidence degree, the steepness degree, etc., decreases with an increase in the out-of-focus amount, compared to the conventional phase-detection AF that uses a dedicated AF sensor. This is because, in the phase-detection AF on an imaging surface, a difference occurs between the amounts of light entering the pupils A and B that generate the image signals A and B, respectively, and therefore, the image signals A and B are asymmetrical to each other. In this embodiment, this characteristic feature of the phase-detection AF on an imaging surface is used to set the drive speed of the focusing lens. This will be described in detail below with reference to FIG. 13. Although, in this embodiment, the two-image coincidence degree is used as the reliability of the defocus amount, the steepness degree, or other information that can be used as an index indicating the reliability of the out-of-focus amount, may be used. These indexes may be used in combination.

Figure 11:
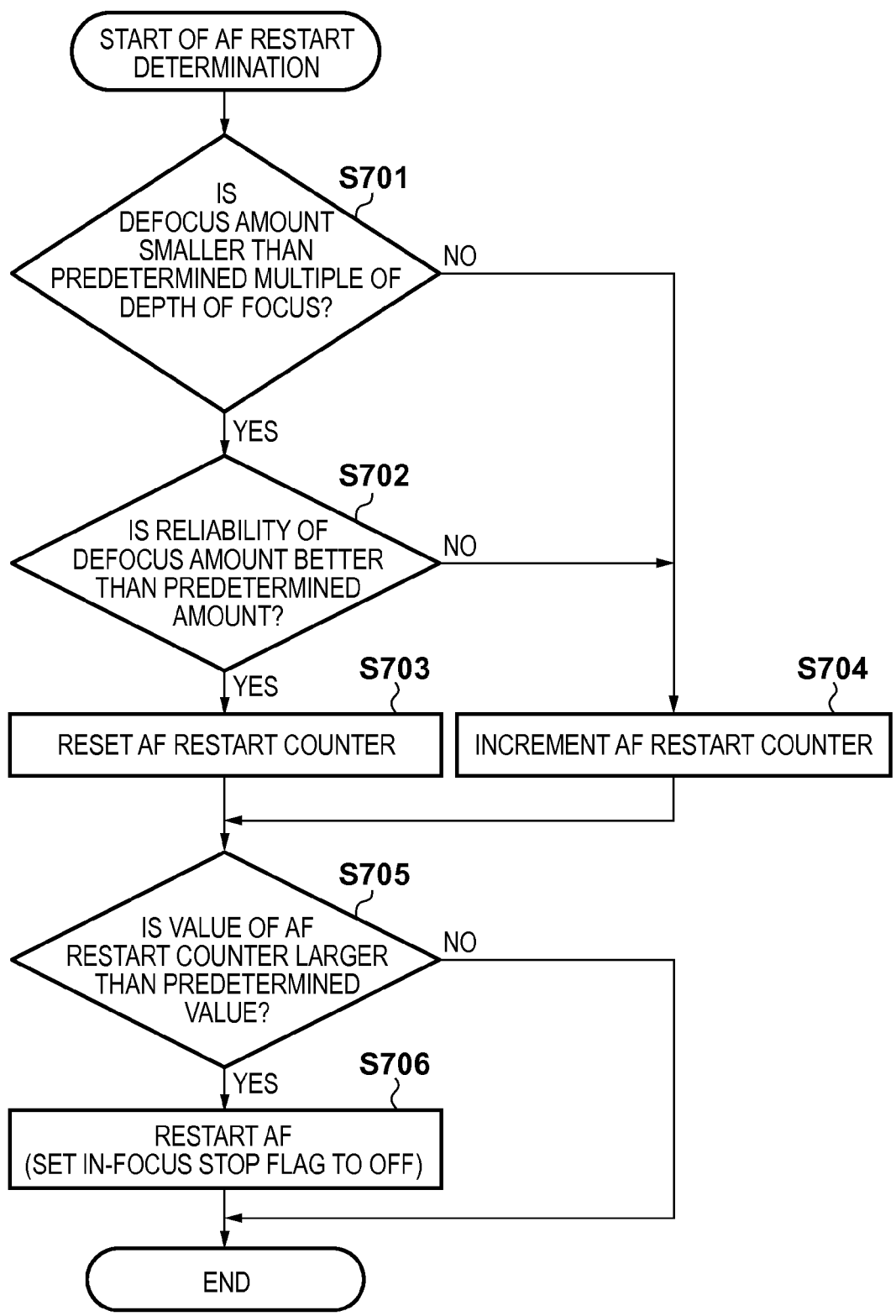
FIG. 11 is a flowchart showing an AF restart determination process of step S508 of FIG. 5.

Next, the AF restart determination of step S508 of FIG. 5 will be described with reference to a flowchart shown in FIG. 11. The AF restart determination is a process of determining whether to drive the focusing lens 103 again when the focusing lens 103 is currently stopped because the focusing lens 103 has been judged to be in focus.

In step S701, the camera control unit 212 judges whether or not the defocus amount calculated by the AF signal processing unit 204 is smaller than a predetermined multiple of the depth of focus. If the judgment result is positive, control proceeds to step S702, and otherwise, control proceeds to step S704. In step S702, the camera control unit 212 judges whether or not the reliability calculated by the AF signal processing unit 204 is better than a predetermined value. If the judgment result is positive, control proceeds to step S703, and otherwise, control proceeds to step S704. In step S703, the camera control unit 212 rests an AF restart counter, and then control proceeds to step S705. In step S704, the camera control unit 212 increments the AF restart counter, and then control proceeds to step S705.

As described above, when the defocus amount is larger than or equal to a predetermined amount or when the reliability of the defocus amount is worse than a predetermined value, the camera control unit 212 judges that a main subject being shot has been changed, and prepares to restart AF (i.e., drive the focusing lens 103 again). On the other hand, if the camera control unit 212 judges that a main subject has not been changed, based on the magnitude and reliability of the defocus amount, the camera control unit 212 does not restart AF (i.e., maintains the rest state of the focusing lens 103).

The threshold of the defocus amount set in step S701 is empirically or experimentally set so that AF is restarted when a main subject has been changed and it is difficult to restart AF when a main subject has not been changed. The threshold of the reliability set in step S702 is set so that AF is restarted when the reliability is low enough to cause it to be difficult to determine that the defocus direction is reliable, for example. Thus, it can be said that the determination in steps S701 and S702 is a process of determining whether or not a main subject has been changed. Therefore, the above process may be replaced with any process that performs similar determination. The type or value of the threshold may be set, depending on the process.

In step S705, the camera control unit 212 judges whether or not the value of the AF restart counter is larger than a predetermined value. If the judgment result is positive, control proceeds to step S706, and otherwise, the AF restart determination process is ended. In step S706, the camera control unit 212 sets the in-focus stop flag to "off" to end the AF restart determination process. In order to determine in step S706 to restart AF, the camera control unit 212 judges in step S705 whether or not the value of the AF restart counter incremented in step S704 is larger than the predetermined value. To increment the AF restart counter and determine the value of the AF restart counter allows the camera control unit 212 to determine whether or not a main subject has been changed, based on a statistical amount of results of determination obtained over a predetermined period, instead of one-time determination of the size or reliability of the defocus amount. Thus, the influence on the image quality of the situation that, although a main subject has not been actually changed, it is judged based on just a temporary change in the magnitude or reliability of the defocus amount that the main subject has been changed, and therefore, AF is restarted, can be reduced or prevented.

Next, the AF process of step S507 of FIG. 5 will be described with reference to a flowchart shown in FIG. 12. The AF process is a process of driving the focusing lens that is not stopped at the in-focus position, and determining whether or not the focusing lens is at the in-focus position.

In step S801, the camera control unit 212 judges whether or not the lens unit 10 supports the low-speed drive setting, based on the lens information obtained from the lens control unit 106. If the judgment result is positive, control proceeds to step S802, and otherwise, control proceeds to step S806. In step S806, the camera control unit 212 performs an AF process on a lens that does not support the low-speed drive setting, and ends the process. As described above, this embodiment is particularly effective when being applied to a lens that is suitable for shooting of a moving image in a wide range of drive speed from a low speed to a high speed, and therefore, step S806 will not be described in detail.

In step S802, the camera control unit 212 judges whether or not the magnitude of the defocus amount is within the depth of focus and the reliability of the defocus amount is better than a predetermined value. If the judgment result is positive, control proceeds to step S803, and otherwise, control proceeds to step S804. In step S803, the camera control unit 212 judges that the defocus amount is within the depth of focus and the reliability is high, and therefore, the focusing lens is in focus, and sets the in-focus stop flag to "on," and ends the process. The threshold of the reliability set in step S802 is set to a value that ensures at least the accuracy of focus.

In step S804 following step S802 if the defocus amount is still within the depth of focus and the reliability is not better than the predetermined value, the camera control unit 212 specifies settings for lens drive, and then control proceeds to step S805. In step S804, the camera control unit 212 performs a lens drive setting process that is a characteristic feature of this embodiment. Here, the drive speed of the focusing lens is set, the drive method is determined, etc. This will be described in detail below with reference to FIG. 13. In step S805 following step S804 in which the lens drive settings have been specified, the camera control unit 212 performs a lens drive process, and ends the AF process. The lens drive process of step S805 will be described in detail below with reference to FIG. 15.

Next, the lens drive setting of step S804 of FIG. 12 will be described using a flowchart shown in FIG. 13. In the lens drive setting of this embodiment, the drive speed of the focusing lens is set, depending on the reliability of the defocus amount.

In steps S901 to S910, the lens drive speed is set, and a search drive transition counter is incremented and reset. In step S901, it is judged whether or not the reliability is better than the predetermined value α (whether or not the reliability is higher than a predetermined reliability). If the judgment result is positive (the reliability is a first reliability), control proceeds to step S902, and otherwise, control proceeds to step S904. In step S902, the camera control unit 212 (the lens drive speed setting unit 213) resets a search drive counter, and then control proceeds to step S903. In step S903, the lens drive speed is then set to a lens drive speed A (first drive speed), and control proceeds to step S911.

In step S904 following step S901 if the reliability is not better than the predetermined value α (the reliability is not higher than the predetermined reliability), the camera control unit 212 judges whether or not the reliability is better than the predetermined value β (second reliability). If the judgment result is positive, control proceeds to step S905, and otherwise, control proceeds to step S907. In step S905, the camera control unit 212 resets the search drive transition counter, and then control proceeds to step S906. In step S906, the lens drive speed is set to a lens drive speed B (second drive speed), and then control proceeds to step S911.

Here, the threshold α of the reliability corresponds to a reliability better than that of the threshold β. In this embodiment, the two-image coincidence degree is used as an index for the reliability. Therefore, a smaller value indicates a better reliability, and the relative order of magnitude of the thresholds is α<β. When an index having a larger value indicating a better reliability is used, the relative order of magnitude of the thresholds is reversed.

The lens drive speed B is higher than the lens drive speed A (B>A). In other words, in this embodiment, as the reliability of the defocus amount becomes better, the lens drive speed is set to a lower drive speed (as the reliability of the defocus amount becomes worse, the lens drive speed is set to a higher drive speed). As described above, in the phase-detection-on-imaging-surface method, the distribution of pupil intensity for obtaining the image signals A and B is not uniform, and therefore, as the degree of blur of a main subject increases, the reliability of the defocus amount (the two-image coincidence degree, the steepness degree, etc.) decreases. In other words, it is considered that when the reliability of the defocus amount is low, a main subject is significantly blurred. Therefore, such a speed setting can provide a situation that as a subject is more blurred, the drive speed increases, and as the focusing lens is closer to the in-focus position, the lens drive speed decreases. Such a setting has, for example, the following advantages.

The time it takes to focus the focusing lens can be reduced. When the focusing lens is close to the in-focus position, the focusing lens is slowly moved. Therefore, the situation (overshoot) that the focusing lens is moved past the in-focus position can be reduced or prevented.

A more sophisticated focusing lens operation can be provided during shooting of a moving image (i.e., the quality of an image recorded during focusing can be improved).

Thus, basically, as the reliability of the defocus amount decreases, the focusing lens drive speed is set to a higher value. However, when the reliability is significantly poor, particularly when the defocus direction is not reliable, the speed is not set, depending on the reliability. In particular, when the defocus direction is not reliable, then if the focusing lens is driven based on the defocus amount, the image quality is likely to be significantly affected. This will be described with reference to FIG. 14A.

FIG. 14A is a diagram schematically showing a relationship between the focusing lens drive operation and the reliability of the defocus amount. In FIG. 14A, the horizontal direction represents the position of the focusing lens and the reliability of the defocus amount. FIG. 14A shows that when the defocus direction is not reliable, the focusing lens is driven based on the defocus amount, and also an example range within which the focusing lens is moved in that case. When even the defocus direction is not reliable, then if the focusing lens drive is performed based on the defocus amount, the focusing lens is likely to continue hunting, be driven in a direction away from the in-focus position, or be driven by an excessive defocus amount and therefore moved past the in-focus position.

Therefore, when the reliability is as low as the defocus direction is not reliable, then if the drive speed of the focusing lens is increased, an AF control that does not use the defocus amount is performed. Therefore, the reliability threshold β is set in step S904 to a value that allows at least the defocus direction, of the defocus direction and the defocus amount, to be determined to be reliable.

When it is judged in step S904 that the reliability of the defocus amount is as low as the defocus direction is not reliable (worse than β), the camera control unit 212 increments the search drive transition counter in step S907, and then control proceeds to step S908. In step S908, the camera control unit 212 judges whether or not the value of the search drive transition counter is larger than or equal to a predetermined value. If the judgment result is positive, control proceeds to step S909, and otherwise, control proceeds to step S910. In step S909 following step S908 if it is judged that the value of the search drive transition counter is larger than or equal to the predetermined value, the camera control unit 212 sets the search drive flag to "on," and then control proceeds to step S911. On the other hand, in step S910 following step S908 if it is judged that the value of the search drive transition counter is smaller than the predetermined value, the camera control unit 212 sets the focusing lens drive speed to a focusing lens drive speed Z (third drive speed), and then control proceeds to step S911. In step S911 following any of steps S903, S906, S909, and S910, the camera control unit 212 judges whether or not the search drive flag is "on." If the judgment result is positive, control proceeds to step S912, and otherwise, the lens drive setting process is ended. In step S912 following step S911 if it is judged that the search drive flag is "on," the camera control unit 212 sets the lens drive speed to a lens drive speed S (fourth drive speed), and ends the lens drive setting process.

The lens drive speeds set in FIGS. 9A to 9C have the following relationship:

$$Z<A<B<S$$

where Z is the lowest and S is the highest.

While the relationship between the drive speeds A and B has been described above, a relationship between all the drive speeds A, B, Z, and S will be described in detail. As described above, when the reliability of the defocus amount is as low as the defocus direction is not reliable, then if the focusing lens is driven, assuming that the defocus amount is reliable, a problem is likely to occur, and therefore, the focusing lens is driven by a method that does not depend on the defocus amount. In this embodiment, search drive is performed as a method that does not depend on the defocus amount. The search drive means that the focusing lens is driven within the drive range and in the set defocus direction, irrespective of the defocus amount, to search for a subject.

When it is judged in step S904 that the reliability is as low as the defocus direction is not reliable (<β), in step S907 the camera control unit 212 increments the search drive transition counter. The camera control unit 212 determines to transition to the search drive if a low reliability has been detected a predetermined number of times. As a result, the influence on image quality of tracking of a temporary decrease in the reliability is reduced or prevented while the reliability of the determination to transition to the search drive is ensured. When, in step S908, determining to transition to the search drive, in step S909 the camera control unit 212 sets the search drive flag to "on." When, in step S911, determining that the search drive flag is "on," the camera control unit 212 sets the focusing lens drive speed for the search drive to the focusing lens drive speed S. Because the search drive is performed when the reliability of the defocus amount is as low as the defocus direction is not reliable, a main subject may be significantly blurred. Therefore, in order to allow the focusing lens to be quickly moved to the in-focus position, the focusing lens drive speed S during the search drive is set to be higher than the drive speed B. The search drive process will be described in detail below with reference to a flowchart shown in FIG. 16.

When it has been judged in step S904 that the reliability is worse than the predetermined value β and a judgment is being made in step S908 as to whether to transition to the search drive, it is better not to perform the focusing lens drive, assuming that the defocus amount is reliable. Therefore, in step S910, the camera control unit 212 sets the focusing lens drive speed Z to zero (the focusing lens is stopped) or a speed that is low enough to cause the drive not to be noticeable. If the reliability continues to be worse than the predetermined value β, the camera control unit 212 transitions to the search drive, or if the reliability becomes better than the predetermined value β again (e.g., a subject goes past the front of the main subject, etc.), the camera control unit 212 continues to perform the drive based on the defocus amount.

FIG. 14B schematically shows a relationship between a method for driving the focusing lens that is used in this embodiment and the reliability of the defocus amount, and a movement of the focusing lens driven. In this embodiment, when the reliability of the defocus amount is not low (better than β), the focusing lens is driven based on the defocus amount, and the drive speed is set to be lower as the reliability increases. When the reliability of the defocus amount is low (worse than β), the drive speed is temporarily set to be low (including the case where the focusing lens is stopped) when a judgment is being made as to whether to transition to the search drive. At this time, as shown in FIG. 14B, the drive speed may be set to be lower as the reliability of the defocus amount decreases. When the camera control unit 212 determines to transition to the search drive, the drive speed is set to be high for the search drive. Therefore, in this embodiment, when a main subject is significantly blurred, the drive speed is set to be high so that the responsiveness of AF is increased. When the focusing lens is close to the in-focus position, the drive speed is set to be low. As a result, a more sophisticated focusing lens drive can be achieved.

Figure 15:
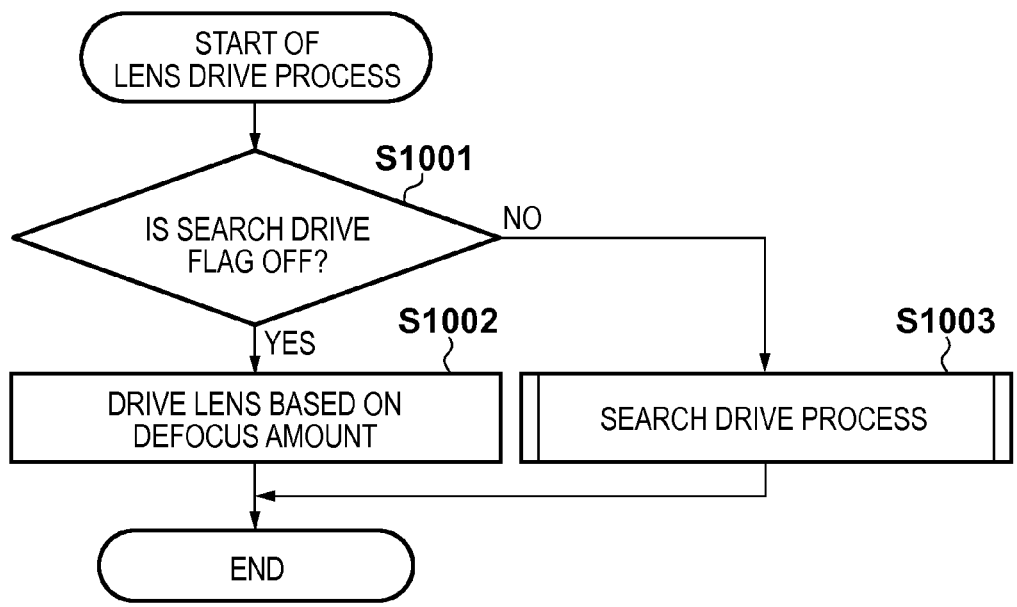
FIG. 15 is a flowchart showing a lens drive process of step S805 of FIG. 12.

Next, the lens drive process of step S805 of FIG. 12 will be described with reference to a flowchart shown in FIG. 15. The lens drive process is a process of driving the focusing lens 103 based on the drive speed, the search drive flag, etc. which are set by the lens drive setting process described with reference to FIG. 13.

In step S1001, the camera control unit 212 judges whether or not the search drive flag is "off." If the judgment result is positive, control proceeds to step S1002. In S1002, the focusing lens is driven based on the defocus amount at the drive speed set by the lens drive setting process, and the lens drive process is ended. Otherwise (the search drive flag is "on"), control proceeds to step S1003. In step S1003, the search drive process is performed, and the lens drive process is ended. The search drive process of step S1003 will be described below with reference to FIG. 16.

Figure 16:
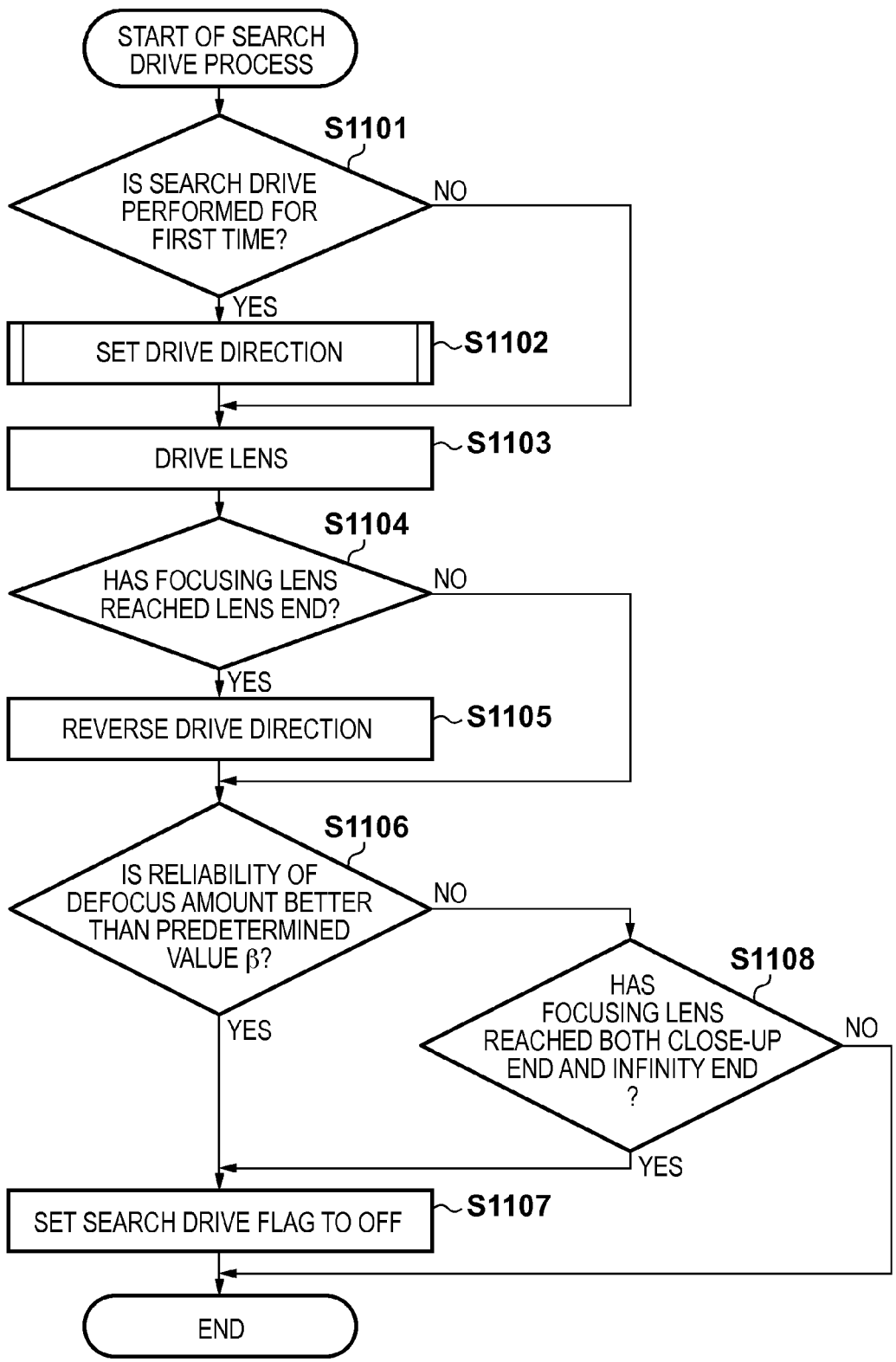
FIG. 16 is a flowchart showing a search drive process of step S1004 of FIG. 15.

Next, the search drive process of step S1003 of FIG. 15 will be described with reference to a flowchart shown in FIG. 16. The search drive process is a process that is performed when the search drive flag is set to "on" in step S909 of FIG. 13, and drives the focusing lens within the drive range at the drive speed set in step S912.

In step S1101, the camera control unit 212 judges whether or not the search drive is performed for the first time. If the judgment result is negative, control proceeds directly to step S1103, and otherwise, control proceeds step S1102 in which the drive direction is set, and then to step S1103. If the search drive is performed for the first time, it is necessary to determine in which direction the focusing lens 103 is to be driven. The drive direction setting process of step S1102 will be described below with reference to FIG. 17.

In step S1103, the camera control unit 212 drives the focusing lens 103 in the set drive direction and at the set drive speed S by means of the lens control unit 106, and then control proceeds to step S1104. In step S1104, the camera control unit 212 judges whether or not the focusing lens 103 has reached the close-up end or the infinity end. If the judgment result is positive, control proceeds to step S1105, and otherwise, control proceeds to step S1106. In step S1105, the camera control unit 212 reverses the drive direction, and then control proceeds to step S1106. In step S1106, the camera control unit 212 judges whether or not the reliability is better than the predetermined value β. If the judgment result is positive, control proceeds to step S1107, and otherwise, control proceeds to step S1108. In step S1108, the camera control unit 212 judges whether or not the focusing lens 103 has reached both the close-up end and the infinity end during the course of the search drive. If the judgment result is positive, control proceeds to step S1107, and otherwise, the search drive process is ended. In step S1107, the camera control unit 212 sets the search drive flag to "off," and ends the search drive process.

A condition of end of the search drive is that it is judged in step S1106 that the reliability is better than the predetermined value β or that it is judged in step S1108 that the focusing lens 103 has reached both the close-up end and the infinity end. The reliability threshold β set in step S1106 is the same as the threshold β set in step S901 of FIG. 13, and has a value that allows the camera control unit 212 to judge that at least the direction of the defocus amount is reliable. If the reliability is better than the threshold β, it can be judged that the focusing lens is close to a position where a subject is in focus, the search drive is stopped and switched to a control for driving based on the defocus amount again. When it is judged in step S1108 that the focusing lens has reached both the close-up end and the infinity end, the focusing lens has been driven over the entire focus drive range, i.e., a subject has not been found. In this case, the search drive flag is set to "off," and control returns to the initial process state. Note that when a subject has not been found, the search drive may be continued without setting the search drive flag to "off."

Figure 17:
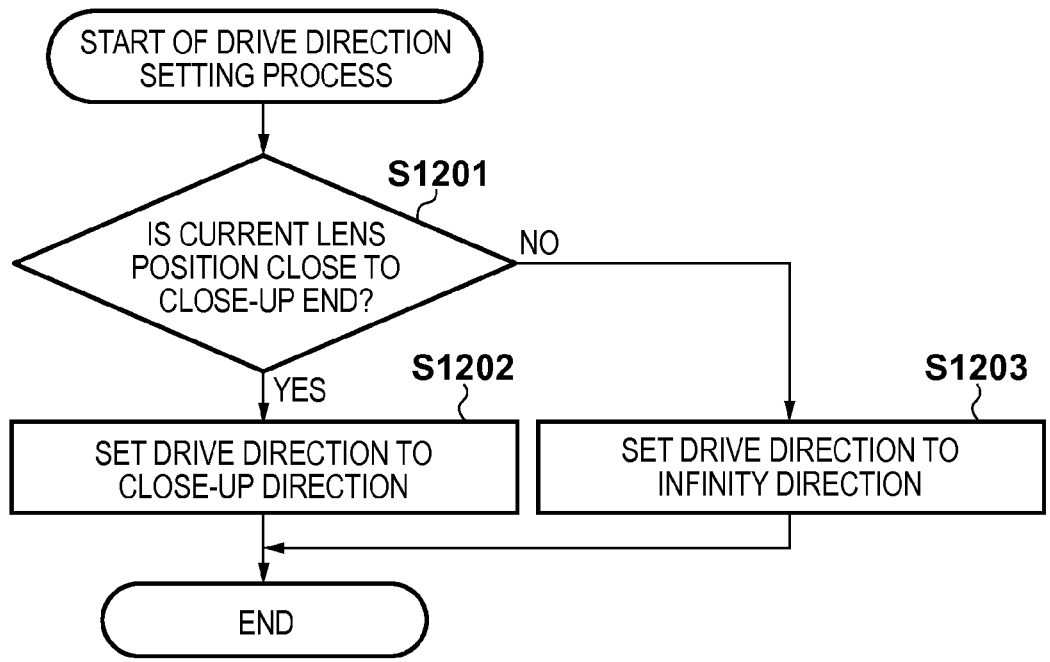
FIG. 17 is a flowchart showing a drive direction setting process of step S1102 of FIG. 16.

Next, the drive direction setting process of step S1102 of FIG. 16 will be described with reference to a flowchart shown in FIG. 17. In step S1201, the camera control unit 212 judges whether or not the current position of the focusing lens 103 is closer to the close-up end than to the infinity end. If the judgment result is positive, control proceeds to step S1202, and otherwise, control proceeds to step S1203.

In step S1202, the camera control unit 212 sets the drive direction of the focusing lens 103 at the beginning of the search drive to the close-up direction, and ends the drive direction setting process. On the other hand, in step S1203, the camera control unit 212 sets the drive direction of the focusing lens 103 at the beginning of the search drive to the infinity direction, and ends the drive direction setting process. By setting the drive direction in this manner, the time it takes to perform the search drive over the entire drive area of the focusing lens can be reduced, and therefore, the maximum time it takes to find a subject by the search drive can be reduced.

As described above, in the focusing apparatus of this embodiment, the focusing lens drive speed for an AF control is set based on information about the reliability of the defocus amount that is detected by phase-difference detection on an imaging surface. By setting the drive speed to a lower value as the reliability becomes better, the speed of the focusing lens is reduced as the focusing lens approaches the in-focus position, i.e., a smoother and more sophisticated focusing lens drive can be achieved. When the reliability is poor, the drive speed is increased, and therefore, when a main subject is significantly blurred, the drive speed is increased, so that the time it takes to focus can be reduced.

Moreover, when the reliability continues to be as low as even the defocus direction is not reliable, the search drive is performed at a high drive speed. Therefore, an erroneous focusing lens drive can be reduced, and in addition, the time it takes to focus when a main subject is significantly blurred can be reduced.

(Second Embodiment)

A second embodiment of the present invention will now be described. In this embodiment, in addition to the first embodiment, a history of detected reliability information and defocus amount information is stored in the SDRAM 209 of FIG. 1. The lens drive speed setting unit 213 included in the camera control unit 212 sets the drive speed of the focusing lens based on not only the most recent reliability information but also the history of reliabilities and defocus amounts.

An interchangeable-lens camera including a lens and a camera body according to this embodiment has a configuration similar to that of the first embodiment described with reference to FIG. 1 and therefore will not be described.

The operation of the camera body 20 of this embodiment is similar to that of the first embodiment described with reference to the flowcharts of FIGS. 3, 4, 5, 6, 11, 15, 16, and 17 and therefore will not be described.

Figure 18:
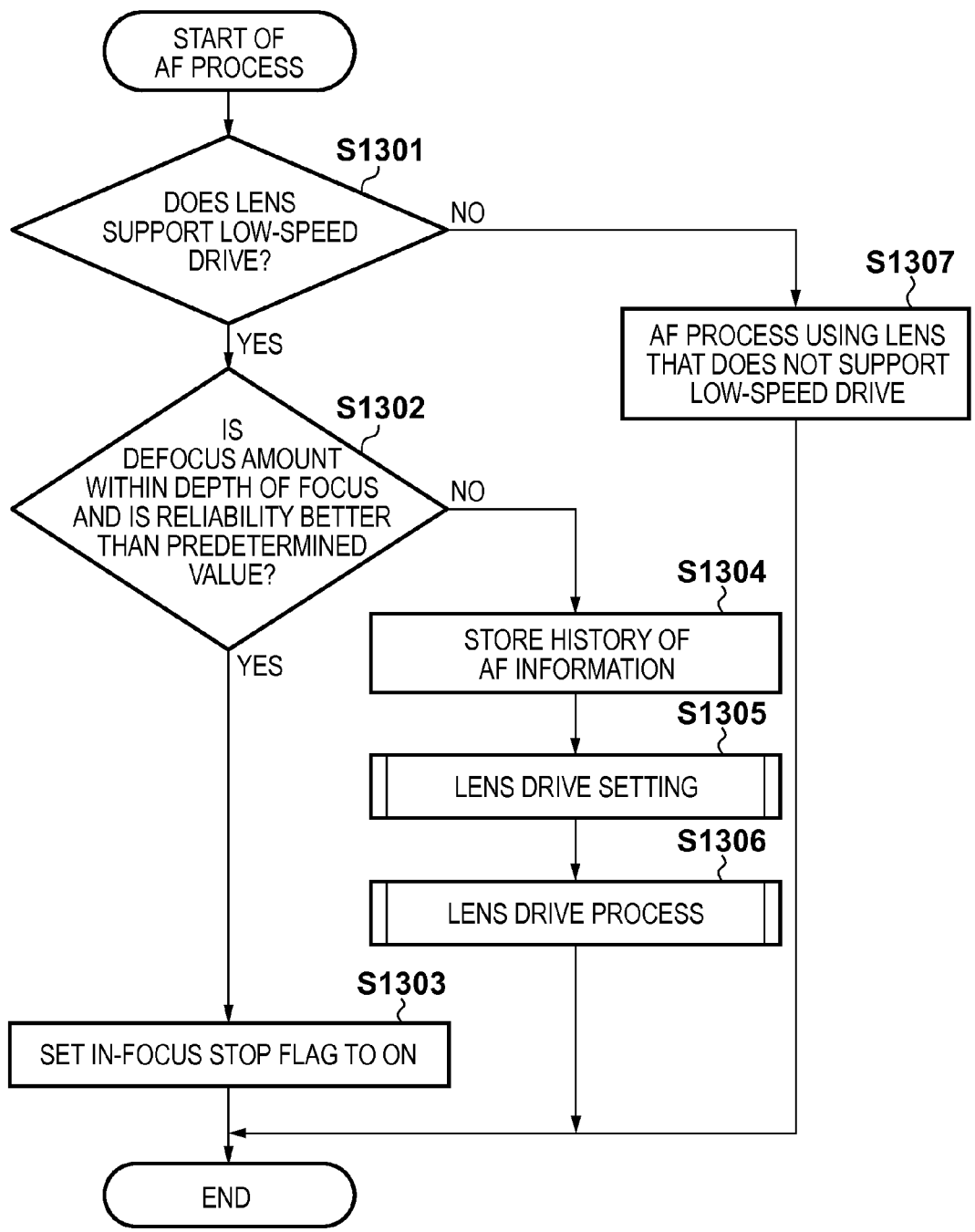
FIG. 18 is a flowchart showing an AF process in a second embodiment.

Firstly, the AF process of step S507 of FIG. 5 will be described with reference to a flowchart shown in FIG. 18. The processes of steps S1301 to S1303 of FIG. 18 are similar to those of steps S801 to S803 of FIG. 12 and therefore will not be described. The processes of steps S1306 and S1307 of FIG. 18 are similar to those of steps S805 and S806 of FIG. 12 and therefore will not be described.

If, in step S1302 of FIG. 18, the condition that the defocus amount is within the depth of focus and the reliability is better than a predetermined value is not satisfied, in step S1304 the camera control unit 212 stores AF information, such as the defocus amount, the reliability, etc., to the SDRAM 209, and then control proceeds to step S1305. A history of defocus amounts and reliabilities stored in the SDRAM 209 is used for determining a drive speed or a drive method for the focusing lens in a lens drive setting process shown in FIG. 19 described below. In step S1305, the camera control unit 212 specifies lens drive settings, and then control proceeds to step S1306. Step S1305 will also be described in detail below with reference to FIG. 19.

Next, the lens drive setting of step S1305 of FIG. 18 will be described with reference to a flowchart shown in FIG. 19. Steps S1401 to S1404 are similar to steps S901, S904, S905, and S906 of FIG. 13 of the first embodiment and therefore will not be described. This embodiment is different from the first embodiment in that the search drive transition counter of the first embodiment is not used. Step S1408 to S1411 are also similar to steps S909 to S912 of FIG. 13 of the first embodiment and therefore will not be described.

In this embodiment, if it is judged in step S1403 that the reliability is worse than the predetermined value β, i.e., the defocus direction is not reliable, the history of defocus amounts and reliabilities is used to achieve a more appropriate control. In step S1405 following step S1403 if the reliability is worse than the predetermined value β, the camera control unit 212 (the lens drive speed setting unit 213) continues to judge whether or not the reliability is worse than the predetermined value β, for a predetermined period. If the judgment result is positive, control proceeds to step S1406, and otherwise, control proceeds to step S1409. In step S1406, the camera control unit 212 judges whether or not the defocus direction has continued to indicate an unchanged direction for a predetermined period. If the judgment result is positive, control proceeds to step S1407, and otherwise, control proceeds to step S1409. In step S1407, the camera control unit 212 sets the drive speed to a drive speed C (fifth drive speed), and then control proceeds to step S1410. In step S1409 following step S1406 if the period for which the defocus direction has remained unchanged is shorter than the predetermined period, the camera control unit 212 sets the search drive flag to "on," and then control proceeds to step S1410.

Figure 19:
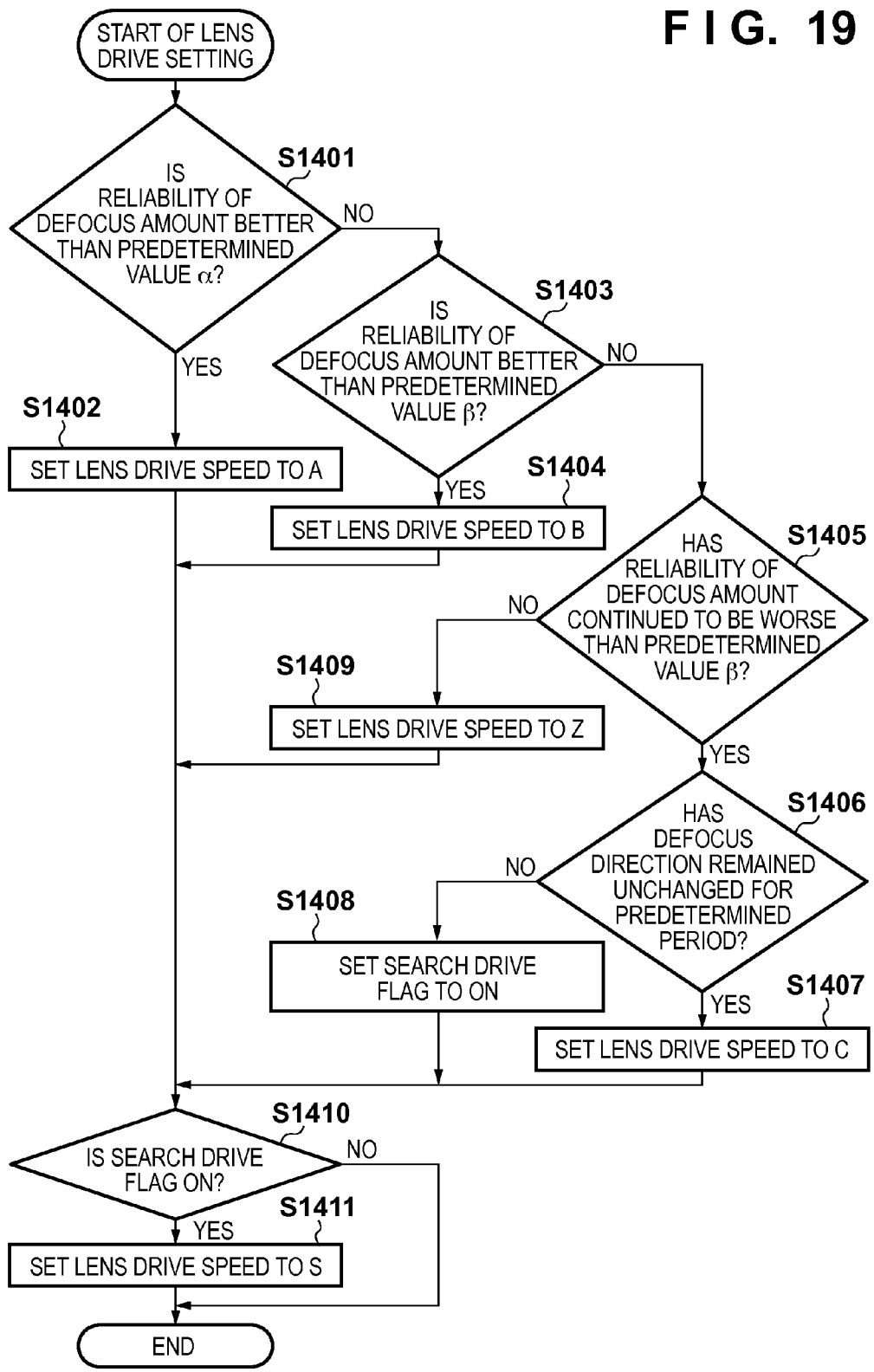
FIG. 19 is a flowchart showing a lens drive setting process in the second embodiment.

The drive speeds set in FIG. 19 have the following relationship:

$$Z<A<B\leq C\leq S$$

where Z is the lowest and S is the highest.

In this embodiment, the drive speed C is additionally provided compared to the first embodiment.

Note that the drive speed C set in step S1407 is set to be almost equal to or higher than the drive speed B set in step S1404. This is because it is considered that step S1407 is performed when the reliability of the defocus amount has continued to be low for the predetermined period, and therefore, a main subject is significantly blurred (the distance over that the focusing lens is moved to the in-focus position is long).

In the first embodiment, when the direction of the defocus amount is not reliable, the search drive transition counter is provided, and the drive speed is set to the drive speed Z until the counter value is larger than or equal to a predetermined value. If the number of times the reliability of the defocus amount has been determined to be low, i.e., the counter value, becomes equal to or more than a predetermined value, in step S909 the search drive flag is set to "on" to determine to switch to the search drive. In contrast to this, in this embodiment, it is judged whether or not the focusing lens is to be transitioned to the search drive, based on the history of reliabilities and defocus amounts, instead of using the search drive transition counter. The camera control unit 212 sets the drive speed to the drive speed Z in step S1409 until, in step S1405, the camera control unit 212 has continued to determinate that the reliability is worse than the predetermined value β, for the predetermined period. Thereafter, if the camera control unit 212 determines that the reliability has continued to be worse than the predetermined value β for the predetermined period, the camera control unit 212 judges whether to transition to the search drive in step S1406.

Step S1406 is a characteristic feature of this embodiment. In step S1406, even when it is judged in step S1405 that the reliability has continued to be worse than the threshold β, then if the defocus amount seems to be reliable to some extent, the focusing lens is driven based on the defocus amount at the drive speed C instead of switching to the search drive. This is, for example, for the following reasons.

- The search drive is not sophisticated and it takes a long time for the search drive to find the in-focus position, and therefore, the defocus amount is desirably used as long as possible to drive the focusing lens.
- It is difficult to correctly determine whether or not the defocus direction is reliable as the threshold of the reliability, because it depends on a condition of a subject, a camera parameter, etc.

Specifically, even when the reliability is worse than the threshold β, the defocus direction may be reliable. In this case, the focusing lens is driven as if the defocus amount were reliable. Even when it is judged that the reliability has continued to be worse for a predetermined period, then if the defocus direction has remained unchanged during that period, it is determined that the defocus direction is reliable. If the reliability has continued to be worse for the predetermined period and the defocus direction (the sign of the defocus amount) has not remained unchanged, it is judged that the defocus amount is not reliable, and the focusing lens is transitioned to the search drive. By such a control, even when the reliability is worse than the threshold β, the opportunity to drive the lens, assuming that the defocus direction is reliable, can be increased.

As described above, in this embodiment, the history of past defocus amounts is used to determine whether to switch from the drive method that is based on the defocus amount to the drive method that is not based on the defocus amount. Therefore, the state in which the focusing lens drive method should be switched to the drive method that is not based on the defocus amount can be more accurately detected. As a result, the defocus amount-based drive that moves the focusing lens at a higher focusing speed can be performed more often, and therefore, the time it takes to focus can be reduced, in addition to the advantages of the first embodiment.

(Third Embodiment)

A third embodiment of the present invention will now be described. In this embodiment, in addition to the first embodiment, the threshold for determining the drive speed is corrected based on the image height of the focus detection area, and the drive speed is corrected based on aperture information.

The configuration of an interchangeable-lens camera including a lens and a camera body according to this embodiment is similar to that which has been described with reference to FIG. 1 in the first embodiment and therefore will not be described.

The operation of the camera body of this embodiment is similar to that of the camera body 20 that has been described with reference to the flowcharts of FIGS. 3, 4, 5, 6, 11, 12, 15, 16, and 17 in the first embodiment and therefore will not be described.

In this embodiment, the lens drive setting performed in step S804 of FIG. 12 will be described with reference to flowcharts shown in FIGS. 20A and 20B.

Figure 13:
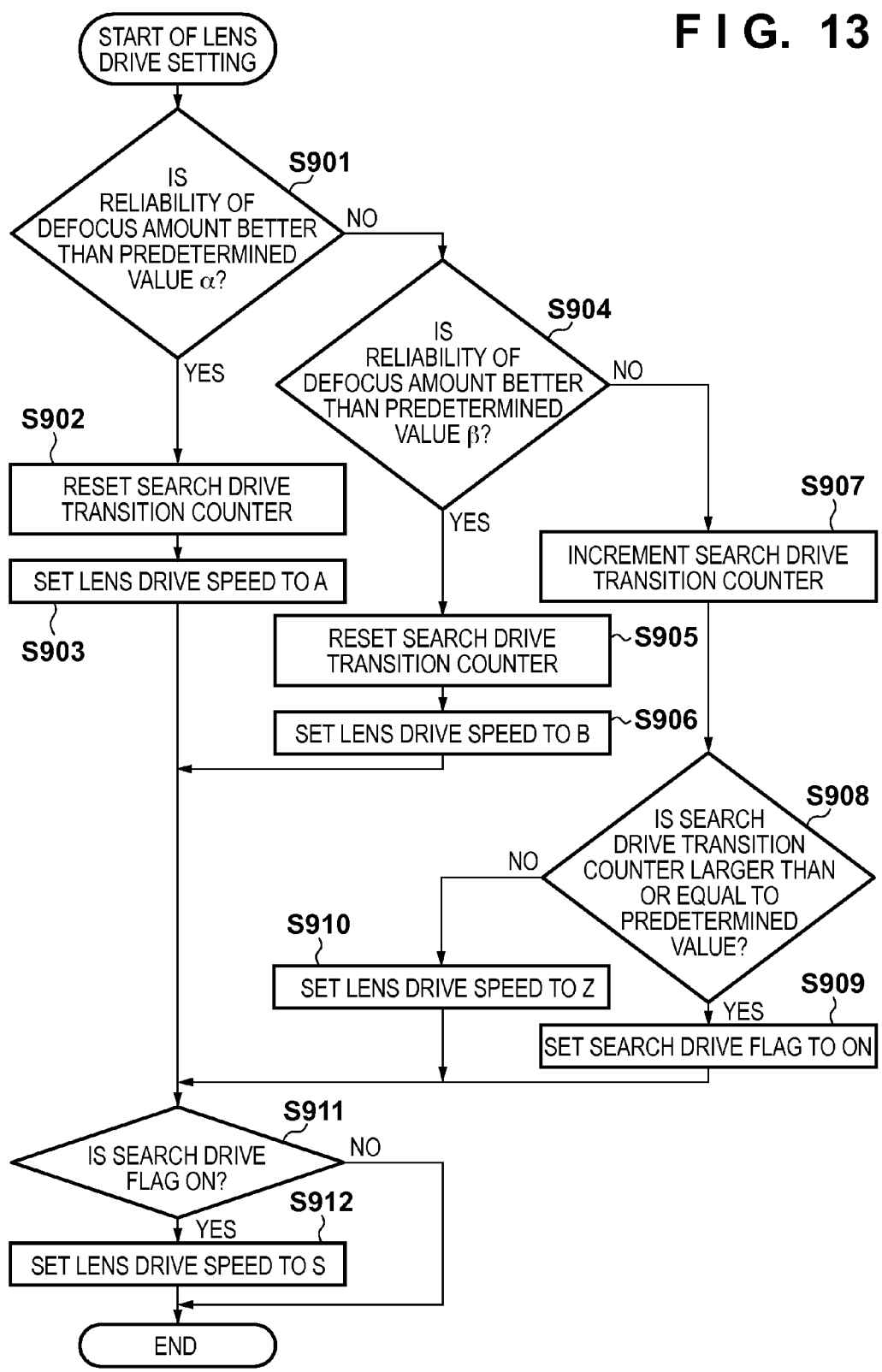
FIG. 13 is a flowchart showing a lens drive setting process of step S804 of FIG. 12.
Figure 20B:
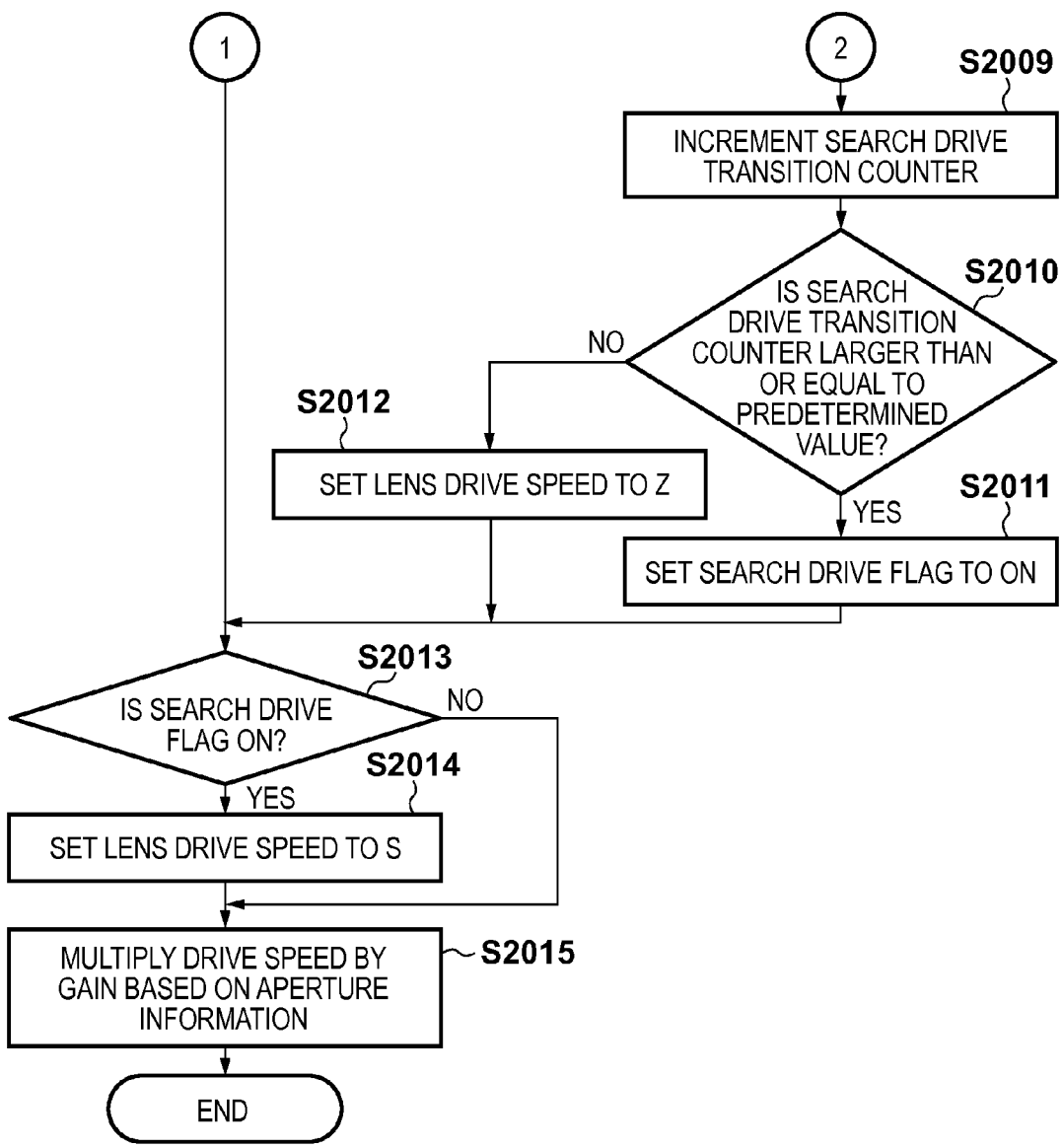

Processes of steps S2003 to S2014 of FIGS. 20A and 20B are similar to those of steps S901 to S912 of FIG. 13 and therefore will not be described.

In step S2001, the camera control unit 212 judges whether or not the image height of the focus detection area in the screen set in step S607 is higher than a predetermined value. If the judgment result is positive, control proceeds to step S2002, and otherwise, control proceeds to step S2003. In step S2002, the camera control unit 212 sets the thresholds α and β of the reliability that are used in steps S2003 and S2006 to higher values (values representing worse reliability) than normal values (values used when the image height is not higher than the predetermined value in step S2001), and then control proceeds to step S2003.

The phase-detection-on-imaging-surface method has a characteristic feature that the pupils A and B for obtaining the image signals A and B have a difference in intensity as described above, and a difference between the amounts of light entering the pupils A and B increases with an increase in the image height, and therefore, the pupil intensity difference increases with an increase in the image height. In other words, as the image height increases, the calculated reliability such as the two-image coincidence degree, the steepness degree, etc. of the image signals A and B tends to become worse. When the threshold of the reliability that is used to determine the set drive speed of the focusing lens is constant, the defocus amount that is detected at a position having a higher image height has a lower reliability. Therefore, in order to reduce the difference depending on the position, when the image height of the focus detection area is higher than the predetermined value, the threshold of the reliability that is used to determine the drive speed of the focusing lens is changed (corrected) to a value corresponding to a reliability that is lower than the normal reliability.

In step S2015 following step S2013 or S2014, the camera control unit 212 multiplies, by a gain, the drive speed set in any of steps S2005, S2008, S2012, and S2314 based on the information of the diaphragm 102 obtained using the lens control unit 106, and ends the lens drive setting process. Specifically, in this embodiment, the gain is applied so that the drive speed has a larger value when the aperture has a second aperture value than when the aperture has a first aperture value, where the aperture is more opened when the aperture has the second aperture value than when the aperture has the first aperture value. In particular, the applied gain increases with an increase in the size of the aperture of the diaphragm, and decreases with a decrease in the size of the aperture of the diaphragm. This is because of a characteristic feature of the phase-detection-on-imaging-surface method that a conversion coefficient for converting the out-of-focus amount calculated in step S604 of FIG. 6 into the defocus amount calculated in step S606, increases with an increase in the aperture value, i.e., the accuracy of the defocus amount deteriorates with a decrease in the size of the aperture of the diaphragm. Therefore, as the size of the aperture of the diaphragm decreases, the focusing lens is more likely to be moved past a position where a subject is in focus, i.e., overshoot is more likely to occur, or hunting is more likely to be noticeable, when the focusing lens is driven. Therefore, as the size of the aperture of the diaphragm decreases, focusing is performed at a lower drive speed to reduce overshoot, leading to a more sophisticated focusing lens drive. Another reason is that, as the size of the aperture of the diaphragm increases, blur is more likely to be noticeable when a main subject is changed, and therefore, the opportunity to desirably drive at a higher speed increases.

As described above, in this embodiment, the threshold of the reliability that is used to determine the drive speed of the focusing lens is changed, depending on the image height of the focus detection area where AF is performed using the phase-detection-on-imaging-surface method. As a result, the difference in the focusing lens drive speed due to the image height of the focus detection area can be reduced. Also, by changing the drive speed, depending on the aperture value, the focusing lens can be focused more quickly when the diaphragm is more opened and therefore blur is more likely to be noticeable, and the occurrence of overshoot can be reduced when the diaphragm is more narrowed and therefore overshoot is more likely to occur.

In the foregoing, the present invention has been described in detail based on the illustrative embodiments. The present invention is not intended to be limited to these particular embodiments, and various changes and modifications can be made thereto without departing the scope of the appended claims.

(Fourth Embodiment)

FIG. 21 is a block diagram showing an example functional configuration of an interchangeable-lens camera as an example image pickup apparatus according to a fourth embodiment of the present invention.

The interchangeable-lens camera of this embodiment has the same functional configuration as that of the interchangeable-lens camera of FIG. 1, except that the camera control unit 212 includes a lens drive method changing unit 216. Therefore, the same functional blocks will not be described.

The lens drive method changing unit 216 serves as a portion of the functionality of the camera control unit 212, and changes methods for driving the focusing lens 103 by means of the lens control unit 106 and the focusing lens drive unit 105 included in the lens unit 10. There are two focusing lens drive methods in this embodiment that are a method for driving the focusing lens based on the defocus amount obtained based on AF signals, and a method for driving the focusing lens based on the drive direction and drive amount set in the camera control unit 212 irrespective of the defocus amount. The details will be described in detail below with reference to a flowchart for describing a control of the camera body 20.

Conventionally, digital cameras are mainly used for shooting still images, and camcorders are typically used for shooting moving images. However, in recent years, there has been an increasing demand for a digital camera having a moving image shooting function. Therefore, an increasing number of lenses that are suitable for shooting of moving images at a wide range of drive speed from a low speed to a high speed have been available. On the other hand, since before the advent of the idea that digital cameras are applied to shooting of moving images, there have been lenses dedicated to shooting of still images, whose drive speed can be set only to high speed. In particular, many old lenses are such lenses. This embodiment is particularly effective in using the latter lenses.

The lens drive method changing unit 216 obtains information about whether or not the lens unit 10 can be set to low-speed drive, from the lens control unit 106 included in the lens unit 10 through the camera control unit 212. The lens drive method changing unit 216, when determining that the lens unit 10 cannot be set to low-speed drive, performs a control to change drive methods. Note that even when the lens unit 10 cannot be set to low-speed drive, then if a drive method for driving the focusing lens so that the focusing lens apparently moves slowly is employed, a more sophisticated focusing drive can be achieved. Note that the lens drive method changing unit 216, when determining that the lens unit 10 can be set to low-speed drive, does not change drive methods.

Figure 22:
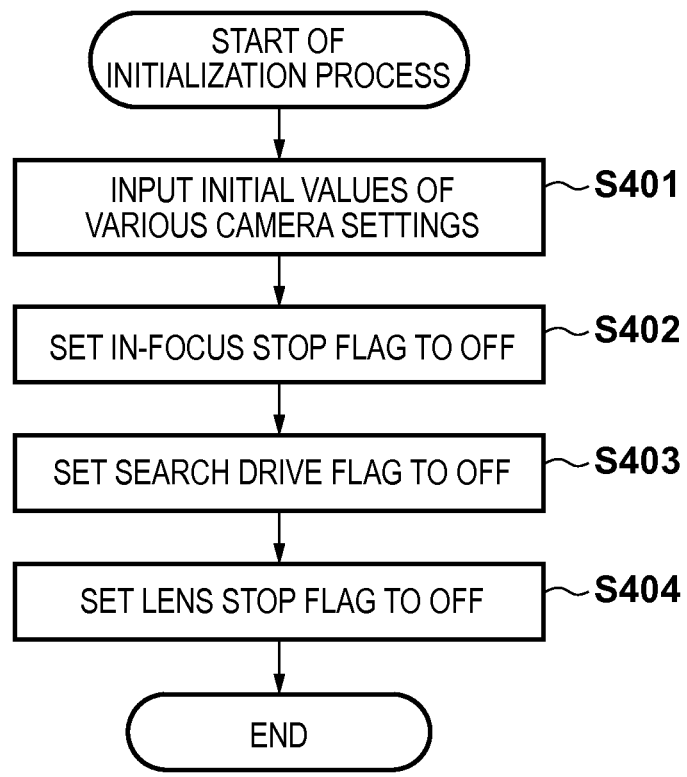
FIG. 22 is a flowchart showing an initialization process in a fourth embodiment.

Note that the operation of the camera body 20 in this embodiment is similar to that of the camera body 20 of the first embodiment described with reference to the flowcharts of FIGS. 3, 5 to 11, and 17 and therefore will not be described. Next, an initialization process that is performed by the interchangeable-lens camera of this embodiment will be described with reference to a flowchart shown in FIG. 22. In FIG. 22, steps having the same processes as those of FIG. 4 are indicated by the same reference characters and therefore will not be described. This embodiment is different from the first embodiment in that, after the search drive flag is set to "off" in step S403, the camera control unit 212 sets a lens stop flag to "off," and ends the process in step S404.

In this embodiment, the search drive is performed by stepwise drive (repetition of minute drive). The stepwise drive has a small drive amount, and therefore, can perform substantially low-speed drive for a lens whose drive speed cannot be set to low speed. In the present invention, when the lens unit 10 cannot be set to low-speed drive, a more sophisticated drive can be achieved by using the stepwise drive during shooting of a moving image. This will be described in detail below.

The lens stop flag initialized in step S404 is a flag for stopping the focusing lens 103. For example, when it is judged that the reliability of the defocus amount has temporarily become worse (e.g., another subject goes past the front of a main subject, etc.), the lens stop flag is set to "on." When the lens stop flag is "on," the focusing lens 103 is not driven, and therefore, the fluctuation of the in-focus state due to tracking of a temporary change in the defocus amount is reduced or prevented.

As described above, in this embodiment, focusing lens drive methods are changed, depending on the reliability of the defocus amount. The phase-detection AF on an imaging surface has a characteristic feature that the reliability such as the two-image coincidence degree, the steepness degree, etc. decreases with an increase in the out-of-focus amount, compared to a conventional phase-detection AF method using a dedicated AF sensor. This is because, in the phase-detection AF on an imaging surface, a difference occurs between the amounts of light entering the pupils A and B that generate the image signals A and B, respectively, and therefore, the image signals A and B are asymmetrical to each other. In this embodiment, this characteristic feature of the phase-detection AF on an imaging surface is used for changing focusing lens drive methods. This will be described in detail below with reference to FIG. 24. Note that, in this embodiment, a case where the two-image coincidence degree is used as the reliability of the defocus amount will be described. Alternatively, the steepness degree, or other information that can be used as an index for the reliability of the out-of-focus amount, may be used. Alternatively, these indexes may be used in combination.

Figure 23:
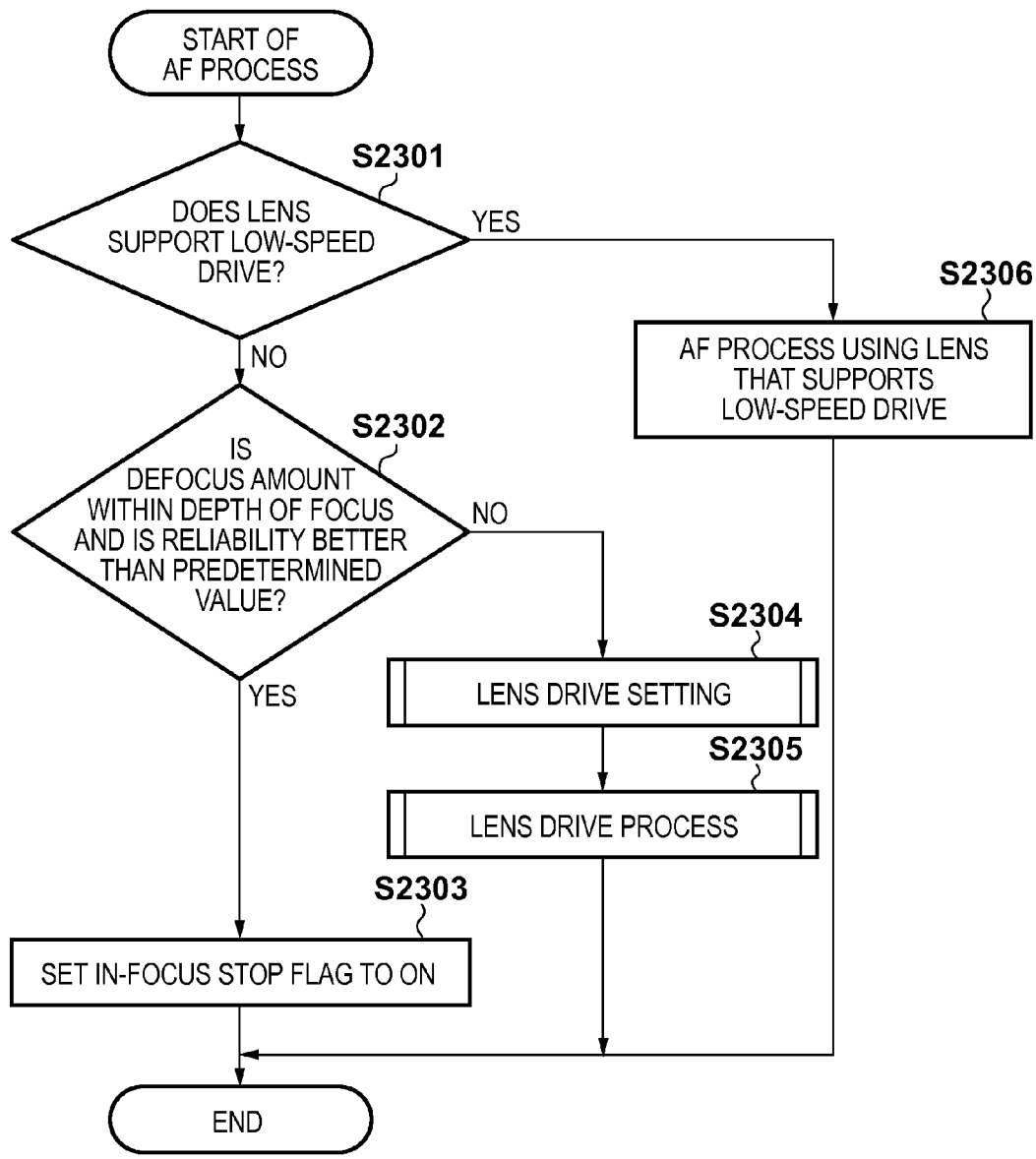
FIG. 23 is a flowchart showing the AF process of step S507 of FIG. 5.

Next, an AF process that is performed by the interchangeable-lens camera of this embodiment in a moving image pickup process will be described with reference to a flowchart shown in FIG. 23. This process corresponds to the AF process performed in step S507 of FIG. 5. In the process, the focusing lens that is not stopped at the in-focus position is driven, and it is determined whether or not the focusing lens is stopped at the in-focus position.

In step S2301, the camera control unit 212 judges whether or not the lens unit 10 can be set to low-speed drive, based on the lens information obtained from the lens control unit 106. If the judgment result is negative, control proceeds to step S2302, and otherwise, control proceeds to step S2306. In step S2306, the camera control unit 212 performs an AF process using the lens that can be set to low-speed drive, and ends the process. As described above, this embodiment is particularly effective in using a lens whose drive speed cannot be set to a wide range of drive speed from a low speed to a high speed and which is therefore not suitable for shooting of a moving image. Therefore, step S2306 will not be described in detail.

In step S2302, the camera control unit 212 judges whether or not the magnitude of the defocus amount is within the depth of focus and the reliability of the defocus amount is better than a predetermined value. If the judgment result is positive, control proceeds to step S2303, and otherwise, control proceeds to step S2304. In step S2303, because the defocus amount is within the depth of focus and the reliability is high, the camera control unit 212 judges that the focusing lens is in focus, sets the in-focus stop flag to "on," and ends the process. The threshold of the reliability set in step S2302 is set to a value that ensures at least the accuracy of focus.

In step S2304 following step S2302 if the defocus amount is still within the depth of focus and the reliability is not better than the predetermined value, the camera control unit 212 specifies settings of lens drive, and then control proceeds to step S2305. In step S2304, the camera control unit 212 performs a lens drive setting process that is a characteristic feature of this embodiment. Here, focusing lens drive methods are changed and settings thereof are specified. This will be described in detail with reference to FIG. 24. In step S2305 following step S2304 in which the lens drive settings are specified, the camera control unit 212 performs a lens drive process, and ends the AF process. The lens drive process of step S2305 will be described in detail below with reference to FIG. 26.

Next, the lens drive setting process of step S2304 of FIG. 23 will be described with reference to a flowchart shown in FIG. 24. The lens drive setting process in this embodiment includes changing focusing lens drive methods, depending on the reliability of the defocus amount. The lens drive setting process in this embodiment also includes setting a stepwise drive amount during execution of the search drive, etc.

In step S2401, the camera control unit 212 (the lens drive method changing unit 216) judges whether or not an evaluation value representing the reliability of the defocus amount is better than the predetermined value α (the reliability is higher than a predetermined reliability). If the judgment result is positive, control proceeds to step S2402, and otherwise, control proceeds to step S2403. In step S2402, the camera control unit 212 resets the search drive counter, and then control proceeds to step S2407.

Next, in step S2403 following step S2401 if the reliability is not better than the predetermined value α (the reliability is not higher than the predetermined reliability), the camera control unit 212 increments the search drive transition counter, and then control proceeds to step S2404. In step S2404, the camera control unit 212 judges whether or not the value of the search drive transition counter is larger than or equal to a predetermined value. If the judgment result is positive, control proceeds step S2405. In step S2405, the camera control unit 212 sets the search drive flag to "on," and then control proceeds to step S2407. If the value of the search drive transition counter is smaller than the predetermined value, control proceeds to step S2406. In step S2406, the camera control unit 212 sets the lens drive flag to "on," and then control proceeds to step S2407.

In step S2407 following any of steps S2402, S2405, and S2406, the camera control unit 212 judges whether or not the search drive flag is "on." If the judgment result is positive, control proceeds to step S2408, and otherwise, the lens drive setting process is ended. In step S2408, the camera control unit 212 judges whether or not the reliability of the defocus amount is better than a predetermined value γ. If the judgment result is positive, control proceeds to step S2409, and otherwise, control proceeds to step S2410. In step S2409, the camera control unit 212 sets the stepwise drive amount to "A," and ends the lens drive setting process. In step S2410, the camera control unit 212 sets the stepwise drive amount to "B" ("A"<"B"), and ends the lens drive setting process.

Figure 24:
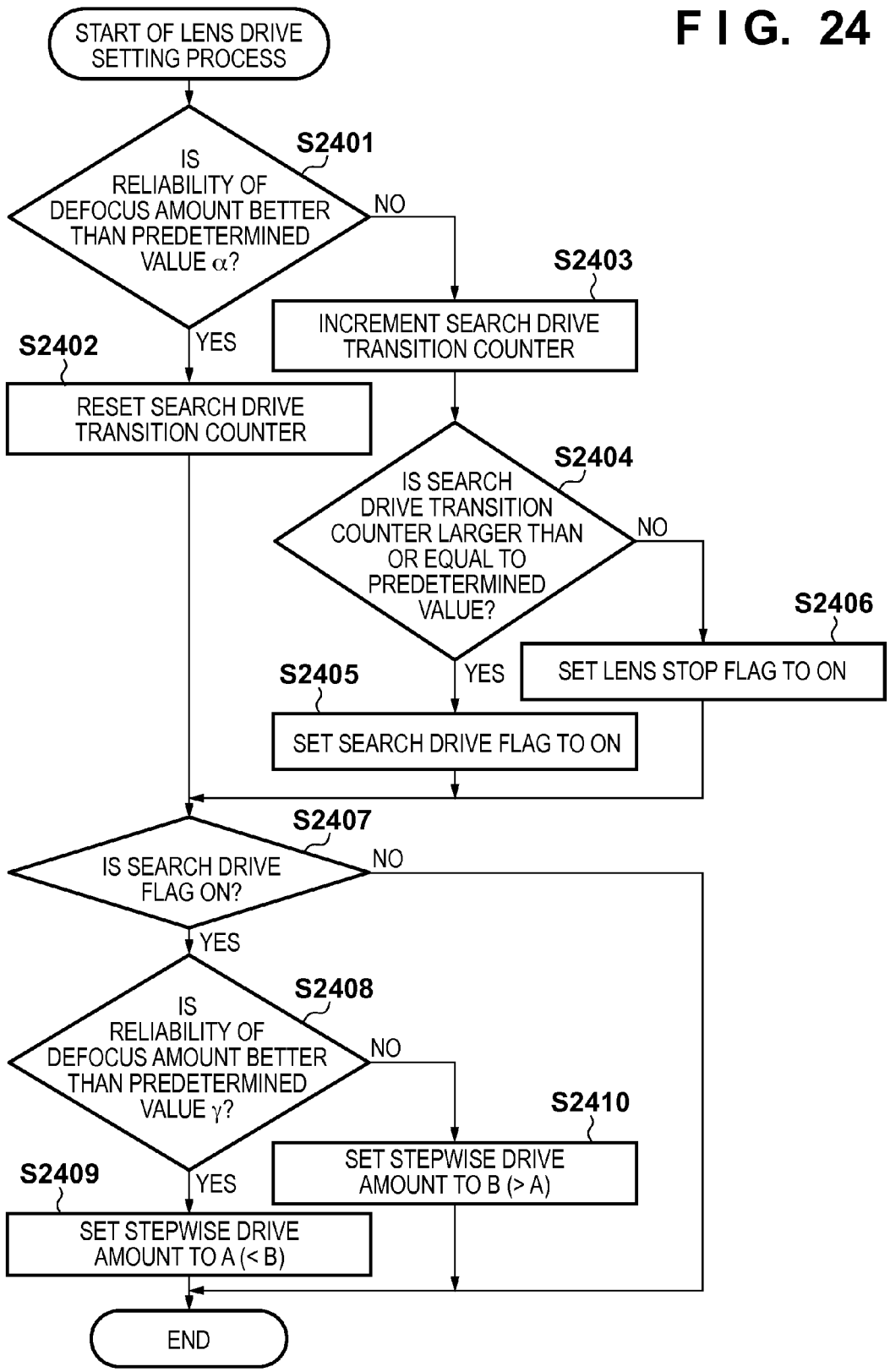
FIG. 24 is a flowchart showing a lens drive setting process of step S2304 of FIG. 23.

Note that the reliability thresholds α and γ set in FIG. 24 have the following relationship:

$$\alpha < \gamma$$

where α is a value indicating better reliability.

In this embodiment, the two-image coincidence degree is used as the reliability, and therefore, the reliability having a smaller value is better reliability. Therefore, α<γ is established. In this embodiment, if the reliability is better than α, the focusing lens 103 is driven based on the defocus amount, and otherwise, the focusing lens 103 is driven based on the set stepwise drive amount instead of the defocus amount.

As described above, the phase-detection AF on an imaging surface has a characteristic feature that, because the distribution of pupil intensity from which the image signals A and B are obtained is not uniform, the reliability such as the two-image coincidence degree, the steepness degree, etc. decreases with an increase in the defocus amount. When the defocus direction is not reliable, then if the focusing lens is driven based on the defocus amount, image quality is likely to be significantly affected. This point will be described with reference to FIG. 25A.

FIG. 25A is a diagram schematically showing a relationship between the drive operation and the reliability of the defocus amount of the focusing lens. In FIG. 25A, the horizontal direction represents the position of the focusing lens and the reliability of the defocus amount. FIG. 25A shows that when the defocus direction is not reliable, the focusing lens is driven based on the defocus amount, and an example range of movement of the focusing lens in that case. When even the defocus direction is not reliable, then if the focusing lens is driven based on the defocus amount, it is likely that hunting continues, the focusing lens is driven in a direction away from the in-focus position, or the focusing lens is driven by an excessive defocus amount and therefore moved past the in-focus position.

Therefore, when the reliability is as low as the defocus amount is not reliable, an AF control is performed without using the defocus amount. To do so, the reliability threshold α set in step S2401 is set to a value that allows at least the defocus direction, of the defocus direction and the defocus amount, to be determined to be reliable. On the other hand, when the reliability is as low (worse than α) as the defocus direction is determined not to be reliable, the search drive is performed. The search drive is a method for setting the defocus direction irrespective of the defocus amount, and driving the focusing lens a predetermined amount (stepwise drive amount) at a time in the defocus direction within the drive range.

If it is judged in step S2401 that the reliability (worse than α) is as low as the defocus direction is not reliable, in step S2403 the camera control unit 212 increments the search drive transition counter. The camera control unit 212 determines to transition to the search drive if the low reliability has been detected a predetermined number of times. As a result, the reliability at which a determination is made to transition to the search drive is ensured, and the influence of tracking of a temporary reduction in the reliability on image quality is reduced or prevented. When determining to transition to the search drive in step S2404, the camera control unit 212 sets the search drive flag to "on" in step S2405. When the search drive flag is "on", the camera control unit 212 sets the stepwise drive amount (steps S2408 to S2410) as a result of determination in step S2407. First, in step S2408, the camera control unit 212 judges the reliability of the defocus amount. If the reliability is better than γ, the stepwise drive amount is set to "A" (first drive amount), and otherwise, the stepwise drive amount is set to "B" (second drive amount) that is larger than "A".

As described above, γ indicates a reliability lower than α that indicates that the defocus direction is reliable. Therefore, when the reliability is not better than γ, the defocus amount of a main subject may be significantly large. In this case, in order to reduce the time it takes to focus, the stepwise drive amount is set to a larger value. The search drive process will be described in detail below with reference to a flowchart shown in FIG. 27.

When it has been judged in step S2401 that the reliability is worse than the predetermined value α and a judgment is being made in step S2403 as to whether to transition to the search drive, it is better not to drive the focusing lens, assuming that the defocus amount is reliable. Therefore, in order not to drive the focusing lens, the lens stop flag is set to "on" in step S2406. As a result, the lens is temporarily stopped. If the reliability continues to be worse than the predetermined value α, the focusing lens is transitioned to the search drive. When the reliability becomes better than the predetermined value α again (e.g., another subject goes past the front of a main subject, etc.), the focusing lens continues to be driven based on the defocus amount.

A characteristic feature of this embodiment is that the focusing lens is driven in a stepwise manner during the search drive. As described above, when a moving image AF control is performed, a sophisticated focusing lens drive is important. For example, excessively high-speed drive or unnecessary drive should be avoided. However, when the lens unit 10 does not support low-speed drive, the focusing lens is driven at a high speed even during recording of a moving image. Therefore, for example, when the focusing lens is driven based on an incorrect defocus direction or amount as described in FIG. 25A, image quality is significantly affected.

When the reliability of the defocus amount is low (worse than α), the focusing lens may be driven an unnecessarily large amount. Therefore, the drive amount is set to a small value, and stepwise drive is performed where drive is repeatedly performed on a frame-by-frame basis. Therefore, even when a lens that cannot be driven at low speed is used, the amount of movement of the focusing lens per unit time can be reduced, and substantially low-speed drive can be achieved.

Also, by moving the focusing lens a predetermined drive amount at a time by the stepwise drive, a smoother change in the in-focus state due to the movement of the focusing lens is observed, and the image quality of a moving image shot during AF can be improved.

FIG. 25B schematically shows, similar to FIG. 25A, a relationship between the focusing lens drive method of this embodiment and the reliability of the defocus amount, and the movement of the focusing lens that is driven. In this embodiment, when the reliability of the defocus amount is not low (better than α), the focusing lens is driven based on the defocus amount, and otherwise, the search drive is performed by the stepwise drive. Therefore, in this embodiment, even for a lens that cannot be set to low-speed drive, a more sophisticated moving image AF control can be performed.

Next, the lens drive process of step S2305 of FIG. 23 will be described with reference to a flowchart shown in FIG. 26. The lens drive process is a process of driving the focusing lens 103 based on settings of various flags etc. set by the lens drive setting process described in step S2304.

In step S2601, the camera control unit 212 judges whether or not the lens stop flag is "off." If the judgment result is positive, control proceeds to step S2602, and otherwise, control proceeds to step S2605. In step S2605, the camera control unit 212 sets the lens stop flag to "off," and ends the lens drive process.

When the lens stop flag is "on" in step S2406 of FIG. 24, i.e., the direction of the defocus amount is not reliable and a judgment is being made as to whether to transition to the search drive, the focusing lens 103 is not driven and the process is ended. As a result, for example, when the reliability of the defocus amount temporarily becomes worse (e.g., another subject goes past the front of a main subject, etc.), the focusing lens 103 is not driven, and therefore, a reduction in image quality due to unnecessary drive can be reduced.

The process of step S2602 following step S2601 if it is judged that the lens drive flag is "off" is a characteristic feature of this embodiment. In step S2602, the camera control unit 212 judges whether or not the search drive flag is "off." If the judgment result is positive, control proceeds to step S2603. In step S2603, the camera control unit 212 performs lens drive based on the defocus amount, and ends the lens drive process. If the judgment result is negative, control proceeds to step S2604. In step S2604, the camera control unit 212 performs a search drive process, and ends the lens drive process. The search drive process of step S2604 will be described in detail below with reference to FIG. 27.

Next, the search drive process of step S2604 of FIG. 26 will be described with reference to the flowchart of FIG. 27. The search drive process is a process that is performed when the search drive flag is set to "on" in step S2405 of FIG. 24, and performs stepwise drive using the stepwise drive amount set in step S2409 or S2410.

In step S2701, the camera control unit 212 judges whether or not the search drive is performed for the first time. If the judgment result is negative, control proceeds directly to step S2703, and otherwise, control proceeds to step S2703 after step S2702 in which the drive direction is set. When the search drive is performed for the first time, it is necessary to determine in which direction the focusing lens 103 is to be driven. The drive direction setting process of step S2702 will be described below with reference to FIG. 17.

In step S2703, the camera control unit 212 drives the focusing lens 103 the stepwise drive amount in the set drive direction by means of the lens control unit 106, and then control proceeds to step S2704. In step S2704, the camera control unit 212 judges whether or not the focusing lens 103 has reached the close-up end or the infinity end. If the judgment result is positive, control proceeds to step S2705, and otherwise, control proceeds to step S2706. In step S2705, the camera control unit 212 reverses the drive direction, and then control proceeds to step S2706. In step S2706, the camera control unit 212 judges whether or not the reliability is better than the predetermined value α. If the judgment result is positive, control proceeds to step S2707, and otherwise, control proceeds to step S2708. In step S2708, the camera control unit 212 judges whether or not the focusing lens 103 has reached both the close-up end and the infinity end during the course of the search drive. If the judgment result is positive, control proceeds to step S2707, and otherwise, the search drive process is ended. In step S2707, the camera control unit 212 sets the search drive flag to "off," and ends the search drive process.

A condition of end of the search drive is that it is judged in step S2706 that the reliability is better than the predetermined value α or that it is judged in step S2708 that the focusing lens 103 has reached both the close-up end and the infinity end. The reliability threshold α set in step S2706 is the same as the threshold α set in step S2401 of FIG. 24, and allows the camera control unit 212 to judge that at least the direction of the defocus amount is reliable. When the reliability is better than the threshold α, it can be judged that the focusing lens is close to a position where a subject is in focus, and therefore, the search drive, i.e., the stepwise drive, is switched again to a control to drive the focusing lens based on the defocus amount. When it is judged in step S2708 that the focusing lens has reached both the close-up end and the infinity end, the focusing lens has been driven over the entire focus drive range, i.e., a subject has not been found. In this case, the search drive flag is set to "off," and control returns to the initial process state. Note that when a subject has not been found, the search drive flag nay not be set to "off," and the search drive may be continued.

As described above, the focusing apparatus of this embodiment changes focusing lens drive methods during an AF control, based on information about the reliability of the defocus amount detected by the phase-difference detection on an imaging surface. When it is judged that the reliability is good, the focusing lens is driven based on the detected defocus amount. When the reliability of the defocus amount is poor, the stepwise drive amount and the drive direction are set, and the search drive is performed by the stepwise drive. Therefore, even when a moving image is shot using a focusing lens that cannot be driven at low speed, the focusing lens can be substantially prevented from being significantly moved in a short time, and therefore, the adverse influence on image quality can be reduced. A sophisticated focusing lens drive that allows the focusing lens to apparently move smoothly can be achieved.

(Fifth Embodiment)

A fifth embodiment of the present invention will now be described. In this embodiment, in addition to the fourth embodiment, a history of detect reliability information and defocus amount information is stored in the SDRAM 209 of FIG. 21. The lens drive method changing unit 216 included in the camera control unit 212 changes focusing lens drive methods based on not only the most recent reliability information but also the history of reliabilities and defocus amounts.

The configuration of an interchangeable-lens camera including a lens unit and a camera body according to this embodiment is similar to that which has been described in the fourth embodiment with reference to FIG. 21, and therefore will not be described.

Figure 27:
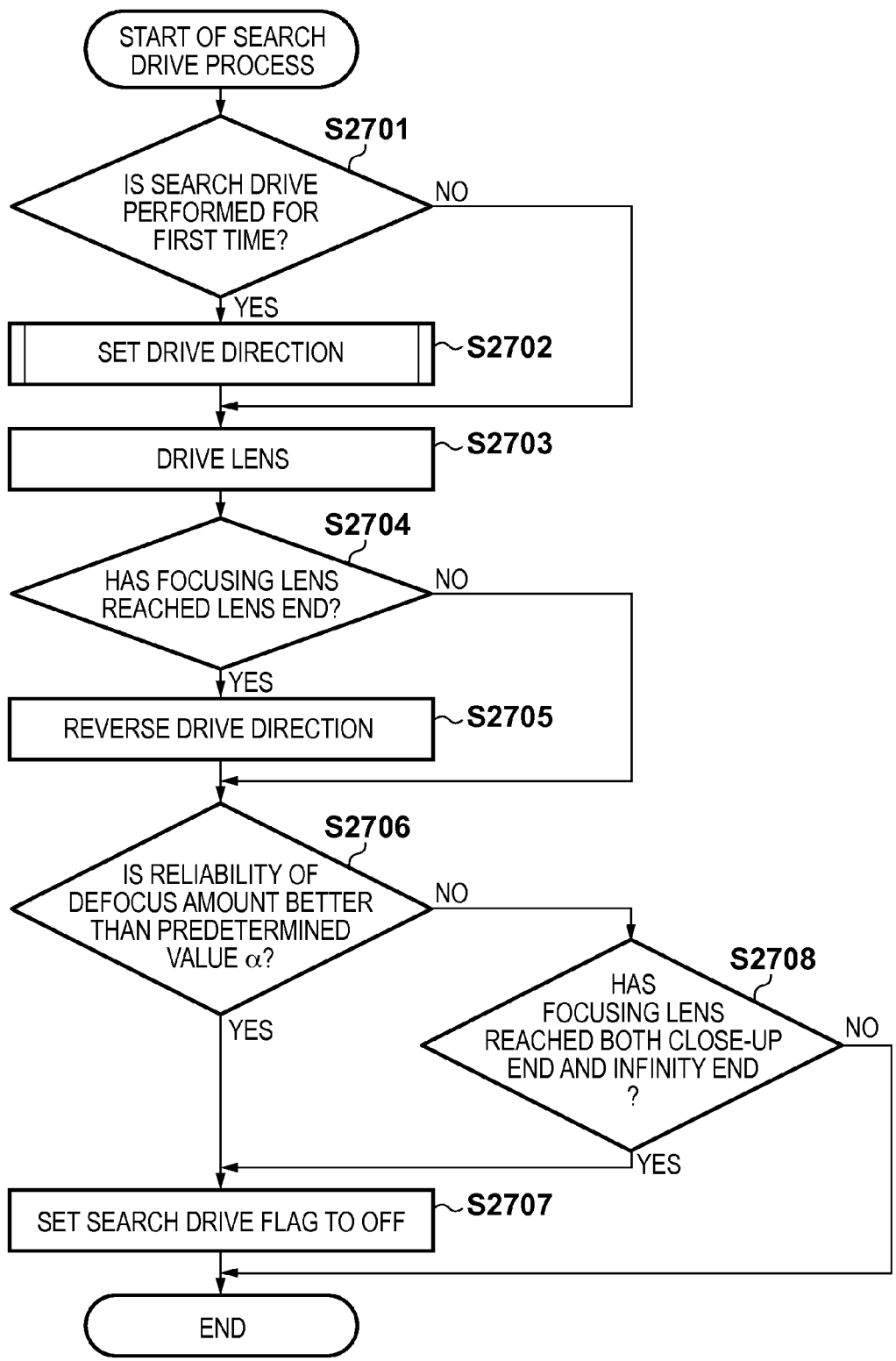
FIG. 27 is a flowchart showing a search drive process of step S2604 of FIG. 26.

The operation of the camera body 20 of this embodiment is similar to that which has been described in the first embodiment with reference to the flowcharts of FIGS. 3, 5, 6, 11, and 17 and that which has been described in the fourth embodiment with reference to the flowchart of FIGS. 22, 26, and 27, and therefore will not be described.

Figure 28:
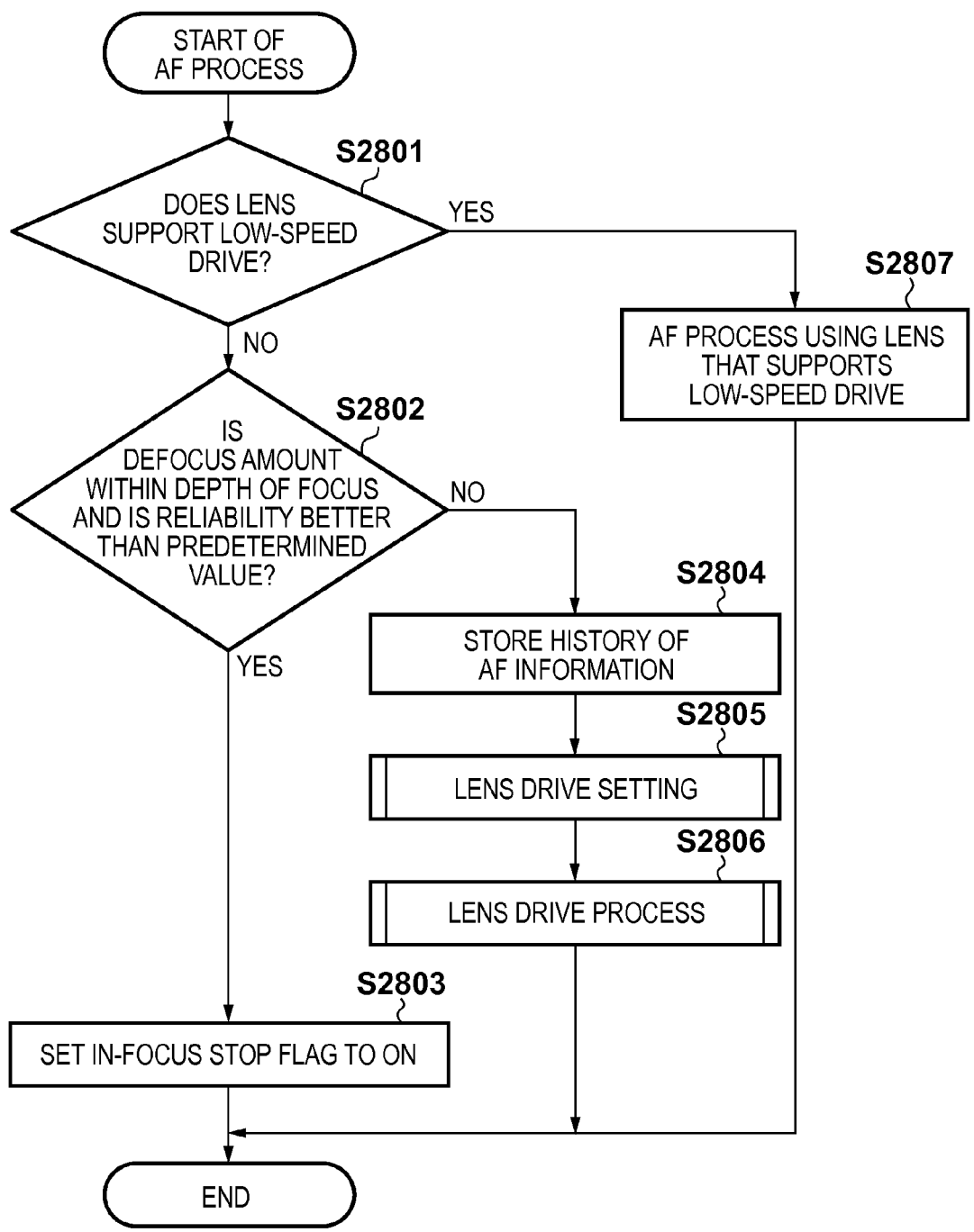
FIG. 28 is a flowchart showing an AF process in a fifth embodiment.

Firstly, the AF process of step S507 of FIG. 5 will be described with reference to a flowchart shown in FIG. 28. Processes of steps S2801 to S2803 of FIG. 28 are similar to those of steps S2301 to S2303 of FIG. 23 and therefore will not be described. Processes of steps S2806 and S2807 of FIG. 28 are similar to those of steps S2305 and S2306 of FIG. 23 and therefore will not be described.

When, in step S2802 of FIG. 28, the condition that the defocus amount is within the depth of focus and the reliability is better than the predetermined value is not satisfied, in step S2804 the camera control unit 212 stores AF information such as the defocus amount, the reliability, etc. into the SDRAM 209, and then control proceeds to step S2805. The history of defocus amounts and reliabilities stored in the SDRAM 209 are used for determining a lens drive method in a lens drive setting process of FIG. 29 described below. In step S2805, the camera control unit 212 specifies lens drive settings, and then control proceeds to step S2806. Step S2805 will be described in detail below with reference to FIG. 29.

Figure 29:
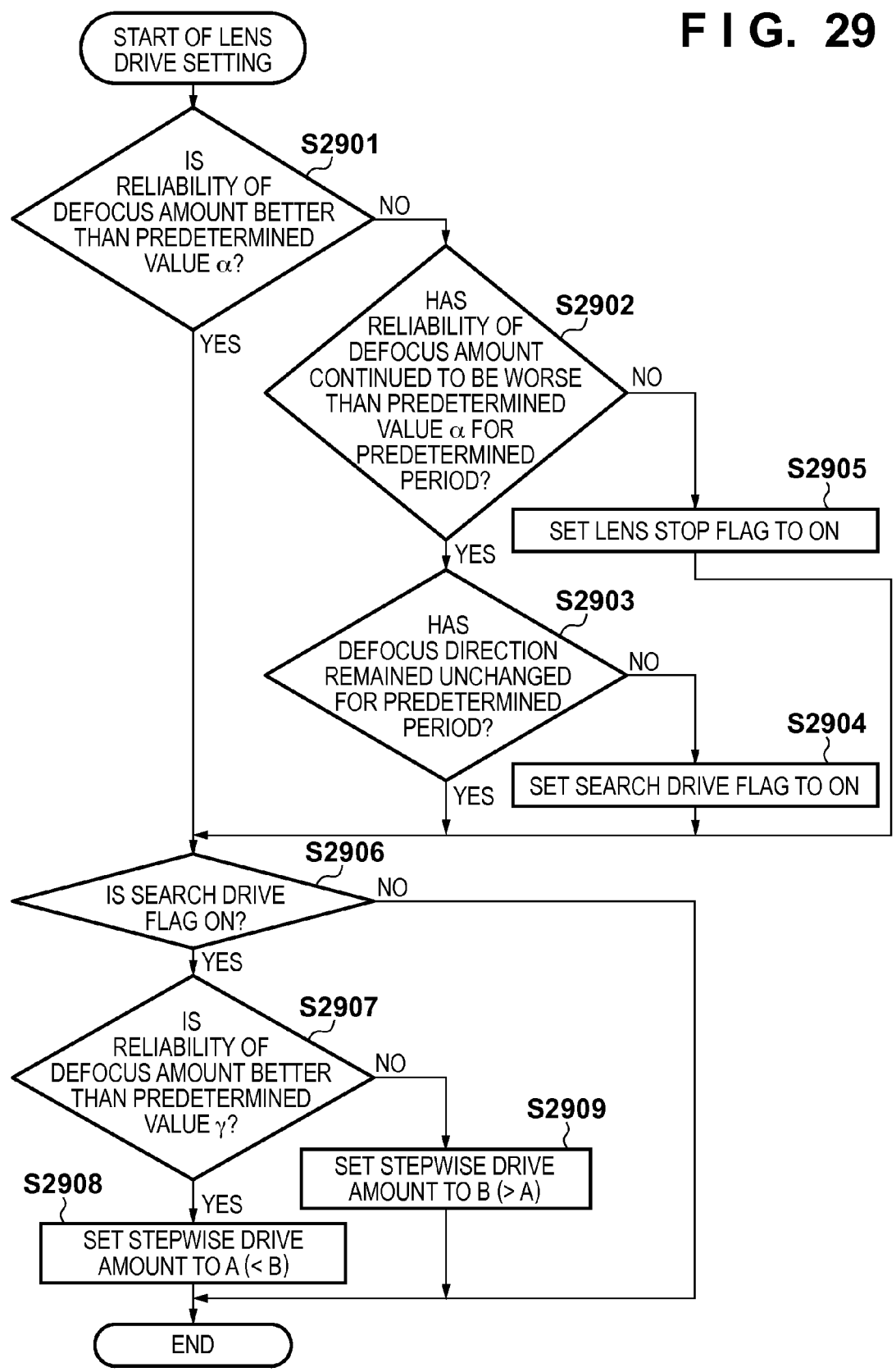
FIG. 29 is a flowchart showing a lens drive setting process in the fifth embodiment.

Next, the lens drive setting process in step S2805 of FIG. 28 will be described with reference to a flowchart shown in FIG. 29. Step S2901 is similar to step S2401 of FIG. 24 of the fourth embodiment and therefore will not be described. This embodiment is different from the fourth embodiment in that the search drive transition counter used in the fourth embodiment is not used. Processes of steps S2904 to S2909 are similar to those of steps S2405 to S2410 of FIG. 24 of the fourth embodiment and therefore will not be described.

In this embodiment, in step S2901, when the reliability is worse than the predetermined value α, i.e., the defocus direction is not reliable, the history of defocus amounts and reliabilities is used, whereby a more appropriate control is achieved. In step S2902 following step S2901 if the reliability is worse than the predetermined value α, the camera control unit 212 judges whether or not the reliability has continued to be worse than the predetermined value α for a predetermined period. If the judgment result is positive, control proceeds to step S2903, and otherwise, control proceeds to step S2905. In step S2903, the camera control unit 212 judges whether or not the defocus direction has remained unchanged for a predetermined period. If the judgment result is positive, control proceeds to step S2906, and otherwise, control proceeds to step S2904. In step S2904 following step S2903 if the period for which the defocus direction has remained unchanged is shorter than the predetermined period, the camera control unit 212 sets the search drive flag to "on," and then control proceeds to step S2910.

In the fourth embodiment, when the direction of the defocus amount is not reliable, a search drive transition counter is provided, and the lens stop flag is set to "on" in step S2406 to stop the focusing lens 103 until the counter value is larger than or equal to a predetermined value. Thereafter, when the counter value indicating the number of times the reliability of the defocus amount has been determined to be low becomes larger than or equal to the predetermined value, the search drive flag is set to "on" to determine to switch to the search drive in step S2405. In contrast to this, in this embodiment, a judgment is made as to whether to transition to the search drive based on the history of reliabilities and defocus amounts instead of using the search drive transition counter. The camera control unit 212 sets the lens stop flag to "on" in step S2905 to perform a control to stop the focusing lens 103 until the camera control unit 212 determines in step S2902 that the reliability has continued to be worse than the predetermined value α for a predetermined period. When the camera control unit 212 determines that the reliability has continued to be worse than the predetermined value α for the predetermined period, the camera control unit 212 judges in step S2903 whether to transition to the search drive.

In step S2903, which is a characteristic feature of this embodiment, even when it is judged in step S2902 that the reliability has continued to be worse than the threshold α, then if the defocus amount seems to be reliable to some extent, the focusing lens continues to be driven based on the defocus amount without switching to the search drive. This is, for example, for the following reasons.

It takes a long time for the search drive to find the in-focus position, and therefore, the defocus amount is desirably used as long as possible to drive the focusing lens.

It is difficult to correctly determine whether or not the defocus direction is reliable as the threshold of the reliability, because it depends on conditions of a subject, a camera parameter, etc.

Specifically, even when the reliability is worse than the threshold α, the defocus direction may be reliable. In this case, the focusing lens is driven as if the defocus amount were reliable. Even when it is judged that the reliability has continued to be worse for a predetermined period, then if the defocus direction has remained unchanged for that period, it is determined that the defocus direction is reliable. If the reliability has continued to be worse for the predetermined period and the defocus direction has not remained unchanged, it is still judged that the defocus amount is not reliable, and the focusing lens is transitioned to the search drive in step S2904. By such a control, even when the reliability is worse than the threshold α, the opportunity to drive the lens, assuming that the defocus direction is reliable, can be increased.

As described above, in this embodiment, the history of past defocus amounts is used to determine whether to switch from the drive method that is based on the defocus amount to the drive method that is not based on the defocus amount. Therefore, the state in which the focusing lens drive method should be switched to the drive method that is not based on the defocus amount can be more accurately detected. As a result, the defocus amount-based drive that moves the focusing lens at a higher focusing speed can be performed more often, and therefore, the time it takes to focus can be reduced, in addition to the advantages of the fourth embodiment.

(Sixth Embodiment)

A sixth embodiment of the present invention will now be described. This embodiment is different from the fifth embodiment in that, while the stepwise drive is performed even when the defocus direction is reliable, a determination is made as to whether to use the defocus direction, or the stepwise drive amount is changed, based on the reliability of the defocus amount.

The configuration of an interchangeable-lens camera including a lens unit and a camera body according to this embodiment is similar to that which has been described in the fourth embodiment with reference to FIG. 21, and therefore will not be described.

The operation of the camera body 20 of this embodiment is similar to that which has been described in the fourth embodiment with reference to the flowcharts of FIGS. 3, 4, 5, 6, 11, 12, 16, and 17, and therefore will not be described.

In this embodiment, the lens drive setting process performed in step S2304 of FIG. 23 will be described with reference to flowcharts shown in FIGS. 30A and 30B.

Figure 30B:
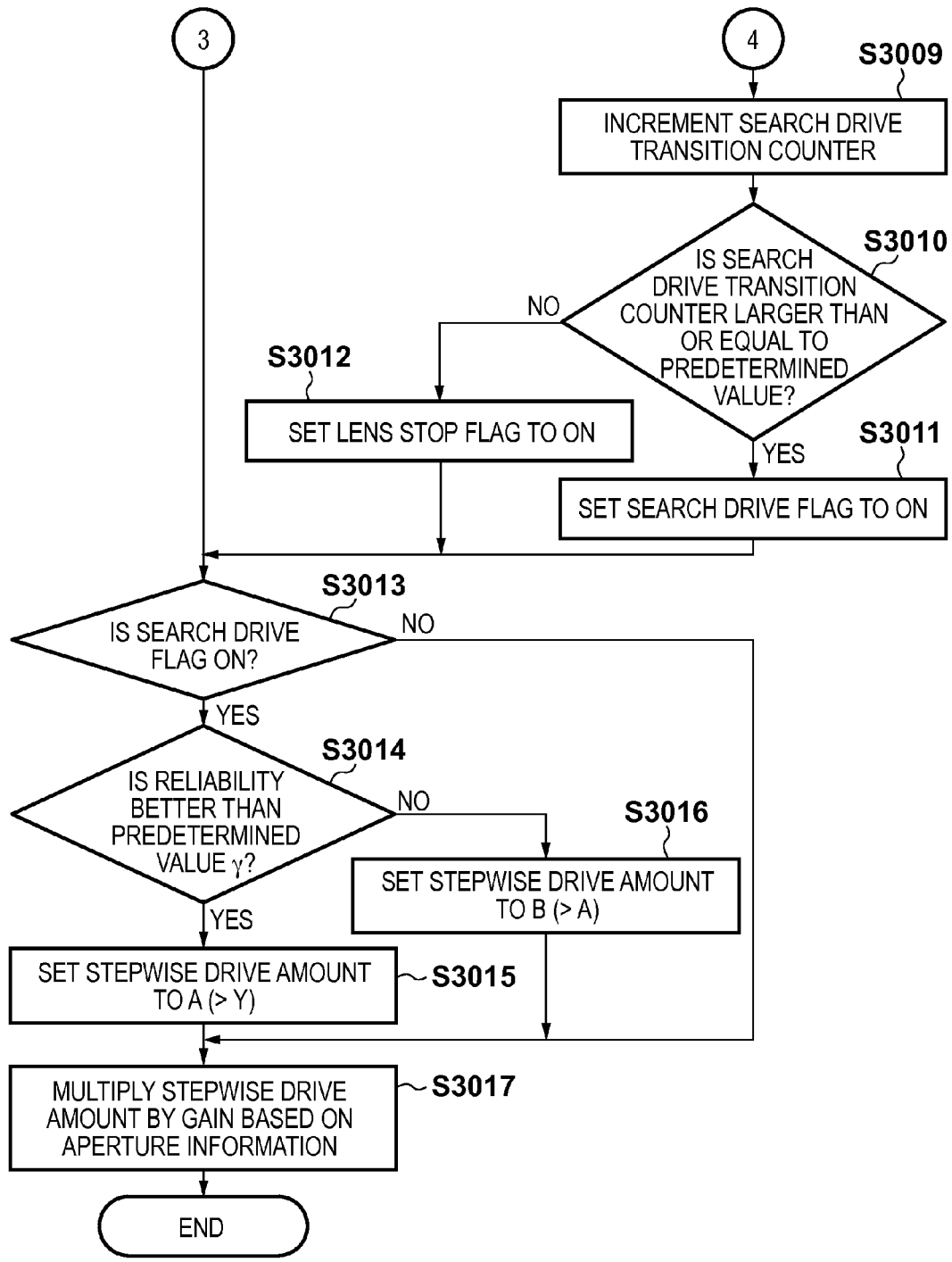

Processes of steps S3003 and S3004 of FIG. 30A are similar to those of steps S2401 and S2402 of FIG. 24 and therefore will not be described. Processes of steps S3009 to S3016 of FIG. 30B are similar to those of steps S2403 to S2410 of FIG. 24 and therefore will not be described.

In step S3001, the camera control unit 212 judges whether or not the image height of the focus detection area in the screen that has been set in step S607 of FIG. 6 is higher than a predetermined value. If the judgment result is positive, control proceeds to step S3002, and otherwise, control proceeds to step S3003. In step S3002, the camera control unit 212 sets the thresholds α and β of the reliability that are used in steps S3003 and S3006 to values (values representing worse reliability) that are larger than normal values (values used when the image height is smaller than or equal to a predetermined value in step S3001), and then control proceeds to step S3003.

The phase-detection-on-imaging-surface method has a characteristic feature that the pupils A and B for obtaining the image signals A and B have a difference in intensity as described above, and a difference between the amounts of light entering the pupils A and B increases with an increase in the image height, and therefore, the pupil intensity difference increases with an increase in the image height. In other words, as the image height increases, the calculated reliability such as the two-image coincidence degree, the steepness degree, etc. of the image signals A and B tends to become worse. If the threshold of the reliability that is used to change lens drive methods is constant, the defocus amount that is detected at a higher image height has a lower reliability. Therefore, in order to reduce the difference depending on the position, when the image height of the focus detection area is higher than the processed value, the threshold of the reliability that is used to change lens drive methods is changed to a value that is suitable for a lower reliability.

In step S3005 following step S3004 in which the search drive transition counter is reset after step S3003 in which it is judged that the reliability of the defocus amount is better than the predetermined value α, the camera control unit 212 sets the stepwise drive amount to "X" (first drive amount), and then control proceeds to step S3013. In step S3006 following step S3003 if it is judged that the reliability is worse than the predetermined value α, the camera control unit 212 judges whether or not the reliability is better than the predetermined value β. If the judgment result is positive, control proceeds to step S3007, and otherwise, control proceeds to step S3009. In step S3007, the camera control unit 212 resets the search drive transition counter, and then control proceeds to step S3008. In step S3008, the camera control unit 212 sets the stepwise drive amount to "Y" (second drive amount), and then control proceeds to step S3013.

The reliability thresholds α, β, and γ set in this embodiment have the following relationship:

$$\alpha < \beta < \gamma$$

where α represents the best reliability.

In the fourth and fifth embodiments, α represents a value indicating that at least the defocus direction is reliable. In this embodiment, such a value is assumed to be β. The reliability threshold α in this embodiment represents a reliability that is better than the value β indicating that at least the defocus direction is reliable.

The stepwise drive amounts A, B, X, and Y set in this embodiment have the following relationship:

$$X < Y < A < B$$

In this embodiment, even when the reliability is better than β, i.e., the defocus direction is reliable, the defocus amount is not used, and only the defocus direction is used to perform a control. In this case, as in the search drive, the stepwise drive amount is set, and the focusing lens is controlled and driven using the set stepwise drive amount in the defocus direction. Thus, in this embodiment, the control is switched between the control to perform the stepwise drive using the defocus direction and the stepwise drive control to perform the search drive without using the defocus information. Such a control has the following advantages.

Even when the focusing lens is in the vicinity of the in-focus position, the substantial drive speed of the focusing lens can be set to a low speed, and therefore, a more sophisticated focusing lens drive can be performed.

Even when the reliability of the defocus amount is high, the stepwise drive amount by which the focusing lens is driven can be caused to be variable, and therefore, a more sophisticated focusing lens drive in which the drive amount is caused to be variable when the focusing lens is close to the in-focus position can be achieved.

When the reliability is better than the threshold α (first reliability), the stepwise drive amount is set to "X." When the reliability is not better than the threshold α and is better than the threshold β (second reliability), the stepwise drive amount is set to "Y" (>X). In the phase-detection-on-imaging-surface method, the reliability of the defocus amount tends to become higher as the focusing lens approaches the in-focus position. Therefore, by setting the stepwise drive amount to a smaller value as the reliability increases, the movement speed of the focusing lens can be caused to apparently decrease as the focusing lens approaches the in-focus position. Note that the stepwise drive amount that is set when the stepwise drive is performed using the defocus direction, is set to be smaller than the stepwise drive amounts (A, B) (third drive amounts) that are used in the stepwise drive during the search drive. This is because a higher priority is given to searching for a subject as quickly as possible during the search drive, and when the reliability of the defocus amount is high (i.e., the focusing lens is close to the in-focus position), a higher priority is given to the performance of focusing on a subject or the reduction of the situation that the focusing lens is moved past a position where a subject is in focus. Note that, in this embodiment, a higher priority is given to a more sophisticated focusing lens drive than to the time it takes to focus, and therefore, even when the reliability of the defocus amount is good, the stepwise drive is performed, so that the time it takes to focus is longer than those of the fourth and fifth embodiments.

In step S3017, the camera control unit 212 multiplies, by a gain, the stepwise drive amount set in any of steps S3005, S3008, S3015, and S3016, based on the information of the diaphragm 102 obtained using the lens control unit 106, and then ends the lens drive setting process. Specifically, in this embodiment, the gain is applied so that the stepwise drive amount has a larger value when the aperture has a second aperture value than when the aperture has a first aperture value, where the aperture is more opened when the aperture has the second aperture value than when the aperture has the first aperture value. In particular, the applied gain increases with an increase in the size of the aperture of the diaphragm, and decreases with a decrease in the size of the aperture of the diaphragm. This is because the depth of focus decreases with an increase in the aperture value, i.e., the depth of focus increases with a decrease in the size of the aperture of the diaphragm. Therefore, as the size of the aperture of the diaphragm decreases, the focusing lens is more likely to be moved past a position where a subject is in focus, i.e., overshoot is likely to occur when the focusing lens is driven a larger stepwise drive amount at a time. Therefore, by performing focusing in which the focusing lens is moved a smaller stepwise drive amount at a time, overshoot is reduced, leading to a more sophisticated focusing lens drive. Another reason is that, as the size of the aperture of the diaphragm increases, blur is more likely to be noticeable when main subjects are changed, and therefore, the opportunity to desirably drive the focusing lens a larger stepwise drive amount at a time increases.

Next, the lens drive process of step S2305 of FIG. 23 will be described with reference to FIG. 31. Processes of steps S3101, S3102, S3104, and S3105 of FIG. 31 are similar to those of steps S2601, S2602, S2604, and S2605 of FIG. 26, and therefore will not be described. In step S3103 following step S3102 if it is judged that the search drive flag is "off" after it is judged in step S3101 that the lens stop flag is "off," the camera control unit 212 performs the stepwise drive in which the focusing lens is moved a stepwise drive amount set by the process of FIGS. 30A and 30B at a time in the defocus direction calculated in FIG. 6, and then ends the process.

As described above, in this embodiment, the control is switched, depending on the reliability of the defocus amount, between the control to perform the stepwise drive using the defocus direction and the stepwise drive control to perform the search drive without using the defocus information. Therefore, even when the reliability of the defocus amount is good, the focusing lens can be driven at a substantially low speed, and in addition, a more sophisticated drive can be achieved in which the drive speed decreases as the focusing lens approaches the in-focus position.

Also, the threshold of the reliability is changed that is used to change lens drive methods, depending on the image height of the focus detection area in which AF is performed using the phase-detection-on-imaging-surface method. As a result, a difference in focusing lens drive operation depending on the image height of the focus detection area can be reduced. Also, by causing the stepwise drive amount to be variable depending on the aperture value, the focusing lens can be more quickly focused when the size of the aperture of the diaphragm is large and therefore blur is likely to be noticeable, and the occurrence of overshoot can be reduced when the size of the aperture of the diaphragm is small and therefore overshoot is likely to occur.

In the foregoing, the present invention has been described in detail based on the illustrative embodiments. The present invention is not intended to be limited to these particular embodiments, and various changes and modifications can be made thereto without departing the scope of the appended claims.

(Other Embodiments)

To change the threshold, depending on the image height of the focus detection area, in the sixth embodiment, is applicable in the fourth and fifth embodiments. If such a technique is applied to the fourth and fifth embodiments, the opportunity to drive based on the defocus amount can be increased even then when AF is performed at a position where the image height is large. To adjust the stepwise drive amount for the search drive, depending on the aperture value, is also applicable to the fourth and fifth embodiments.

In the above embodiments, for the sake of simplicity and ease of understanding, the numbers of different stepwise drive amounts etc. which are set, depending on the reliability, are assumed to be two. Alternatively, the relationship between the reliability and the stepwise drive amount may be more finely defined, and the numbers of different stepwise drive amounts etc. may be three or more.

In the above embodiments, for the sake of simplicity and ease of understanding, the numbers of different drive speed or stepwise drive amounts etc. which are set, depending on the reliability, are assumed to be two. Alternatively, the relationship between the reliability and the drive speed may be more finely defined, and the numbers of different drive speeds may be three or more. By increasing that number, the changes in the drive speed can be controlled smoothly, for example, as shown in FIG. 14B. This can be applied not only to the drive speed for drive based on the defocus amount but also to the drive speed for search drive.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2013-81659 and 2013-81660, filed on Apr. 9, 2013, which are hereby incorporated by reference herein their entirety.

What is claimed is:

1. A focusing apparatus comprising:
an image sensor configured to generate a pair of image signals used for focus state detection by phase-difference detection method;
a calculation unit configured to calculate a first value based on a coincidence degree of the pair of image signals, wherein the first value indicates reliability of the pair of image signals;
a detection unit configured to detect a focus state based on the pair of image signals; and
a control unit configured to control drive of a focusing lens based on the focus state detected by the detection unit,
wherein, when the first value indicates that the reliability of the pair of image signals is higher than predetermined reliability, the control unit controls the focusing lens in a first mode in which the focusing lens is driven at a first speed if the first value indicates that the reliability of the pair of image signals is at a first level, and at a second speed lower than the first speed if the first value indicates that the reliability of the pair of image signals is at a second level higher than the first level, wherein the focus state includes a defocus direction and the predetermined reliability corresponds to reliability indicating that a defocus direction detected by the detection unit is reliable.

2. The focusing apparatus according to claim 1, wherein; in the first mode, the control unit controls the drive of the focusing lens based on the focus state detected by the detection unit based on the pair of image signals.

3. The focusing apparatus according to claim 1, wherein in the first mode, the control unit controls the drive of the focusing lens so that a drive speed decreases as the reliability of the pair of image signals indicated by the first value becomes better.

4. The focusing apparatus according to claim 1, wherein when the first value indicates that the reliability of the pair of image signals is not higher than the predetermined reliability, the control unit controls the focusing lens so as to be driven at a third speed lower than the second speed.

5. The focusing apparatus according to claim 4, wherein the third speed includes a case where the focusing lens is stopped.

6. The focusing apparatus according to claim 4, wherein when the reliability of the pair of image signals indicated by the first value has continued not to be higher than the predetermined reliability, for a predetermined period, the control unit switches to a second mode different from the first mode and controls the drive of the focusing lens in the second mode.

7. The focusing apparatus according to claim 6, wherein: in the second mode, the control unit controls the focusing lens so as to be driven at a fourth speed higher than the first speed without using the focus state detected by the detection unit based on the pair of image signals.

8. The focusing apparatus according to claim 6, wherein: in the second mode, the control unit controls the focusing lens so as to be driven in one direction until the reliability of the pair of image signals indicated by the first value becomes higher than the predetermined reliability.

9. The focusing apparatus according to claim 6, wherein in a case where the reliability of the pair of image signals indicated by the first value has continued not to be higher than the predetermined reliability, for the predetermined period, and if a defocus direction detected by the detection unit based on the pair of image signals has remained unchanged for the predetermined period, the control unit controls the drive of the focusing lens in the first mode.

10. The focusing apparatus according to claim 9, wherein in a case where the reliability of the pair of image signals indicated by the first value has continued not to be higher than the predetermined reliability, for the predetermined period, and if the defocus direction detected by the detection unit based on the pair of image signals has remained unchanged for the predetermined period, the control unit controls the focusing lens so as to be driven at a fifth speed higher than the first speed.

11. The focusing apparatus according to claim 1, wherein the control unit changes the drive speed of the focusing lens, depending on an aperture value.

12. The focusing apparatus according to claim 11, wherein the drive speed of the focusing lens in a case where the aperture value has a first value is larger than that in a case where the aperture value has a second value, the second value being larger than the first value.

13. The focusing apparatus according to claim 1, wherein the control unit controls the drive of the focusing lens based on the focus state detected by the detection unit based on the pair of image signals corresponding to a focus detection area, and changes a level of the predetermined reliability, depending on an image height of the focus detection area.

14. The focusing apparatus according to claim 13, wherein the control unit sets the level of the predetermined reliability to be lower as the image height of the focus detection area increases.

15. The focusing apparatus according to claim 1, wherein when a moving image is shot, in the first mode the control unit controls the focusing lens so as to be driven at the first speed if the first value indicates that the reliability of the pair of image signals is at the first level, and at the second speed if the first value indicates that the reliability is at the second level.

16. An image pickup apparatus comprising:
a focusing apparatus comprising:
an image sensor configured to generate a pair of image signals used for focus state detection by phase-difference detection method;
a calculation unit configured to calculate a first value based on a coincidence degree of the pair of image signals, wherein the first value indicates reliability of the pair of image signals;
a detection unit configured to detect a focus state based on the pair of image signals; and
a control unit configured to control drive of a focusing lens based on the focus state detected by the detection unit,
wherein, when the first value indicates that the reliability of the pair of image signals is higher than predetermined reliability, the control unit controls the focusing lens in a first mode in which the focusing lens is driven at a first speed if the first value indicates that the reliability of the pair of image signals is at a first level, and at a second speed lower than the first speed if the first value indicates that the reliability of the pair of image signals is at a second level higher than the first level,
wherein the focus state includes a defocus direction, and the predetermined reliability corresponds to reliability indicating that a defocus direction detected by the detection unit is reliable, and
wherein
the image sensor generates an image signal for displaying or recording.

17. A method for controlling a focusing apparatus including an image sensor configured to generate a pair of image signals used for focus state detection by phase-difference detection method, the method comprising:
calculating a first value based on a coincidence degree of the pair of image signals, wherein the first value indicates reliability of the pair of image signals;
detecting a focus state based on the pair of image signals; and
controlling drive of a focusing lens based on the focus state detected by the detecting,
wherein, in the controlling, when the first value indicates that the reliability of the pair of image signals is higher than predetermined reliability, the focusing lens is controlled so as to be driven at a first speed if the first value indicates that the reliability of the pair of image signals is at a first level, and at a second speed lower than the first speed if the first value indicates that the reliability of the pair of image signals is at a second level higher than the first level, wherein the focus state includes a defocus direction and the predetermined reliability corresponds to reliability indicating that a defocus direction detected by the detection unit is reliable.

18. A focusing apparatus comprising:
a processor configured to perform the functions of a calculation unit, a detection unit, and a control unit;
an image sensor configured to generate a pair of image signals used for focus state detection by phase-difference detection method;
the calculation unit configured to calculate a first value based on a coincidence degree of the pair of image signals, wherein the first value indicates reliability of the pair of image signals;
the detection unit configured to detect a focus state based on the pair of image signals; and
the control unit configured to control drive of a focusing lens based on the focus state detected by the detection unit,
wherein, when the first value indicates that the reliability of the pair of image signals is higher than predetermined reliability, the control unit controls the focusing lens in a first mode in which the focusing lens is driven at a first speed if the first value indicates that the reliability of the pair of image signals is at a first level, and at a second speed lower than the first speed if the first value indicates that the reliability of the pair of image signals is at a second level higher than the first level,
wherein the focus state includes a defocus direction and the predetermined reliability corresponds to reliability indicating that a defocus direction detected by the detection unit is reliable.

19. The focusing apparatus according to claim 18, wherein;
in the first mode, the control unit controls the drive of the focusing lens based on the focus state detected by the detection unit based on the pair of image signals.

20. The focusing apparatus according to claim 18, wherein in the first mode, the control unit controls the drive of the focusing lens so that a drive speed decreases as the reliability of the pair of image signals increases.

21. The focusing apparatus according to claim 18, wherein when the first value indicates that the reliability of the pair of image signals is not higher than the predetermined reliability, the control unit controls the focusing lens so as to be driven at a third speed lower than the second speed.

22. The focusing apparatus according to claim 21, wherein the third speed includes a case where the focusing lens is stopped.

23. The focusing apparatus according to claim 21, wherein when the reliability of the pair of image signals indicated by the first value has continued not to be higher than the predetermined reliability, for a predetermined period, the control unit switches to a second mode different from the first mode and controls the drive of the focusing lens in the second mode.

24. The focusing apparatus according to claim 23, wherein:
in the second mode, the control unit controls the focusing lens so as to be driven at a fourth speed higher than the first speed without using the focus state detected by the detection unit based on the pair of image signals.

25. The focusing apparatus according to claim 23, wherein in the second mode, the control unit controls the focusing lens so as to be driven in one direction until the reliability of the pair of image signals indicated by the first value becomes higher than the predetermined reliability.

26. The focusing apparatus according to claim 23, wherein in a case where the reliability of the pair of image signals indicated by the first value has continued not to be higher than the predetermined reliability, for the predetermined period, and if a defocus direction detected by the detection unit based on the pair of image signals has remained unchanged for the predetermined period, the control unit controls the drive of the focusing lens in the first mode.

27. The focusing apparatus according to claim 26, wherein in a case where the reliability of the pair of image signals indicated by the first value has continued not to be higher than the predetermined reliability, for the predetermined period, and if the defocus direction detected by the detection unit based on the pair of image signals has remained unchanged for the predetermined period, the control unit controls the focusing lens so as to be driven at a fifth speed higher than the first speed.

28. The focusing apparatus according to claim 18, wherein the control unit changes the drive speed of the focusing lens, depending on an aperture value.

29. The focusing apparatus according to claim 28, wherein the drive speed of the focusing lens in a case where the aperture value has a first value is larger than that in a case where the aperture value has a second value, the second value being larger than the first value.

30. The focusing apparatus according to claim 18, wherein the control unit controls the drive of the focusing lens based on the focus state detected by the detection unit based on the pair of image signals corresponding to a focus detection area, and changes a level of the predetermined reliability, depending on an image height of the focus detection area.

31. The focusing apparatus according to claim 30, wherein the control unit sets the level of the predetermined reliability to be lower as the image height of the focus detection area increases.

32. The focusing apparatus according to claim 18, wherein when a moving image is shot, in the first mode the control unit controls the focusing lens so as to be driven at the first speed if the first value indicates that the reliability of the pair of image signals is at the first level, and at the second speed if the first value indicates that the reliability is at the second level.

33. An image pickup apparatus comprising:
a focusing apparatus comprising:
a processor configured to perform the functions of a calculation unit, a detection unit, and a control unit;
an image sensor configured to generate a pair of image signals used for focus state detection by phase-difference detection method;
the calculation unit configured to calculate a first value based on a coincidence degree of the pair of image signals, wherein the first value indicates reliability of the pair of image signals;
the detection unit configured to detect a focus state based on the pair of image signals; and
the control unit configured to control drive of a focusing lens based on the focus state detected by the detection unit,
wherein, when the first value indicates that the reliability of the pair of image signals is higher than predetermined reliability, the control unit controls the focusing lens in a first mode in which the focusing lens is driven at a first speed if the first value indicates that the reliability of the pair of image signals is at a first level, and at a second speed lower than the first speed if the first value indicates that the reliability of the pair of image signals is at a second level higher than the first level, wherein the focus state includes a defocus direction, and the predetermined reliability corresponds to reliability indicating that a defocus direction detected by the detection unit is reliable, and wherein the image sensor generates an image signal for displaying or recording.

34. A method for controlling a focusing apparatus including an image sensor configured to generate a pair of image signals used for focus state detection by phase-difference detection method, the method comprising:

calculating a first value based on a coincidence degree of the pair of image signals, wherein the first value indicates reliability of the pair of image signals;

detecting a focus state based on the pair of image signals; and controlling drive of a focusing lens based on the focus state detected by the detecting, wherein, in the controlling, when the first value indicates that the reliability of the pair of image signals is higher than predetermined reliability, the focusing lens is controlled so as to be driven at a first speed if the first value indicates that the reliability of the pair of image signals is at a first level, and at a second speed lower than the first speed if the first value indicates that the reliability of the pair of image signals is at a second level higher than the first level, wherein the focus state includes a defocus direction and the predetermined reliability corresponds to reliability indicating that a defocus direction detected by the detection unit is reliable.

35. A focusing apparatus comprising:

an image sensor configured to generate a pair of image signals used for focus state detection by phase-difference detection method;

a calculation unit configured to calculate a first value based on a coincidence degree of the pair of image signals, wherein the first value indicates reliability of the pair of image signals;

a detection unit configured to detect a focus state based on the pair of image signals; and a control unit configured to control drive of a focusing lens based on the focus state detected by the detection unit, wherein the control unit controls the drive of the focusing lens so that a drive speed decreases in stages as the reliability of the pair of image signals indicated by the first value becomes better.

36. The focusing apparatus according to claim 35, wherein, when the first value indicates that the reliability of the pair of image signals is higher than predetermined reliability, the control unit controls the focusing lens in a first mode in which the control unit controls the drive of the focusing lens so that the drive speed decreases in stages as the reliability of the pair of image signals indicated by the first value becomes better.

37. The focusing apparatus according to claim 36, wherein the focus state includes a defocus direction, and the predetermined reliability corresponds to reliability indicating that a defocus direction detected by the detection unit is reliable.

38. The focusing apparatus according to claim 36, wherein when the first value indicates that the reliability of the pair of image signals is not higher than the predetermined reliability, the control unit controls the focusing lens so as to be driven at a lower speed than the drive speed set in the first mode.

39. The focusing apparatus according to claim 35, wherein the control unit changes the drive speed of the focusing lens, depending on an aperture value.

40. The focusing apparatus according to claim 39, wherein the drive speed of the focusing lens in a case where the aperture value has a first value is larger than that in a case where the aperture value has a second value, the second value being larger than the first value.

41. The focusing apparatus according to claim 36, wherein the control unit controls the drive of the focusing lens based on the focus state detected by the detection unit based on the pair of image signals corresponding to a focus detection area, and changes a level of the predetermined reliability, depending on an image height of the focus detection area.

42. The focusing apparatus according to claim 41, wherein the control unit sets the level of the predetermined reliability to be lower as the image height of the focus detection area increases.

43. The focusing apparatus according to claim 35, wherein when a moving image is shot, the control unit controls the drive of the focusing lens so that the drive speed decreases in stages as the reliability of the pair of image signals indicated by the first value becomes better.

44. An image pickup apparatus comprising:

a focusing apparatus comprising:

an image sensor configured to generate a pair of image signals used for focus state detection by phase-difference detection method;

a calculation unit configured to calculate a first value based on a coincidence degree of the pair of image signals, wherein the first value indicates reliability of the pair of image signals;

a detection unit configured to detect a focus state based on the pair of image signals; and a control unit configured to control drive of a focusing lens based on the focus state detected by the detection unit, wherein the control unit controls the drive of the focusing lens so that a drive speed decreases in stages as the reliability of the pair of image signals indicated by the first value becomes better, and wherein the image sensor generates an image signal for displaying or recording.

45. A method for controlling a focusing apparatus including an image sensor configured to generate a pair of image signals used for focus state detection by phase-difference detection method, the method comprising:

calculating a first value based on a coincidence degree of the pair of image signals, wherein the first value indicates reliability of the pair of image signals;

detecting a focus state based on the pair of image signals; and controlling drive of a focusing lens based on the focus state detected by the detecting, wherein, in the controlling, the drive of the focusing lens is controlled so that a drive speed decreases in stages as the reliability of the pair of image signals indicated by the first value becomes better.

* * * * *